(12) United States Patent
Yorino et al.

(10) Patent No.: US 12,187,860 B2
(45) Date of Patent: Jan. 7, 2025

(54) WATER-ABSORBENT RESIN POWDER AND PRODUCTION METHOD THEREOF

(71) Applicant: NIPPON SHOKUBAI CO., LTD., Osaka (JP)

(72) Inventors: Tsuyoshi Yorino, Himeji (JP); Naoki Katakura, Suita (JP); Hiroki Hayashi, Himeji (JP); Sumito Kumagai, Himeji (JP); Masahumi Inoue, Himeji (JP); Tomoyuki Arake, Himeji (JP); Mai Sato, Himeji (JP); Ryota Wakabayashi, Himeji (JP); Yoshihiro Shobo, Suita (JP); Shin-ya Katsube, Himeji (JP); Yoshifumi Adachi, Himeji (JP); Satoshi Matsumoto, Himeji (JP)

(73) Assignee: NIPPON SHOKUBAI CO., LTD., Osaka (JP)

(*) Notice: Subject to any disclaimer, the term of this patent is extended or adjusted under 35 U.S.C. 154(b) by 965 days.

(21) Appl. No.: 17/055,153

(22) PCT Filed: May 16, 2019

(86) PCT No.: PCT/JP2019/019518
§ 371 (c)(1),
(2) Date: Nov. 13, 2020

(87) PCT Pub. No.: WO2019/221236
PCT Pub. Date: Nov. 21, 2019

(65) Prior Publication Data
US 2021/0115198 A1    Apr. 22, 2021

(30) Foreign Application Priority Data

May 16, 2018 (JP) .................................. 2018-094788
Nov. 8, 2018 (JP) .................................. 2018-210731

(51) Int. Cl.
*C08J 3/12*    (2006.01)
*C08F 20/06*    (2006.01)
(Continued)

(52) U.S. Cl.
CPC .................. *C08J 3/12* (2013.01); *C08F 20/06* (2013.01); *C08J 3/075* (2013.01); *C08J 3/20* (2013.01);
(Continued)

(58) Field of Classification Search
CPC ....... C08J 3/12; C08J 3/075; C08J 3/20; C08J 3/203; C08J 3/245; C08J 2300/14;
(Continued)

(56) References Cited

U.S. PATENT DOCUMENTS 5,064,582 A    11/1991   Sutton et al.
5,342,599 A     8/1994   Slone
(Continued)

FOREIGN PATENT DOCUMENTS

EP    1130045 A2    9/2001
EP    2787025 A1    10/2014
(Continued)

OTHER PUBLICATIONS

Machine English translation of WO 2009/119754; Matsumoto et al. (Year: 2009).*
(Continued)

*Primary Examiner* — Jessica M Roswell
(74) *Attorney, Agent, or Firm* — Dickinson Wright PLLC

(57) ABSTRACT

The present invention addresses the problem of providing; a water absorbent resin powder having a reduced amount of fine powder generated and a reduced amount of fine powder recovered; and a production method for the water absorbent resin. The production method of the present invention includes a drying step and a fine powder granulation step.
(Continued)

The drying step is for obtaining a dried polymer by drying a particulate water-containing gel crosslinked polymer which is obtained using an acid group-containing unsaturated monomer as a main component. The fine powder granulation step is for obtaining a fine powder granulated product by adding a binder and an adhesion control agent to a fine powder made of a water absorbent resin. In this production method, the obtained fine powder granulated product is recovered in the drying step or in any step before the drying step.

12 Claims, 2 Drawing Sheets

(51) Int. Cl.
| | | |
|---|---|---|
| *C08J 3/075* | (2006.01) | |
| *C08J 3/20* | (2006.01) | |
| *C08J 3/24* | (2006.01) | |

(52) U.S. Cl.
CPC .............. *C08J 3/203* (2013.01); *C08J 3/245* (2013.01); *C08J 2300/14* (2013.01)

(58) Field of Classification Search
CPC ..... C08F 20/06; C08F 220/06; B01J 2220/68; B01J 20/2691; B01J 20/267; B01J 20/28004; B01J 20/2803; B01J 20/3028
See application file for complete search history.

(56) References Cited

U.S. PATENT DOCUMENTS

| | | | |
|---|---|---|---|
| 5,350,799 A | 9/1994 | Woodrum et al. | |
| 6,174,978 B1 | 1/2001 | Hatsuda et al. | |
| 6,228,930 B1 | 5/2001 | Dairoku et al. | |
| 6,458,921 B1 | 10/2002 | Dairoku et al. | |
| 2001/0025093 A1 | 9/2001 | Ishizaki et al. | |
| 2003/0008946 A1 | 1/2003 | Dairoku et al. | |
| 2006/0183828 A1 | 8/2006 | Dairoku et al. | |
| 2006/0247351 A1 | 11/2006 | Torii et al. | |
| 2010/0062252 A1 | 3/2010 | Kimura et al. | |
| 2011/0003926 A1 | 1/2011 | Nogi et al. | |
| 2011/0006140 A1 | 1/2011 | Ishizaki et al. | |
| 2011/0009590 A1 | 1/2011 | Matsumoto et al. | |
| 2011/0011491 A1 | 1/2011 | Matsumoto et al. | |
| 2011/0015351 A1 | 1/2011 | Nogi et al. | |
| 2011/0028670 A1 | 2/2011 | Matsumoto et al. | |
| 2011/0088806 A1 | 4/2011 | Nogi et al. | |
| 2011/0110730 A1 | 5/2011 | Nogi et al. | |
| 2011/0166300 A1 | 7/2011 | Dairoku et al. | |
| 2011/0237739 A1 | 9/2011 | Tada et al. | |
| 2013/0102750 A1 | 4/2013 | Watanabe et al. | |
| 2013/0261276 A1 | 10/2013 | Matsumoto et al. | |
| 2015/0259522 A1 | 9/2015 | Lee et al. | |
| 2016/0045895 A1 | 2/2016 | Won et al. | |
| 2017/0044281 A1 | 2/2017 | Fuuno et al. | |
| 2017/0166707 A1 | 6/2017 | Jang et al. | |
| 2018/0298132 A1* | 10/2018 | Yorino | C08K 5/32 |

FOREIGN PATENT DOCUMENTS

| | | | |
|---|---|---|---|
| EP | 2957576 A | 12/2015 | |
| JP | H03152104 A | 6/1991 | |
| JP | H0441532 A | 2/1992 | |
| JP | H04227934 A | 8/1992 | |
| JP | H11106514 A | 4/1999 | |
| JP | H11140194 A | 5/1999 | |
| JP | H11240959 A | 9/1999 | |
| JP | H11254429 A | 9/1999 | |
| JP | 2005054151 A | 3/2005 | |
| JP | 2006299234 A | 11/2006 | |
| JP | 2010538095 A | 12/2010 | |
| JP | WO2016204302 | 12/2016 | |
| KR | 20170092314 A | 8/2017 | |
| WO | 2006098271 A1 | 9/2006 | |
| WO | 2009031701 A1 | 3/2009 | |
| WO | 2009113673 A1 | 9/2009 | |
| WO | 2009113678 A1 | 9/2009 | |
| WO | 2009113679 A1 | 9/2009 | |
| WO | 2009119754 A1 | 10/2009 | |
| WO | 2011136301 A1 | 11/2011 | |
| WO | 2015041432 A1 | 3/2015 | |

OTHER PUBLICATIONS

Machine English translation of JP 2005-054151; Miyake (Year: 2005).*
Machine English translation of WO 2011/136301 (Year: 2011).*
International Search Report dated Aug. 20, 2019, which issued in the corresponding PCT Patent Application No. PCT/JP2019/019518.
Modern Superabsorbents Polymer Chemistry (1998), Modern Superabsorbent Polymer Technology, Edited by Fredric L. Buchholz et al., pp. 69 to 103.
Korean Office Action dated Mar. 22, 2023, which issued in the corresponding Korean Application No. 10 2020 7035702, including English machine translation.
Korean Office Action dated Mar. 26, 2023, which issued in the related Korean Application No. 10 2020 7035703, including English machine translation.
Chinese Office Action dated Nov. 30, 2022, which issued in the corresponding Chinese Application (No. 201980032452.9 ), including English translation.
Chinese Office Action dated Dec. 27, 2022, which issued in the corresponding Chinese Application (No. 201980032510.8 ), including English translation.
European Extended Search Report dated Jan. 28, 2022, which issued in the corresponding European Application No. 19803772.3.
European Extended Search Report dated Feb. 23, 2022, which issued in the related European Application No. 19802522.3.
Japanese Office Action dated Oct. 19, 2021, which issued in the corresponding Japanese Patent Application No. 2020-519920, including Eng. translation.
Chinese Decision of Rejection dated Apr. 25, 2023, which issued in the corresponding Chinese Patent Application No. 201980032452.9, including English machine translation.
Japanese Office Action dated Apr. 27, 2021, which issued in the corresponding Japanese Patent Application No. 2020-519919, including Eng. translation.
Chinese Office Action dated Sep. 15, 2023, which issued in the corresponding Chinese Patent Application No. 201980032510.8, including English machine translation.
U.S. Office Action dated Aug. 17, 2023, issued in U.S. Appl. No. 17/055,174.

* cited by examiner

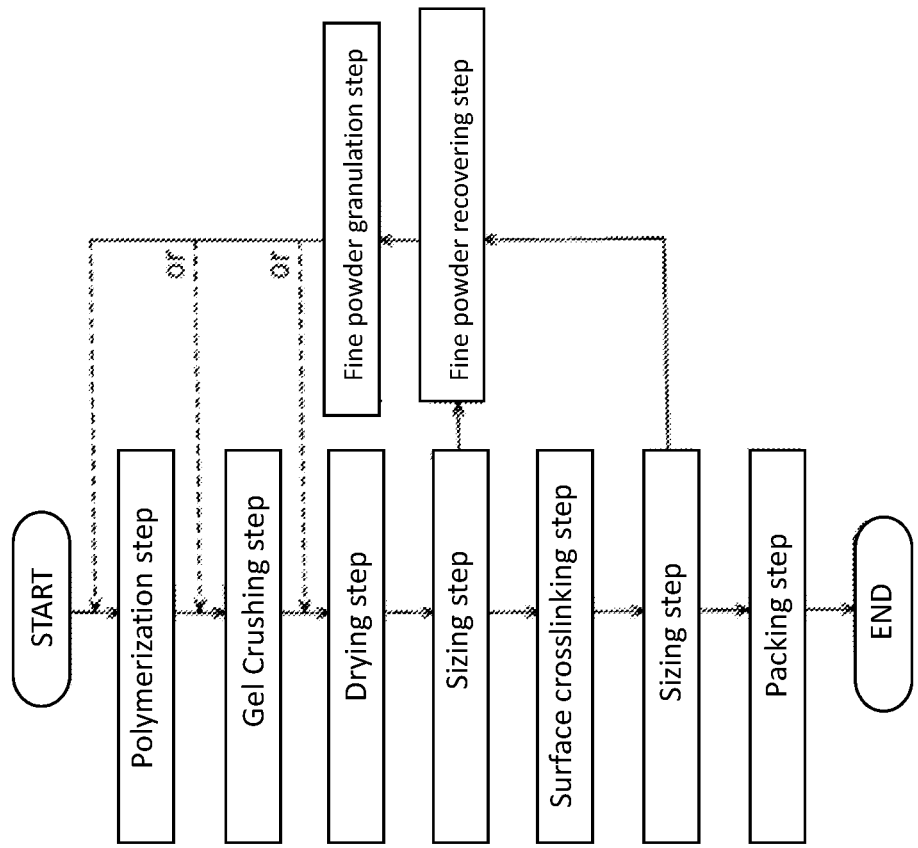
[Fig. 1]

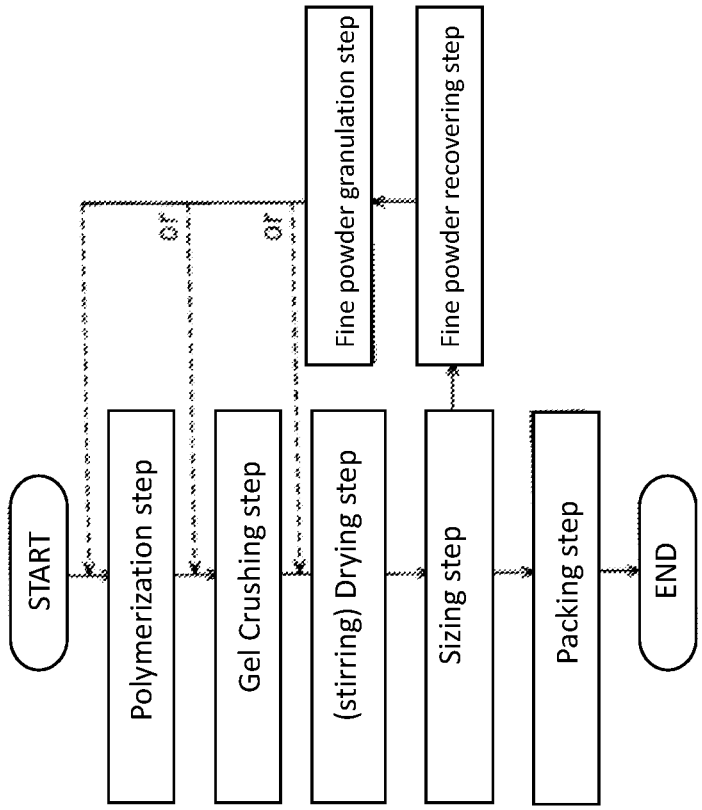
[Fig. 2]

WATER-ABSORBENT RESIN POWDER AND PRODUCTION METHOD THEREOF

TECHNICAL FIELD

The present invention relates to a water-absorbent resin powder and a production method thereof. In particular, the present invention relates to a method of producing a water-absorbent resin powder in which the generation amount of fine powder in the production process is reduced more than before.

BACKGROUND ART

A water-absorbent resin (SAP/Super Absorbent Polymer) is a water-swellable and water-insoluble polymer gelling agent, and has been frequently used in various fields such as absorbent articles such as paper diapers and sanitary napkins, water retention agents for agricultural and horticultural use, and industrial water stopping agents.

For such a water absorbent resin, many monomers and hydrophilic polymers have been used as a raw material thereof. A polyacrylic acid (salt) water-absorbent resin which uses acrylic acid and/or a salt thereof as a monomer has been most frequently produced for industrial use from the viewpoint of the water absorption performance.

Along with the performance improvement of a paper diaper that is the principal application of the water-absorbent resin, there has been a demand for various functions (improved physical properties) of the water-absorbent resin. Specifically, in addition to basic physical properties such as water absorption capacity without pressure and water absorption capacity under pressure, various physical properties such as gel strength, water-soluble component, moisture content, water absorption rate, liquid permeability, particle size distribution, urine resistance, antibacterial property, damage resistance, powder flowability, deodorization property, coloration resistance, low dust property, and residual monomers have been required for the water-absorbent resin.

Such a water-absorbent resin can be made into various forms such as a sheet from, a fiber form, and a film form, but is generally often made in the form of powder or particle. A powder-like or particulate water-absorbent resin is known to vary its water absorption performance, handleability, and feeling during use depending on its particle diameter, particle size distribution, and the like. Thus, a powder-like or particulate water-absorbent resin whose particle diameter or particle size distribution is appropriately controlled has been demanded. In particular, in application of hygiene products such as a paper diaper, a water-absorbent resin powder having a small content of fine powder (microparticles having a particle diameter of less than 100 μm to less than 150 μm, particularly, microparticles having a particle diameter of less than 150 μm) (for example, the particle size distribution is 850 to 150 μm) is considered to be preferable from the viewpoint of the water absorption capacity under pressure, liquid permeability, and the like.

Examples of the main method of producing the powder-like or particulate water-absorbent resin include an aqueous solution polymerization method and a reverse phase suspension polymerization method. In particular, in order to finally obtain a particulate water-absorbent resin, the aqueous solution polymerization method normally requires many production steps such as a polymerization step of subjecting a water-soluble ethylenically unsaturated monomer to aqueous solution polymerization, a gel crushing (refining) step of crushing a hydrogel polymer obtained in the polymerization, a drying step of drying the crushed gel, a crushing step of crushing the dried product, a classifying step of adjusting the particle size of the crushed product to an appropriated range, a mixing step of mixing a surface crosslinking agent to the classified water-absorbent resin powder, and a heating step of heating the mixture to cause surface crosslinking reaction (Non-Patent Document 1 and Patent Documents 1 to 4).

The amount of the fine powder generated in the production process reaches 10 to several 10% by mass (for example, 20 to 30% by mass) of the total production amount. This fine powder is removed in the classifying step, but disposal of the removed fine powder is disadvantageous in cost. Therefore, such a fine powder is normally recovered in a step before the classifying step, particularly, in a step before the drying step after granulation.

When the strength of the fine powder granulated product is insufficient at the time of granulating and recovering the fine powder, fine powder is again generated in the drying step, crushing step, and classifying step, for example. As a result, the amount of fine powder generated in the entire production process increases. In the past, various proposals have been made for improving the strength of the fine powder granulated product.

For example, a method of gelling fine powder with a large amount of hot water to firmly bind fine powder (Patent Document 5), and a method of surface-treating the fine powder with a basic solution to firmly bind the fine powder using an eluted component such as a soluble component as a binder (Patent Document 6) have been proposed. Further, as a method of firmly and uniformly binding fine powder by uniformly supplying moisture to fine powder, a method of using water (aqueous liquid) and water vapor (Patent Document 7), and a method of using a mixture of hydrophobic powder (inorganic oxide particles) and fine powder, and water (Patent Document 8) have been proposed.

However, in both methods, the particle diameter of the resulting fine powder granulated product becomes large, which is several mm or more (for example, 3 mm). The particle diameter of the dried product of such a fine powder granulated product inevitably becomes larger than a desired product particle diameter of the water-absorbent resin (for example, 850 to 150 μm). For example, in a case where the fine powder granulated product is recovered in the drying step of the crushed hydrogel, adhesion of the fine powder and adhesion of hydrogel particles occur. This makes the particle diameter of the resulting dried product larger than the particle diameter of the fine powder granulated product before drying and a desired product particle diameter of the water-absorbent resin. In this case, even when the fine powder granulated product itself has sufficient strength, when the particle sizes of fine powder granulated product and dried product increase or they are integrated into a block-like product, a load on a desired product particle diameter is increased in the later crushing step, raising a problem of conversely increasing the generation amount of the fine powder. Further, in the case of the method of Patent Document 8 which uses inorganic oxide particles, dust generated in the mixing step of mixing with the water-absorbent resin fine powder causes a problem in handleability. Further, the water-absorbent resin fine powder granulated product (secondary particle) obtained from the water-absorbent resin fine powder after drying is relatively vulnerable to mechanical damage compared to the water-absorbent resin powder (primary particle) which is a dried product of a polymer gel. Thus, regeneration of the fine powder caused by breaking of the granulated particles occurs in some cases. Therefore, in the water-absorbent resin obtained by fine powder granulation by the fine powder recycling method, there has been a possibility that unintended mechanical damage caused by friction in the production process or actual use of a final product (for example, paper diaper production) causes breaking of the fine powder granulated product, and thus increases the fine powder.

PRIOR ART DOCUMENTS

Patent Documents

Patent Document 1: EP-A2-1130045
Patent Document 2: WO 2009/113678
Patent Document 3: WO 2009/113679
Patent Document 4: WO 2009/113673
Patent Document 5: JP-A-11-106514
Patent Document 6: WO 2015/041432
Patent Document 7: WO 2009/031701
Patent Document 8: KR-A-1020170092314

Non-Patent Document

Non-Patent Document 1: Modern Superabsorbents Polymer Chemistry (1998), p 69 to 103

SUMMARY OF THE INVENTION

Problems to be Solved by the Invention

An object of the present invention is to provide a method that can achieve an excellent water absorption performance such as water absorption capacity under pressure, and a minimal generation amount of fine powder and a minimal recovery amount of fine powder in the production process, and that enables efficient production of a water-absorbent resin powder by a compact apparatus. Further, the present invention provides a water-absorbent resin powder and a production method thereof that can suppress regeneration of fine powder caused by breaking of granulated particles which are relatively vulnerable to mechanical damage.

Solutions to the Problems

As a result of diligent studies, the present inventors found that a fine powder granulated product having an appropriate granulation strength and particle size can be obtained by adding an adhesion controlling agent in the fine powder granulation step, and when this fine powder granulated product is recovered in the drying step, increase in the particle size of the resulting dried product is suppressed, whereby the mechanical damage in the subsequent steps is reduced and the generation amount of fine powder is reduced, and completed the present invention.

That is, the present invention a method of producing a water-absorbent resin powder, the method including a drying step of drying a particulate hydrogel crosslinked polymer which is obtained using an acid group-containing unsaturated monomer as a main component to obtain a dried polymer, and a fine powder granulation step of adding a binder and an adhesion controlling agent to fine powder formed of a water-absorbent resin to obtain a fine powder granulated product, in which the resulting fine powder granulated product is recovered in the drying step or any of steps before the drying step. Further, to solve the above-described problems, the water-absorbent resin powder of the present invention provides a water-absorbent resin powder containing a water-absorbent resin powder (primary particle) which is a dried product of a hydrogel g polymer and a water-absorbent resin fine powder granulated product containing an adhesion controlling agent by giving the above-described production method as one example of the production method.

Effects of the Invention

In the production method according to the present invention, a fine powder granulated product having an appropriate granulation strength and particle size can be obtained in the fine powder granulation step. By recovering this fine powder granulated product in the drying step or any of steps before the drying step and drying the recovered fine powder granulated product together with the particulate hydrogel crosslinked polymer, increase in the particle size of the resulting dried product is suppressed. As a result, mechanical damage in subsequent steps is reduced, and thus the effect of reducing the generation amount of fine powder can be obtained. In particular, in a case where the fine powder granulated product and particulate hydrogel are dried together by using a stirring dryer with tumbling of the contents in the drying step, formation of coarse particles due to adhesion of the fine powder granulated products or adhesion of the fine powder granulated product and hydrogel particles is suppressed. Thus, the effect of reducing the generation amount of fine powder in subsequent steps is more remarkable.

Also, in an embodiment in which the fine powder generated mainly in the production process is subjected to the fine powder granulation step, the fine powder granulated product which is recovered in the drying step or the like is also reduced with reduction in the generation amount of fine powder. As a result, the physical properties of the resulting water-absorbent resin powder are improved. Further, it becomes possible to decrease the size of the production apparatus in the steps after the drying step. Moreover, in the water-absorbent resin powder according to the present invention, the fine powder granulated product which is relatively vulnerable to mechanical damage contains an adhesion controlling agent (particularly, a surfactant). Thereby, mechanical damage caused by friction in the subsequent steps or actual use of the water-absorbent resin powder as a product (for example, paper diaper production) is reduced. As a result, the effect of reducing the generation amount of fine powder becomes more remarkable.

BRIEF DESCRIPTION OF THE DRAWINGS

FIG. 1 is a flow chart illustrating the production method according to an embodiment of the present invention.
FIG. 2 is a flow chart illustrating the production method according to another embodiment of the present invention.

MODE FOR CARRYING OUT THE INVENTION

Hereinafter, the present invention will be described in detail. However, the scope of the present invention is not intended to be restrained by these descriptions, and embodiments other than the following examples can also be appropriately modified and carried out to the extent that the gist of the present invention is not impaired. Further, the present invention is not limited to the following embodiments, and various modifications may be made within the scope indicated by claims Another embodiment achieved by appropriately combining each technical means disclosed in a plurality of embodiments is also included within the technical scope of the present invention.

[1] Definition of Terms

[1-1] "Water-Absorbent Resin"

The "water-absorbent resin" in the present invention refers to a water-swellable and water-insoluble polymer gelling agent that satisfies the following physical properties. In other words, the water-absorbent resin indicates a polymer gelling agent whose CRC (centrifuge retention capacity) defined in ERT441.2-02 as water swellability is 5 g/g or more, and Ext (water-soluble component) defined in ERT470.2-02 as water insolubility is 50% by mass or less.

The water-absorbent resin can be designed according to the application and purpose thereof, and is not particularly limited. The water-absorbent resin is preferably a hydrophilic crosslinked polymer obtained by crosslink-polymerizing an unsaturated monomer having a carboxyl group. The water-absorbent resin is not limited to an embodiment in which the total amount thereof is a crosslinked polymer. The water-absorbent resin may also be a composition containing an additive and the like as long as each of the above-described physical properties (CRC, and Ext) satisfies the above-described numerical range.

The "water-absorbent resin" in the present invention may be a surface-crosslinked water-absorbent resin (another name; post-crosslinking, or secondary crosslinking), or may be a non surface-crosslinked water-absorbent resin. Note that in the present invention, a water-absorbent resin, in which a predetermined surface crosslinking treatment has been completed, may be differently referred to as a surface-crosslinked water-absorbent resin. Further, a water-absorbent resin whose moisture content and particle size have been adjusted to a predetermined level is referred to as a water-absorbent resin powder or a water-absorbing agent.

[1-2] "Fine Powder"

The "fine powder" in the present invention is a particulate or powder-like water-absorbent resin, and refers to a water-absorbent resin having a mass average particle diameter of less than 150 μm. The fine powder refers to preferably a fine powder formed of a water-absorbent resin containing poly(meth)acrylic acid (salt)-based crosslinked polymer as a main component. The fine powder may be a surface-crosslinked fine powder or may a non surface-crosslinked fine powder. Further, the fine powder may contain water, or an additive which will be described later in the adding step of other additives. That is, the "fine powder formed of a water-absorbent resin" of the present invention is not limited to a fine powder 100% of which is the water-absorbent resin (a polymer having a moisture content of 0%). The fine powder may contain water and other trace components which are sub-raw materials of the water-absorbent resin powder (for example, inorganic fine particles).

[1-3] Poly(Meth)Acrylic Acid (Salt)

The "poly(meth)acrylic acid (salt)" in the present invention refers to poly(meth)acrylic acid and/or a salt thereof, and means a crosslinked polymer that contains (meth)acrylic acid and/or a salt thereof (hereinafter, referred to as "(meth)acrylic acid (salt)") serving as a repeating unit, as a main component, and also contains a graft component, as an optional component.

The above-described "main component" means that the used amount (content) of the (meth)acrylic acid (salt) is preferably 50 mol % to 100 mol %, more preferably 70 mol % to 100 mol %, even more preferably 90 mol % to 100 mol %, and particularly preferably substantially 100 mol % relative to the amount of the entire monomer used for polymerization.

Here, the poly(meth)acrylic acid (salt) may be a unneutralized poly(meth)acrylic acid (salt), but is preferably a poly(meth)acrylic acid (salt) that is partially or completely neutralized, more preferably a monovalent salt, even more preferably an alkaline metal salt or ammonium salt, even more particularly preferably an alkaline metal salt, and particularly preferably a sodium salt.

[1-4] Definition of Evaluation Method

"EDANA" is an abbreviation for the European Disposables and Nonwovens Associations. Further, "ERT" is an abbreviation for EDANA Recommended Test Methods, and is a European standard defining a measurement method of a water-absorbent resin. In the present invention, the physical properties of the water-absorbent resinare measured in accordance with the ERT original (revised in 2002) unless otherwise specified. Regarding the evaluation method not described in the ERT original (revised in 2002), measurement is performed by the methods and conditions described in the examples.

[1-4-1] "CRC" (ERT441.2-02)

"CRC" is an abbreviation for Centrifuge Retention Capacity, and means the water absorption capacity without pressure of the water-absorbent resin (hereinafter, may be referred to as "water absorption capacity"). Specifically, the CRC is the water absorption capacity (unit: g/g) obtained after 0.2 g of a water-absorbent resin is placed in a non-woven fabric bag, immersed in a large excess of a 0.9% by mass sodium chloride aqueous solution for 30 minutes to be freely swollen, and then drained using a centrifuge (250 G) for 3 minutes. Note that for the hydrogel after polymerization and/or after gel crushing, the CRC is determined by using 0.4 g of a hydrogel, changing the measurement time to 24 hours, and correcting the solid content.

[1-4-2] "Ext" (ERT470.2-02)

"Ext" is an abbreviation for Extractables, and means the water-soluble component of the water-absorbent resin (amount of water-soluble polymer in the water-absorbent resin). Specifically, the Ext is the amount of substance dissolved in an aqueous solution (unit: % by mass) after adding 1.0 g of a water-absorbent resin to 200 ml of a 0.9% by mass sodium chloride aqueous solution and stirring the mixture at 500 rpm for 16 hours. The pH titration is used for the measurement of the water-soluble component. Note that for the hydrogel after polymerization and/or after gel crushing, the Ext is determined by using 2.0 g of a hydrogel and calculating % by mass of the water-soluble component per solid content.

[1-4-3] "Moisture Content" (ERT430.2-02)

The "moisture content" means the moisture content of the water-absorbent resin defined by the drying loss. Specifically, the moisture content means the value calculated from the drying loss (unit; % by mass) when 4.0 g of a water-absorbent resin is dried at 105° C. for 3 hours. Note that in the present invention, the moisture content of the water-absorbent resin after drying is defined by the drying loss resulting from drying 1.0 g of a water-absorbent resin at 180° C. for 3 hours, and the moisture content of the hydrogel before drying is defined by the drying loss resulting from drying 2.0 g of a hydrogel at 180° C. for 24 hours.

[1-4-4] "PSD" (ERT 420.2-02)

"PSD" is an abbreviation for Particle Size Distribution, and means the particle size distribution of the water-absorbent resin measured by sieve classification. Note that the mass average particle diameter (D50) and the logarithmic standard deviation (σζ) of the particle size distribution are measured by a method similar to that described in the columns 27 to 28, (3) Mass Average Particle Diameter (D50) and Logarithmic Standard Deviation of the Particle Size Distribution in U.S. Pat. No. 7,638,570 by using a vibration classifier (power source: 60 Hz). Note that in the present invention, the particle size distribution (PSD) of the particulate hydrogel is defined by the wet sieve classification by the method described later. Further, the particle diameter (μm) of the particulate hydrogel in terms of solid content is defined by the particle diameter (μm) and solid content ratio (% by mass) of the particulate hydrogel by the calculation method described later.

[1-4-5] "AAP" (ERT442.2-02)

"AAP" is an abbreviation for Absorption Against Pressure, and means the water absorption capacity under pressure of the water-absorbent resin. Specifically, the AAP refers to the water absorption capacity (unit; g/g) after 0.9 g of a water-absorbent resin is allowed to be swollen in a large excess of a 0.9% by mass sodium chloride aqueous solution for 1 hour under a load of 2.06 kPa (21 g/cm$^2$, 0.3 psi). In the present specification, the AAP is defined as the value measured by changing the load condition to 4.83 kPa (corresponding to about 49 g/cm$^2$, about 0.7 psi).

[1-4-6] "Residual Monomers" (ERT410.2-02)

"Residual Monomers" means the proportion (unit; ppm) of the mass of monomers remaining in the water-absorbent resin (hereinafter, referred to as "residual monomer") to the mass of the water-absorbent resin. Specifically, it is determined by adding 1.0 g of a water-absorbent resin to 200 ml of a 0.9% by mass sodium chloride aqueous solution, stirring the mixture for 1 hour, and measuring the amount of eluted monomers by using high performance liquid chromatography. Note that the residual monomer of the hydrogel is the proportion (unit; % by mass) of the mass of the residual monomers obtained by performing an operation for stopping polymerization such as forcibly cooling as necessary and then performing measurement by the method described later to the mass of the resin solid content of the hydrogel.

[1-4-7] "Vortex"

"Vortex" in the present invention is an indicator representing the water absorption rate of the water-absorbent resin, and means the time (unit; second) taken for 2 g of a water-absorbent resin absorbing 50 ml of a 0.9% by mass sodium chloride aqueous solution to a predetermined state.

[1-5] Others

In the present specification, "X to Y" indicating a range means "X or more and Y or less". The unit of mass, "t (ton)" means "metric ton", and "ppm," means "ppm by mass" or "ppm by weight" unless otherwise specified. Further, "mass" and "weight", "part(s) by mass" and "part(s) by weight", and "% by mass" and "% by weight" are synonymous with each other. The expression "-acid (salt)" means "-acid and/or a salt thereof", and "(meth)acryl" means "acryl and/or methacryl".

[2] Method of Producing Water-Absorbent Resin Powder

The production method according to the present invention includes a drying step of drying a particulate hydrogel crosslinked polymer which is obtained using an acid group-containing unsaturated monomer as a main component to obtain a dried polymer, and a fine powder granulation step of adding a binder and an adhesion controlling agent to fine powder formed of a water absorbent resin to obtain a fine powder granulated product, in which the resulting fine powder granulated product is recovered in the drying step or any of steps before the drying step to produce a water-absorbent resin powder.

FIG. 1 is a flow chart for explaining the production method according to an embodiment of the present invention. This production method includes, in addition to the drying step and fine powder granulation step, a polymerization step, a gel crushing step (performed at the same time as polymerization or performed separately), a surface crosslinking step (performed at the same time as drying or performed separately), a sizing step (performed after drying and/or after surface crosslinking), a cooling step, and a fine powder recovering step. The production method can further includes various publicly known steps such as a preparation step of an aqueous monomer solution, and an adding step of various additives according to purpose. As described later, the production method of the present invention is not limited to FIG. 1, and at least a part of steps after the drying step in FIG. 1 may be simplified or omitted. The flow chart of the simplified production process is shown in FIG. 2. Details of FIG. 2 will be described later.

Hereinafter, each step will be described in detail with reference to the drawings as appropriate.

[2-1] Preparation Step of Aqueous Monomer Solution

This step is a step of preparing an aqueous solution containing an acid group-containing unsaturated monomer as a main component (hereinafter, referred to as "aqueous monomer solution"). A slurry solution of a monomer (dispersion having a concentration exceeding the saturation concentration of the monomer) can be used in a range that the water absorption performance of the resulting water-absorbent resin is not deteriorated. In this section, the case of using an aqueous monomer solution will be described for the sake of convenience.

The "main component" refers to the used amount (content) of the acid group-containing unsaturated monomer being normally 50 mol % or more, preferably 70 mol % or more, and more preferably 90 mol % or more (upper limit is 100 mol %) relative to the amount of the entire monomer to be subjected to polymerization reaction of the water-absorbent resin (excluding an internal crosslinking agent).

(Acid Group-Containing Unsaturated Monomer)

The acid group defined in the present invention is not particularly limited, and examples thereof include a carboxyl group, a sulfone group, and a phosphate group. Examples of the acid group-containing unsaturated monomer include (meth)acrylic acid, maleic anhydride, itaconic acid, cinnamic acid, vinylsulfonic acid, allyl toluene sulfonic acid, vinyl toluene sulfonic acid, styrene sulfonic acid, 2-(meth)acrylamide-2-methylpropane sulfonic acid, 2-(meth)acryloylethane sulfonic acid, 2-(meth)acryloylpropanesulfonic acid, and 2-hydroxyethyl (meth)acryloyl phosphate. From the viewpoint of the water absorption performance, the acid group-containing unsaturated monomer is preferably (meth)acrylic acid, maleic anhydride, itaconic acid, and cinnamic acid, and more preferably (meth)acrylic acid.

(Monomer Other than Acid Group-Containing Unsaturated Monomer)

The monomer other than the acid group-containing unsaturated monomer only needs to be any compound that can be polymerized into a water-absorbent resin. Examples of the monomer include amide group-containing unsaturated monomers such as (meth)acrylamide, N-ethyl (meth)acrylamide, and N,N-dimethyl (meth)acrylamide; amino group-containing unsaturated monomers such as N,N-dimethylaminoethyl (meth)acrylate, N,N-dimethylaminopropyl (meth)acrylate, and N,N-dimethylaminopropyl (meth)acrylamide; mercapto group-containing unsaturated monomers; phenolic hydroxy group-containing unsaturated monomers; and lactam group-containing unsaturated monomers such as N-vinylpyrrolidone.

(Polymerization Inhibitor)

The monomer used for polymerization preferably contains a small amount of polymerization inhibitor in view of polymerization stability. A preferred polymerization inhibitor is p-methoxyphenol. The amount of the polymerization inhibitor contained in the monomer (particularly, acrylic acid and a salt thereof) is normally 1 ppm to 250 ppm, preferably 10 ppm to 160 ppm, and more preferably 20 ppm to 80 ppm.

(Neutralization Salt)

In the present invention, a neutralization salt can be used in which a part or all of the acid groups contained in the acid group-containing unsaturated monomer is neutralized. In this case, the salt of the acid group-containing unsaturated monomer is preferably a salt with a monovalent cation, more preferably at least one type selected from an alkaline metal salt, an ammonium salt, an amine salt, still more preferably an alkaline metal salt, even more preferably at least one type selected from a sodium salt, a lithium salt, and a potassium salt, and particularly preferably a sodium salt.

(Basic Substance)

A neutralizing agent used for neutralizing the acid group-containing unsaturated monomer is not particularly limited. Inorganic salts such as sodium hydroxide, potassium hydroxide, sodium carbonate, and ammonium carbonate, and basic substances such as an amine-based organic compound having an amino group or an imino group are appropriately selected and used. As the neutralizing agent, two or more types of basic substances may be used in combination. Note that the monomer in the present invention is a concept including a neutralization salt unless otherwise specified.

(Neutralization Ratio)

From the viewpoint of the water absorption performance, the number of moles of the neutralization salt relative to the total number of moles of the acid group-containing unsaturated monomer and the neutralization salt thereof (hereinafter, referred to as "neutralization ratio") is preferably 40 mol % or more, more preferably 40 mol % to 80 mol %, even more preferably 45 mol % to 78 mol %, and particularly preferably 50 mol % to 75 mol %.

Examples of a method of preparing the neutralization ratio include a method of mixing an acid group-containing unsaturated monomer and a neutralization salt thereof; a method of adding a publicly known neutralizing agent to an acid group-containing unsaturated monomer; and a method of using a partially neutralized salt of an acid group-containing unsaturated monomer which is adjusted to a predetermined neutralization ratio in advance (that is, a mixture of an acid group-containing unsaturated monomer and a neutralization salt thereof). The preparation method may be a combination of these methods.

The adjustment of the neutralization ratio may be performed before the start of the polymerization reaction of the acid group-containing unsaturated monomer, may be performed during the polymerization reaction of the acid group-containing unsaturated monomer, or may be performed on a hydrogel crosslinked polymer obtained after polymerization reaction of the acid group-containing unsaturated monomer. Further, the neutralization ratio may be adjusted by selecting any one of stages before the start of the polymerization reaction, during the polymerization reaction, or after the end of the polymerization reaction, or may be adjusted at a plurality of stages. Note that in application for absorbent articles that can be in direct contact with the human body, such as paper diapers, the neutralization ratio may be adjusted preferably before the start of the polymerization reaction and/or during the period of the polymerization reaction, more preferably before the start of the polymerization reaction.

(Internal Crosslinking Agent)

In the method of producing the water-absorbent resin powder, an internal crosslinking agent is preferably used. The internal crosslinking agent adjusts the water absorption performance of the resulting water-absorbent resin, gel strength during water absorption and the like.

As the internal crosslinking agent, those having a total of two or more unsaturated bonds or reactive functional groups in one molecule may be used. Examples of the internal crosslinking agent having a plurality of polymerizable unsaturated groups (that can be copolymerized with a monomer) in the molecule include N,N'-methylene bis(meth)acrylamide, (poly)ethylene glycol di(meth)acrylate, (poly)propylene glycol di(meth)acrylate, trimethylolpropane tri(meth)acrylate, glycerin (meth)acrylate, glycerin acrylate methacrylate, ethylene oxide-modified trimethylolpropane tri(meth)acrylate, pentaerythritol hexa(meth)acrylate, triallyl cyanurate, triallyl isocyanurate, and triallyl phosphate. Examples of the internal crosslinking agent having a plurality of reactive functional groups (that can be reacted with a functional group of a monomer (for example, a carboxy group) in the molecule include triallylamine, polyallyloxyalkane, (poly)ethylene glycol diglycidyl ether, glycerol diglycidyl ether, ethylene glycol, polyethylene glycol, propylene glycol, glycerin, 1,4-butanediol, pentaerythritol, ethylene diamine, ethylene carbonate, propylenecarbonate, and polyethyleneimine (here, cyclic carbonates such as ethylene carbonate are a crosslinking agent that further generates an OH functional group through a reaction with a carboxyl group). Examples of the internal crosslinking agent having a polymerizable unsaturated group and a reactive functional group in the molecule include glycidyl (meth)acrylate. Two or more types of them may be used in combination.

Among these internal crosslinking agents, in view of the effect of the present invention, the internal crosslinking agent is preferably a compound having a plurality of polymerizable unsaturated groups in the molecule, more preferably a compound having a (poly)alkylene structural unit in the molecule, even more preferably a compound having a polyethylene glycol structural unit, and particularly preferably an acrylate compound having a polyethylene glycol structural unit. The hydrogel obtained by using these internal crosslinking agents has low water absorption capacity at early phase of drying and has low adhesiveness. This hydrogel having low adhesiveness is subjected to stirring drying, fusion or aggregation during drying can be reduced, which is preferable. Further, a hydrogel obtained by using these internal crosslinking agents can provide an effect of facilitating improvement of the water absorption capacity by drying.

The used amount of the internal crosslinking agent is appropriately set according to the type of monomer and internal crosslinking agent or the like. From the viewpoint of the gel strength of the resulting water-absorbent resin, the used amount of the internal crosslinking agent is preferably 0.001 mol % or more, more preferably 0.005 mol % or more, and even more preferably 0.01 mol % or more relative to the amount of the monomer. From the viewpoint of improving the water absorption performance of the water-absorbent resin, the used amount of the internal crosslinking agent is preferably 5 mol % or less, and more preferably 2 mol % or less. Note that in the polymerization condition where the self-crosslinking reaction of the monomer is effective, the internal crosslinking agent does not have to be used.

(Other Substances)

In the production method according to the present invention, substances whose examples will be described below (hereinafter, referred to as "other substances") can be added to the aqueous monomer solution in a range that an object of the present invention can be achieved.

Specific examples of the other substances include chain transfer agents such as thiols, thiolic acids, secondary alcohols, amines, and hypophosphites; foaming agents such as carbonates, bicarbonates, azo compounds, and air bubbles; chelate agents such ethylenediamine tetra(methylenephosphinic acid) and a metal salt thereof, ethylenediamine tetraacetic acid and a metal salt thereof, and diethylenetriamine pentaacetic acid and a metal salt thereof, hydrophilic polymers such as polyacrylic acid (salt) and a crosslinked product thereof (for example, fine powder formed of a water-absorbent resin), starch, cellulose, starch-cellulose derivatives, and polyvinyl alcohol. The other substances may be used alone, or two or more types thereof may be used in combination.

The used amount of the other substances is not particularly limited, and the total concentration of the other substances is preferably 10% by mass or less, more preferably 0.001% by mass to 5% by mass, and particularly preferably 0.01% by mass to 1% by mass relative to the monomer. In a case where the fine powder granulated product described later is recovered in this step, the amount thereof is preferably 30% by mass or less relative to the amount of the monomer. Note that the fine powder granulated product recovered in this step may be those which are not surface-crosslinked, or may be those which are surface-crosslinked.

(Monomer Concentration in Aqueous Monomer Solution)

In this step, the concentration of the monomer in the aqueous monomer solution (=total amount of monomer/(total amount of monomer+total amount of polymerization solvent (normally, water))) is preferably 10% by mass to 90% by mass, more preferably 20% by mass to 80% by mass, even more preferably 30% by mass to 70% by mass, and particularly preferably 40% by mass to 60% by mass from the viewpoint of the physical properties and productivity of the water-absorbent resin. Hereinafter, the concentration of the monomer may be referred to as "monomer concentration".

(Polymerization Initiator)

The polymerization initiator used in the present invention is appropriately selected according to the polymerization form or the like, and thus is not particularly limited. Examples of the polymerization initiator include a thermally degradable type polymerization initiator, a photodegradable type polymerization initiator, or a combination thereof, or a redox initiator that uses a reducing agent for promoting degradation of a polymerization initiator in combination. Specifically, one type or two or more types are used among the polymerization initiators disclosed in U.S. Pat. No. 7,265,190. Note that from the viewpoint of the handleability of the polymerization initiator and the physical properties of the water-absorbent resin, preferably, peroxides or azo compounds, more preferably, peroxides, and even more preferably, persulfates are used.

The used amount of the polymerization initiator is preferably 0.001 mol % to 1 mol %, more preferably 0.001 mol % to 0.5 mol % relative to the amount of the monomer. Further, in a case where redox polymerization is performed as necessary, the used amount of the reducing agent used in combination with an oxidizing agent is preferably 0.0001 mol % to 0.02 mol % relative to the amount of the monomer.

(Amount of Dissolved Oxygen)

Note that it is also preferred that the amount of dissolved oxygen in an aqueous monomer solution before polymerization is reduced by temperature elevation or purge with an inert gas. For example, the amount of dissolved oxygen is reduced to preferably 5 ppm or less, more preferably 3 ppm or less, and particularly preferably 1 ppm or less.

Air bubbles may also be dispersed in the aqueous monomer solution (particularly, the above-described inert gas). In this case, foaming polymerization is performed in polymerization reaction.

[2-2] Polymerization Step

This step is a step of polymerizing the aqueous monomer solution to obtain a hydrogel crosslinked polymer (hereinafter, may be referred to as "hydrogel").

Note that in addition to the method of adding the polymerization initiator to perform polymerization reaction, there is a method of performing irradiation with active energy rays such as radiation rays, electron beams, and ultraviolet rays. After addition of the polymerization initiator, irradiation with active energy rays may also be employed in combination.

(Polymerization Form)

The polymerization form is not particularly limited. From the viewpoint of the water absorption performance, ease of controlling polymerization or the like, preferably, droplet polymerization in a gas phase, aqueous solution polymerization, and reverse phase suspension polymerization (herein, liquid droplet polymerization in a hydrophobic organic solvent is included in reverse phase suspension polymerization as an example) are exemplified as the polymerization form; more preferably, aqueous solution polymerization, and reverse phase suspension polymerization are exemplified as the polymerization form; even more preferably, aqueous solution polymerization is exemplified as the polymerization form. Among them, continuous aqueous solution polymerization is particularly preferable. Examples thereof include continuous belt polymerization, and continuous kneader polymerization. Employing continuous aqueous solution polymerization results in improved production efficiency of the water-absorbent resin.

A preferred form of the continuous aqueous solution polymerization includes "high-temperature initiation polymerization", and "high-concentration polymerization". The "high-temperature initiation polymerization" refers to a polymerization form in which polymerization is started when the temperature of the aqueous monomer solution is preferably 30° C. or more, more preferably 35° C. or more, even more preferably 40° C. or more, and particularly preferably 50° C. or more (the upper limit is the boiling point). The "high concentration polymerization" refers to a polymerization form in which polymerization is performed at a monomer concentration of preferably 30% by mass or more, more preferably 35% by mass or more, even more preferably 40% by mass or more, and particularly preferably 45% by mass or more (the upper limit is the saturation concentration). These polymerization forms can be used in combination.

Note that in the droplet polymerization in a gas phase, polymerization can be performed in the air atmosphere. However, from the viewpoint of the color tone of the resulting water-absorbent resin, polymerization is preferably performed in an atmosphere of an inert gas such as nitrogen, argon, or the like. In this case, for example, the oxygen concentration in a gas phase is preferably controlled to 1 vol % or less.

(Polymerization Ratio of Hydrogel)

The polymerization ratio of the hydrogel crosslinked polymer obtained in the polymerization step is preferably 90% by mass or more, more preferably 95% by mass or more, even more preferably 98% by mass or more, and particularly preferably 99% by mass or more from the viewpoint of suppressing aggregation during drying of a particulate hydrogel crosslinked polymer obtained in the next gel crushing step and reducing the amount of residual monomer in the resulting water-absorbent resin. When a hydrogel having a low polymerization ratio is crushed after the polymerization step, and the drying step is then performed in a state where the crushed gel contains a large amount of unreacted monomers, polymerization reaction proceeds during drying step. This causes regeneration or formation of by-products of gel particles having a large particle diameter derived from gel particles having a small particle diameter in some cases. Also in an embodiment in which gel crushing is performed at the same time as polymerization, a large amount of unreacted monomers contained in the crushed gel particles are polymerized during drying to bond the crushed gel particles. As a result, gel particles having a large particle diameter are regenerated or formed as a by-product during drying in some cases. Moreover, in a case where a fine powder granulated product described later is recovered in the gel crushing step or polymerization step, increase in the particle size due to adhesion of the fine powder granulated product and hydrogel particles having a low polymerization ratio may occur. Such gel particles having a large particle diameter causes problems such as decrease in the water absorption rate of the resulting water-absorbent resin, increase in the particle size of a dried product, generation of fine powder due to re-crushing for obtaining a desired product particle size, and the like. To avoid these problems, it is preferred to set the polymerization ratio of the hydrogel to the above-described range.

The upper limit of the polymerization ratio of the hydrogel is not particularly limited, and is ideally 100% by mass. However, a high polymerization ratio requires long polymerization time and severe polymerization conditions, and thus causes deterioration of the productivity or physical properties. Therefore, an upper limit of the polymerization ratio of 99.95% by mass, further, 99.9% by mass, and normally about 99.8% by mass is sufficient. A representative polymerization ratio is 98 to 99.99% by mass.

(Physical Properties of Hydrogel)

The CRC (centrifuge retention capacity) of the hydrogel crosslinked polymer obtained in the polymerization step is preferably 5 g/g to 80 g/g, more preferably 10 g/g to 50 g/g, even more preferably 15 g/g to 45 g/g, and particularly preferably 20 g/g to 40 g/g in terms of solid content. Further, the water-soluble component of the hydrogel crosslinked polymer obtained in the polymerization step is preferably 1% by mass to 20% by mass, more preferably 2% by mass to 15% by mass, and even more preferably 3% by mass to 10% by mass in terms of solid content. Note that the expression "in terms of solid content" refers to the physical properties obtained by measuring various physical properties such as the CRC and water-soluble component of the hydrogel, and then converting the values of these physical properties into the values of the physical properties corresponding to the solid content of the water-absorbent resin in the hydrogel (for example, in the case of a hydrogel having a moisture content of 50% (solid content 50%), converted into a value of the measurement value of the physical properties for the hydrogel×2 times).

When the CRC and/or water-soluble component exceed the above-described range, the hydrogel particles crushed in the crushing step described later exhibit adhesiveness, resulting in deterioration of the flowability of the particulate hydrogel. This causes attachment of refined hydrogel particles, adhesion of recovered fine powder granulated products, or adhesion of hydrogel particles and fine powder granulated products, or the like, thus causing problems such as decrease in the water absorption rate, increase in the particle size of the dried product, and generation of fine powder due to re-crushing, which is not preferable. Further, when the CRC and/or water-soluble component are less than the above-described range, the water absorption capacity of the resulting water-absorbent resin exclusively decreases, or the control of polymerization conditions becomes difficult, which is not preferable.

[2-3] Gel Crushing Step

This step is a step of crushing the hydrogel crosslinked polymer obtained in the polymerization step at the same time as and/or after polymerization to obtain a particulate hydrogel crosslinked polymer (hereinafter, "particulate hydrogel"). For obtaining a particulate hydrogel having a predetermined particle diameter, this step may be performed two or more times. Further, in a case of reverse phase suspension polymerization or gas phase polymerization where a particulate hydrogel having a desired particle size can be obtained in the polymerization step, this step does not have to be performed. A fine cutting step of cutting or roughly crushing the hydrogel crosslinked polymer into a size that can be introduced into the gel crushing apparatus may also be performed as necessary by using a roller cutter, a guillotine cutter, or the like after the polymerization step and before the gel crushing step. In particular, in a case where the polymerization step is performed by belt polymerization, and a sheet-like or a block-like hydrogel is obtained, it is preferred to perform the fine cutting step. In a case of recovering the fine powder granulated product described later in the gel crushing step, the hydrogel crosslinked polymer and fine powder granulated product are introduced into the gel crushing apparatus sequentially or at the same time.

(Gel Crushing Apparatus)

In the production method of the present invention, the type of gel crushing apparatus is not particularly limited as long as a particulate hydrogel having a predetermined particle size can be obtained without impairing the water absorption performance. Examples of the gel crushing apparatus include a gel crusher including a plurality of rotational stirring blades such as a batch type or continuous type dual-arm type kneader, a single-screw extruder, a twin-screw extruder, and a meat chopper.

(Temperature of Hydrogel)

Preferably, the temperature T1 of the hydrogel crosslinked polymer before gel crushing is 50° C. or more. The temperature T1 is measured by a thermometer provided in a charging port of the gel crushing apparatus. By setting the temperature T1 to 50° C. or more, attachment of hydrogel particles that have been gel crushed is prevented. Further, in a case of recovering the fine powder granulated product described later to this step, adhesion of fine powder granulated products is prevented, or increase in the particle size due to adhesion of hydrogel particles and fine powder granulated products is suppressed. From this point of view, the temperature T1 is more preferably 60° C. or more, even more preferably 70° C. or more, and particularly preferably 80° C. or more. From the viewpoint of suppressing excessive drying, the temperature T1 is preferably 130° C. or less, more preferably 110° C. or less, and particularly preferably 105° C. or less.

(Solid Content Ratio of Hydrogel)

The solid content ratio of the hydrogel subjected to the gel crushing step (hereinafter, gel solid content ratio) is preferably 25% by mass or more. From the viewpoint of suppression of aggregation of hydrogel particles after gel crushing, prevention of adhesion of recovered fine powder granulated products, energy required for crushing, drying efficiency, and absorption performance, the gel solid content ratio is more preferably 25% by mass to 75% by mass, even more preferably 30% by mass to 70% by mass, still even more preferably 35% by mass to 65% by mass, and particularly preferably 40% by mass to 60% by mass. The gel solid content ratio is measured by the method descried in the examples described later.

(Gel Fluidizer)

In the production method according to the present invention, a gel fluidizer may be added before and/or during the gel crushing step. Addition of the gel fluidizer prevents attachment of hydrogel particles in the drying step described later or adhesion of hydrogel particles and recovered fine powder granulated products, and thus improves the water absorption rate of the resulting water-absorbent resin. Addition of the gel fluidizer also reduces a load in the crushing step after drying described later, and thus reduces the generation amount of fine powder. Further, in a case of performing stirring drying in the drying step, addition of the gel fluidizer provides an effect of providing a particulate dried polymer having a particle size close to the product particle size. Note that in an embodiment that does not require the gel crushing step, the above-described effect can be obtained by adding the gel fluidizer to the particulate hydrogel before the drying step.

Examples of the gel fluidizer include anionic surfactants, cationic surfactants, nonionic surfactants, and amphoteric surfactants, low molecular type and polymer type surfactants of these surfactants, and polymer lubricants. The polymer lubricant is another name of a specific nonionic surfactant, and examples thereof include polyalkylene oxides and maleic anhydride-modified products thereof. A surfactant (particularly, a non-polymer surfactant) and a polymer lubricant may also be used in combination. As the gel fluidizer, an adhesion controlling agent described later may also be used.

The type and added amount of the gel fluidizer is appropriately adjusted in consideration of the flowability of the particulate hydrogel in the gel crushing step and drying step, or the like. In a case of using a surfactant as a gel fluidizer, the added amount thereof is preferably 0.001% by mass to 0.5% by mass, more preferably 0.01% by mass to 0.3% by mass, and even more preferably 0.02% by mass to 0.2% by mass relative to the solid content of the hydrogel. In a case of using a surfactant (particularly, a non-polymer surfactant) and a polymer lubricant in combination, the total added amount thereof is preferably 1.0% by mass or less, more preferably 0.5% by mass or less, preferably 0.05% by mass or more, and particularly preferably 0.1% by mass or more.

(Moisture Content of Particulate Hydrogel)

The moisture content (%) of the particulate hydrogel is determined by the measurement method described in (h) of the examples described below (moisture content of hydrogel:180° C., drying loss for 24 hours). Further, the moisture content (%)=100-solid content (%). The moisture content of the particulate hydrogel is normally 15% by mass or more, preferably 25% by mass or more, even more preferably 30% by mass or more, still even more preferably 35% by mass or more, particularly preferably 40% by mass or more, and extremely preferably 43% by mass or more from the viewpoint of suppression of attachment of hydrogel particles in the drying step described later or prevention of adhesion of hydrogel particles and recovered fine powder granulated products, and the granulation strength. From the viewpoint of the drying efficiency and absorption performance, the moisture content of the particulate hydrogel is preferably 75% by mass or less, more preferably 60% by mass or less, and particularly preferably 55% by mass or less.

(Particle Size of Particulate Hydrogel)

From the viewpoint of the water absorption rate and particle diameter of the resulting water-absorbent resin, and suppression of generation of fine powder during crushing, the mass average particle diameter d1 of the particulate hydrogel crosslinked polymer before drying is preferably 800 μm or less, more preferably 500 μm or less, even more preferably 50 μm to 500 μm, still even more preferably 100 μm to 400 μm, particularly preferably 100 to 300 μm, and extremely preferably 100 to 200 μm in terms of solid content. Note that the mass average particle diameter d1 of the particulate hydrogel in terms of solid content is calculated by the method described in (i) of the examples described below (particle size of particulate hydrogel: wet classification of hydrogel) from the mass average particle diameter (D50) of the particulate hydrogel.

The amount of the particulate hydrogel having a particle size in a range of less than 150 μm is preferably 10% by mass or more, more preferably 25% by mass or more, and even more preferably 40% by mass or more in terms of solid content. The amount of the particulate hydrogel having a particle size in a range of less than 1,100 μm is preferably 80% by mass or more, more preferably 85% by mass or more, even more preferably 90% by mass or more, and particularly preferably 95% by mass or more in terms of solid content, and the upper limit thereof is 100% by mass. The logarithmic standard deviation (4 of the particle size distribution is preferably 0.2 to 1.0, more preferably 0.2 to 0.8, and even more preferably 0.2 to 0.7. A particulate hydrogel having such a particle diameter can provide a water absorbent resin powder having higher water absorption rate.

(Physical Properties of Particulate Hydrogel)

The CRC (centrifuge retention capacity) of the particulate hydrogel before drying is preferably 5 g/g to 80 g/g, more preferably 10 g/g to 50 g/g, even more preferably 15 g/g to 45 g/g, and particularly preferably 20 g/g to 40 g/g in terms of solid content (defined by the measurement method described later). The water-soluble component (Ext) of the particulate hydrogel before drying is preferably 1% by mass to 15% by mass, more preferably 2% by mass to 10% by mass, and even more preferably 3% by mass to 5% by mass in terms of solid content (defined by the measurement method described later). In a case where the CRC and/or water-soluble component of the particulate hydrogel exceeds the above-described range, adhesion of hydrogel particles or adhesion of hydrogel particles and recovered fine powder granulated products proceeds particularly during stirring drying, which is not preferable. Further, when the CRC and/or water-soluble component are less than the above-described range, the water absorption capacity of the resulting water-absorbent resin exclusively decreases, or the control of polymerization conditions becomes difficult, which is not preferable.

[2-4] Drying Step

This step is a step of drying the particulate hydrogel (preferably, the particulate hydrogel containing a gel fluidizer) to a desired moisture content to obtain a dried polymer, preferably a particulate dried polymer. In the production method according to the present invention, a fine powder granulated product described later is recovered in this drying step or any of steps before the drying step. Accordingly, this step is, specifically, a step of drying a mixture of the particulate hydrogel (preferably, the particulate hydrogel containing a gel fluidizer) and the fine powder granulated product to a desired moisture content. Note that the particulate hydrogel to be subjected to this step is not limited to a particulate hydrogel that has been subjected to the gel crushing step, and may be a particulate hydrogel obtained through reverse phase suspension polymerization, for example. Further, the (particulate) dried polymer obtained in this step may contain a granulated product that is formed by physical or chemical attachment of a plurality of particles (hereinafter, a dried granulated product).
(Temperature of Particulate Hydrogel)

From the viewpoint of preventing increase in the particle size due to adhesion of particulate hydrogels and fine powder granulated products, the temperature T2 of the particulate hydrogel subjected to the drying step is controlled to preferably 50° C. or more, more preferably 60° C. or more, even more preferably 70° C. or more, particularly preferably 80° C. or more, and most preferably 90° C. or more. Further, from the viewpoint of coloring of an object to be dried and suppressing deterioration of performance, the temperature T2 is preferably 130° C. or less, more preferably 110° C. or less, and even more preferably 105° C. or less. The temperature T2 is typically measured at a center portion (for example, in a case where the thickness of the material is 10 cm, a position around 5 cm) of the material layer (particulate hydrogel or dried product) by using a contact thermometer.

The drying method in the drying step of the present invention is not particularly limited, and static drying, stirring drying, fluidized bed drying, or the like is appropriately employed. Further, various drying methods such as heat drying, hot-air drying, drying under reduced pressure, infrared drying, microwave drying, drum dryer drying, azeotropic dehydration drying with a hydrophobic organic solvent, and high-humidity drying utilizing high-temperature water vapor can be employed. From the viewpoint of drying efficiency, heat drying or hot-air drying is preferable, and stirring heat drying and/or fluidized bed drying in which drying is performed while moving an object to be dried is more preferable.
(Drying Apparatus)

The heating method in the drying apparatus used in the drying step is not particularly limited. One or two or more types of a heat transfer type dryer, a radiation heat transfer type dryer, a hot-air heat transfer type dryer, a dielectric heating type dryer, and like are appropriately selected. The drying apparatus may be a batch type or a continuous type. The drying apparatus may also be a direct heating type, or an indirect heating type. Examples include heat transfer type dryers including a ventilation band type, a ventilation circuit type, a ventilation vertical type, a parallel flow band type, a ventilation tunnel type, a ventilation stirring type, a ventilation rotary type, a fluidized-bed type, and an air jet type.

In a case of a band type dryer in which drying is performed in a static state, a large agglomerated or block-like dried product is obtained. When such a dried product is crushed and processed into a particulate product particle size (for example, 850 to 150 μm), a large amount of fine powder (particularly, less than 150 μm) is generated in some cases. On the other hand, when a stirring dryer equipped with a fluidizing means that fluidizes an object to be dried in the dryer (for example, rotation of the stirring blade provided in the dryer, or rotation of the dryer itself) and one or two or more heating means is used, a particulate dried product (hereinafter, may be referred to as a particulate dried polymer) can be obtained, which is preferable, and a continuous stirring dryer is more preferable.

The heating means is not particularly limited. From the viewpoint of the drying efficiency and reduction in thermal damage on the water-absorbent resin, a heating means that utilizes direct heat transfer through convection heat transfer and/or indirect heat transfer through heat conduction from a heating surface (contact surface with an object to be dried) of the dryer heated by a heat medium is preferable. A more preferred heating means is a ventilation heating type in direct heat transfer, and an outer wall heating type and a tubular heating type in indirect heat transfer.

The stirring method and stirring form are not particularly limited. It is only required to be a form in which the particulate hydrogel and fine powder granulated product in the drying apparatus are fluidized by a stirring means such as a stirring blade, a rotating cylinder, or the like. In the present specification, a dryer which performs stirring by rotation of a cylindrical container for containing an object to be dried, that is, a dryer whose stirring means is a rotating cylinder is referred to as a rotary type dryer. In the production method according to the present invention, examples of the rotary type dryer include a rotary dryer, a rotary kiln, and a tube dryer. As a continuous stirring dryer which is not classified into the rotary type dryer, a single-shaft or twin-shaft disc type dryer, and a single-shaft or twin-shaft paddle type dryer are exemplified. Specific examples of the continuous stirring dryer which is not the rotary type dryer include Solidaire (manufactured by Hosokawa Micron Corporation), a CD dryer (manufactured by Kurimoto, Ltd.), and a paddle dryer (manufactured by Nara Machinery Co., Ltd.). Specific examples of the rotary type dryer that can be used include a steam tuber dryer (manufactured by Kurimoto, Ltd.), a steam tuber dryer (manufactured by Ube Machinery Corporation, Ltd.), a steam tuber dryer (manufactured by Tsukishima Kikai Co., Ltd,), a steam tuber dryer (manufactured by Mitsui Engineering & Shipbuilding Co., Ltd.), a rotary kiln (manufactured by Kurimoto, Ltd.), and a rotary dryer (manufactured by Okawara Mfg. Co., Ltd.).

From the viewpoint of reducing mechanical damage on an object to be dried, a preferred drying apparatus is a rotary type dryer (dryer having a rotating container which contains an object to be dried and rotates (further, a cylindrical container, in particular, a transverse cylindrical container such as a rotary drum)). From the viewpoint of reducing thermal and mechanical damage, the rotary type dryer is more preferably a rotary type dryer having one or two or more heating means selected from a ventilation heating type in direct heat transfer, and an outer wall heating type and a tubular heating type in indirect heat transfer. Further, among the rotary type dryers, in a case of heating with only a ventilation heating type such as a rotary kiln, a problem such as scattering of dried products due to ventilation and generation of a large amount of waste gas may occur, for example. Accordingly, as a rotary type dryer, one or two or more heating means selected from the outer wall heating type and the tubular heating type are preferable in the indirect heat transfer. Further, the tubular heating type, which employs a plurality of heating tubes to increase the heat transfer area in the interior of the dryer, enables efficient drying and thus is more preferable. Examples of such a rotary type dryer include a rotary type dryer equipped with heating tubes.

For example, the rotary type dryer equipped with heating tubes includes, in the interior thereof, a rotating container which contains an object to be dried and rotates (particularly, a cylindrical container, and further, a transverse cylindrical container) and a plurality of heating tubes which are located inside the rotating container, extend in the axial direction of the rotating container, and rotate together with the rotating container. In this rotary type dryer, an object to be dried is fluidized in the container by, mainly rotation of the rotating container and an action of a plurality of heating tubes rotating together with this rotating container, and thus mechanical and thermal damage are small. This suppresses generation of fine powder and deterioration of the physical properties in the drying step. Further, in this dryer, since drying is performed by indirect heat transfer from the heating tubes, there is an advantage of eliminating scattering due to hot-air drying (ventilation band type dryer or ventilation heating type rotary kiln) and a large amount of waste gas treatment. Moreover, with this dryer, the heat transfer area inside the dryer can be increased by increasing the number of heating tubes. A large heat transfer area allows drying in a short time and reduces residence time inside the apparatus, and thus thermal damage is further reduced.

The rotary type dryer preferably includes a heating means or a temperature retention means in an outer peripheral surface of the rotating container. In this dryer, a mixture of the particulate hydrogel and fine powder granulated product contained in the container is heated by contact with a plurality of heating tubes or heat conduction from the heating tubes through rotation of the rotating container. The inner surface of the rotating container is heated by radiation heat or the like of a plurality of heating tubes. Further, the inner wall is also heated as necessary by a heating means or temperature retention means located in the outer peripheral surface of the rotating container. Thereby, the drying time of the mixture is reduced by heat conduction form the inner wall.

Preferably, the rotary type dryer includes, in the interior of the rotating container, an adding means for adding an additive to the contents contained in the rotating container. Examples of the adding means include a spraying apparatus. With the rotary type dryer having an adding means, it is also possible to add and mix a surface additive as an additive to the mixture of the particulate hydrogel and fine powder granulated product contained in the rotating container, and heat-treat and dry them by contact with a plurality of heating tubes or heat conduction. In this case, the surface crosslinking step described later and the drying step are performed in one step, and thus the production efficiency is improved.

The rotary type dryer may include another fluidizing means for fluidizing the contents in addition to stirring of the contents by rotation of the rotating container as long as an object of the present invention is not inhibited. Examples of the other fluidizing means include a scooping plate, a stirring blade, or the like provided in the interior of the rotating container.

The number of dryers that can be used in the drying step may be only one, or may be two or more as long as an object of the present invention is achieved. A plurality of dryers having different specifications may be used in combination. For example, the above-described rotary type dryer may be used in combination with another stirring dryer which is not classified into the rotary type dryer, a band dryer which is classified into a material transfer type, or the like. At least one stirring dryer is preferably included, but the type and number of dryers to be combined is not limited.

In the drying step, a dryer having a function of introducing gas into the interior of the dryer (preferably, a means for introducing and discharging gas) is preferably used. As a means for introducing and discharging gas, an introducing port and a discharging port for gas are exemplified. The gas acts as a carrier gas, and promotes drying through discharging of water vapor or the like generated during drying to the outside of the apparatus. Further, in a case of using heated gas, the gas also acts as a heat medium and further promotes drying. Preferably, nitrogen, water vapor, and a mixed gas of these gases and air, or the like are used. In a case of using a mixed gas containing water vapor (hereinafter, also referred to as "high-humidity mixed gas"), the interior of the apparatus is brought into a low oxygen state, and thus oxidization and deterioration during drying is suppressed. As a result, the improvement of performance and low coloring of the water-absorbent resin can be achieved. Further, use of such a mixed gas enables suppression of aggregation and agglomeration of the particulate hydrogel and fine powder granulated product during drying, which is preferable.

In the drying step, a dryer having a function of bringing the interior thereof into a pressurized state, a normal pressure state, or a reduced pressure state may be used. In a case of bringing the interior of the dryer into a pressurized state, the interior pressure is adjusted by, for example, increasing the amount of a carrier gas to be introduced into the dryer. Preferably, the degree of pressurization relative to the atmospheric pressure is a minute pressure of more than 0 to 0.01 kPa. Further, in a case of bringing the interior of the dryer into a reduced pressure state, the interior pressure is adjusted by, for example, changing the suction amount of the discharge gas from the dryer (carrier gas to be introduced, water vapor generated during drying, or the like). The degree of pressure reduction relative to the atmospheric pressure is preferably more than 0 and 5 kPa or less, more preferably more than 0 to 2 kPa, and even more preferably 0.01 to 0.5 kPa. By setting the degree of pressure reduction to the above-described range, water vapor or the like generated during drying can be efficiently removed without excessively losing the amount of energy in the interior of the dryer, and thus drying time is reduced. Further, aggregation of the particulate hydrogel and fine powder granulated product in the drying step is suppressed. Note that "degree of pressurization relative to the atmospheric pressure" and "degree of pressure reduction relative to the atmospheric pressure" mean the pressure difference between the atmospheric pressure, and are denoted as the absolute value of the difference between the atmospheric pressure. For example, in a case where the atmospheric pressure is a standard atmospheric pressure (101.3 kPa), and the degree of pressure reduction relative to the atmospheric pressure is 10 kPa, the actual atmosphere is 91.3 kPa.

The atmospheric dew point of the interior of the dryer may be adjusted by introducing the above-described gas into the dryer from one point or a plurality of points in the drying step. It is preferred to appropriately adjust the atmospheric dew point according to, mainly, the moisture content of the particulate hydrogel to be introduced into the dryer. The atmospheric dew point is measured at the time of exhaust from the dryer, and is preferably 60° C. or more, more preferably 65° C. or more, and even more preferably 70° C. or more. The upper limit of the atmospheric dew point is not particularly limited, and is preferably 100° C. or less. By setting the dew point to the above-described range, drying is promoted, and the moisture content of the resulting (particulate) dried polymer is adjusted to a predetermined range, thus improving the water absorption performance.

The drying condition is appropriately selected according to the type of dryer, the moisture content of the particulate hydrogel, or the like. The drying temperature (material temperature or heat medium temperature) is preferably 100° C. to 300° C., more preferably 150° C. to 250° C., even more preferably 160° C. to 220° C., and particularly preferably 170° C. to 200° C. When the drying temperature is less than the above-described range, the drying time becomes excessively long, which is uneconomical. When the drying temperature is more than the above-described range, deterioration of the physical properties and considerable coloring of the resulting water-absorbent resin occur, which is not preferable. The drying time is preferably 1 minute to 10 hours, more preferably 5 minutes to 2 hours, even more preferably 10 minutes to 120 minutes, and particularly preferably 20 minutes to 60 minutes. When the drying time is less than the above-described range, the drying temperature needs to be set to excessively high, and this causes deterioration of the physical properties and considerable coloring of the water-absorbent resin, which is not preferable. When the drying time is more than the above-described range, the drying apparatus becomes large, and the processing amount is also decreased, which is uneconomical.

In the production method according to the present invention, in a case of where the drying apparatus is a rotary type dryer, the Froude number ($Fr=\omega^2*r/g$) is appropriately set according to the size of the apparatus or the amount of drying (the amount of drying per hour). The Froude number is in a range of preferably 0.001 to 1, more preferably 0.005 to 0.5, even more preferably 0.01 to 0.3, and particularly preferably 0.02 to 0.2 from the viewpoint of the drying efficiency. The Froude number Fr is the ratio of the centrifugal acceleration $\omega^2*r$ which acts on an object to be dried stirred in the rotating container to the gravity acceleration g. ($\omega$ is the angular velocity of the rotating body: rad/sec, and r is the representative radius of the rotating body: m)

Further, in a case of a stirring dryer having a stirring means for stirring an object to be dried by a rotating shaft equipped with stirring blade such as an arm, a vane, a paddle, a cutting disc (CD), and the like, the rotation speed of the rotating shaft is appropriately set according to the apparatus. The rotation speed is preferably set such that the Froude number Fr is within the above-described range. Specifically, the rotation speed is normally in a range of 1 rpm to 10,000 rpm, more preferably 5 to 500 rpm, and even more preferably 10 to 300 rpm.

Additionally, the peripheral speed (V) of the stirring blade defined by the following (Equation 1) is appropriately set according to the apparatus, and is normally 0.15 m/s to 25 m/s.

Peripheral speed $(V)(m/s) = 2\pi r \times n/60$ (Equation 1)

Here, in (Equation 1), V is the peripheral speed of the stirring blade (unit; m/s), r is the radius of the stirring blade (unit; m), and n is the rotation speed of the stirring blade per unit time (unit; rpm).

In a case of a rotary type stirrer in which a container for containing an object to be dried itself rotates, the rotation speed of the container is appropriately set according to the size of the apparatus or the amount to be dried (the amount of drying per hour). The rotation speed is preferably 1 rpm to 250 rpm, more preferably 1 rpm to 100 rpm, and even more preferably 2 rpm to 50 rpm. The maximum peripheral speed is not particularly limited, and is preferably 0.05 m/s to 10 m/s, more preferably 0.1 m/s to 8 m/s, and even more preferably 0.15 m/s to 5 m/s.

Further, the packing ratio in the rotary type dryer (the ratio of the packed volume of the contents ($m^3$) to the effective volume of the rotating container ($m^3$)) is appropriately selected. The packing ratio is in a range of preferably 5% to 95%, more preferably 6% to 50%, and even more preferably 10% to 40% in terms of the heat treatment efficiency.

Further, in a case of using the rotary type dryer, for efficiently performing heat transfer to the contents in the rotating container, the heat transfer area relative to the inner volume thereof is preferably large. The heat transfer area relative to the inner volume is defined as the ratio of the heat transfer area ($m^2$) to the effective volume of the rotating container ($m^3$)(heat transfer area/effective volume). As this ratio increases, the heat transfer efficiency is improved, and thus the temperature elevation rate of the contents becomes fast. As a result, the drying time is reduced, leading to reduced thermal and mechanical damage, and improved productivity. This ratio is appropriately set according to the specification and form of the dryer, the shape of the contents, and the like. The ratio is preferably 10 $m^{-1}$ or more, more preferably 12 $m^{-1}$, and even more preferably 15 $m^{-1}$ or more. Note that the effective volume is the inner volume of the rotating container in which the contents are contained. The heat transfer area means the area of the heating surface which can apply an amount of energy to the contents contained in the rotating container. Specifically, the heat transfer area is the sum of the area of the outer peripheral surface of a plurality of heating tubes and the area of the inner peripheral surface of the rotating container.

(Additive)

As the additive used in the drying step, a surface crosslinking agent (post-crosslinking agent) described later is exemplified in addition to the above-described gel fluidizer (a surfactant, a polymer lubricant, and the like). Addition of the surface crosslinking agent before drying, and further, in the middle of drying can reduce attachment during stirring drying and also further provides a general effect of surface crosslinking after drying (for example, improvement of the water absorption capacity under pressure), and thus provides an advantage of omitting the surface crosslinking step after the drying step.

(Physical Properties of Dried Polymer)

The water-soluble component (Ext) of the (particulate) dried polymer is preferably larger than the water-soluble component of the particulate hydrogel before drying. For the water-soluble component of the (particulate) dried polymer, the crosslinking density of the hydrogel (particularly, the type and amount of the internal crosslinking agent) and the condition for heating and drying are adjusted such that the water-soluble component of the (particulate) dried polymer increases, in terms of solid content, in a range of preferably +0.5% by mass or more, more preferably in a range of +1 to 20% by mass, and even more preferably in a range of +2 to 10% by mass.

By increasing the water-soluble component of the (particulate) dried polymer more than the particulate hydrogel, the water absorption capacity after drying is improved. Thereby, the attachment and aggregation during drying can be prevented, which is preferable. The amount of the water-soluble component of the resulting (particulate) dried polymer is preferably 50% by mass or less, more preferably 25% by mass or less, even more preferably 20% by mass or less, and particularly preferably 15% by mass or less.

[2-5] Surface Crosslinking Step

This step is a step of performing crosslinking reaction in a surface portion of particles formed of a water-absorbent resin (in a region approximately several ten μm in depth from the particle surface). Typically, this step includes a surface crosslinking agent adding step of adding a surface crosslinking agent that reacts with a functional group (particularly, a carboxyl group) of the water-absorbent resin to a particulate hydrogel or dried polymer, and a heat treatment step of heat-treating the particulate hydrogel or dried polymer containing the surface crosslinking agent, and preferably, a cooling step after the heat treatment step. Note that, if necessary, a sizing step which will be described later in [2-7] is performed after the drying step and before the surface crosslinking step to form a particulate dried polymer having a preferable particle size. For example, in a case where static drying is performed in the drying step, the resulting dried polymer contains a relatively large aggregate. Thus, it is preferable to perform the sizing step before the surface crosslinking step.

[2-5-1] Surface Crosslinking Agent Adding Step

This step is a step of adding a surface crosslinking agent to the particulate hydrogel and/or particulate dried polymer. The surface crosslinking agent is added to the particulate hydrogel before drying or in the middle of drying, or the particulate dried polymer after drying or after sizing. The particulate hydrogel and/or particulate dried polymer may contain a fine powder granulated product described later.

In a case where the particulate hydrogel obtained in the gel crushing step is subjected to the surface crosslinking step in the middle of drying, the moisture content of the particulate hydrogel at the time of addition of the surface crosslinking agent is in a range of preferably 10 to 50% by mass, more preferably 15 to 45% by mass, and even more preferably 20 to 40% by mass. Addition of the surface crosslinking agent in such a range reduces excessive aggregate and attachment during drying. Further, an effect of improving the absorption capacity under pressure obtained by performing the surface crosslinking step after the drying step is exhibited even when performing surface crosslinking at the same time as drying, which is preferable. In a case where surface crosslinking is performed at the same time as drying in this way, the surface crosslinking step and sizing step after the drying step can be omitted, and thus the production process can be significantly simplified. Further, generation of fine powder and breaking of the surface crosslinking structure derived from process damage on the water-absorbent resin in the surface crosslinking step and transport step which are separately required do not substantially occur, which is preferable.

Further, in a case where the surface crosslinking step is separately performed after the drying step, the solid content ratio of the (particulate) dried polymer at the time of addition of the surface crosslinking agent is preferably 80% by mass or more, more preferably 85% by mass to 99.8% by mass, even more preferably 90% by mass to 99.7% by mass, still even more preferably 92% by mass to 99.5% by mass, particularly preferably 96% by mass to 99.5% by mass, and extremely preferably 98% by mass to 99.5% by mass.

The temperature of the water-absorbent resin subjected to the surface crosslinking step after the drying step, that is, the temperature of the (particulate) dried polymer at the time of addition of the surface crosslinking agent is preferably 40 to 120° C., and more preferably 60 to 100° C. In a case where surface crosslinking is performed at the same time as drying, the temperature of the water-absorbent resin in the middle of drying, that is, the temperature of the particulate hydrogel at the time of addition of the surface crosslinking agent is in a range of preferably 70 to 150° C., and more preferably 80 to 130° C. This temperature is measured in the same manner as in the measurement of the gel temperature described in the drying step.

(Surface Crosslinking Agent)

As the surface crosslinking agent, a surface crosslinking agent that can react with a plurality of functional groups (preferably, a plurality of carboxyl groups) of the water-absorbent resin, preferably a surface crosslinking agent that can be covalently bonded or ionically bonded to the functional groups, and further, a surface crosslinking agent that can be covalently bonded to the functional groups are used. Specific examples of the surface crosslinking agent include polyhydric alcohol compounds such as ethylene glycol, diethylene glycol, propylene glycol, triethylene glycol, tetraethylene glycol, polyethylene glycol, 1,3-propanediol, dipropylene glycol, 2,2,4-trimethyl-1,3-pentanediol, polypropylene glycol, glycerin, polyglycerin, 2-butene-1,4-diol, 1,3-butanediol, 1,4-butanediol, 1,5-pentanediol, 1,6-hexanediol, 1,2-cyclohexane dimethanol, 1,2-cyclohexanol, trimethylol propane, diethanolamine, triethanolamine, polyoxypropylene, and an oxyethylene-oxypropylene block copolymer, pentaerythritol, and sorbitol; epoxy compounds such as ethylene glycol diglycidyl ether, polyethylene glycol diglycidyl ether, glycerol polyglycidyl ether, diglycerol polyglycidyl ether, polyglycerol polyglycidyl ether, propylene glycol diglycidyl ether, polypropylene glycol polyglycidyl ether, glycidol, sorbitol polyglycidyl ether, pentaerythritol polyglycidyl ether, trimethylolpropane polyglycidyl ether, neopentyl glycol diglycidyl ether, and 1,6-hexanediol diglycidyl ether; polyvalent amine compounds such as ethylene diamine, diethylene triamine, triethylene tetramine, tetraethylene pentamine, pentaethylene hexamine, and polyethyleneimine and inorganic salts or organic salts thereof; polyvalent isocyanate compounds such as 2,4-tolylene diisocyanate and hexamethylene diisocyanate; aziridine compounds such as polyaziridine; polyvalent oxazoline compounds such as 1,2-ethylenebisoxazoline, bisoxazoline, and polyoxazoline; carbonic acid derivatives such as urea, thiourea, guanidine, dicyandiamide, and 2-oxazolidinone; alkylene carbonate compounds such as 1,3-dioxolane-2-one, 4-methyl-1,3-dioxolane-2-one, 4,5-dimethyl-1,3-dioxolane-2-one, 4,4-dimethyl-1,3-dioxolane-2-one, 4-ethyl-1,3-dioxolane-2-one, 4-hydroxymethyl-1,3-dioxolane-2-one, 1,3-dioxane-2-one, 4-methyl-1,3-dioxane-2-one, 4,6-dimethyl-1,3-dioxane-2-one, and 1,3-dioxolane-2-one; haloepoxy compounds such as epichlorohydrin, epibromhydrin, and α-methylepichlorohydrin and polyvalent amine adducts thereof; oxetane compounds; silane coupling agents such as γ-glycidoxypropyltrimethoxysilane, and γ-aminopropyltriethoxysilane; polyvalent metal compounds such as hydroxides, chlorides, sulfates, nitrates, or carbonates of zinc, calcium, magnesium, aluminum, iron, and zirconium. Two or more types of them may be used in combination. Among the surface crosslinking agents, one or two or more selected from polyvalent metal ions, epoxy compounds, oxazoline compounds, and alkylene carbonate compounds are preferable.

(Surface Crosslinking Agent Solution)

The added amount of the surface crosslinking agent is preferably 5% by mass or less, more preferably 3% by mass or less, and even more preferably 2% by mass or less relative to the amount of the particulate hydrogel or particulate dried polymer in terms of solid content. The lower limit of the added amount is preferably 0.001% by mass.

As the adding form of the surface crosslinking agent, for ease of addition, it is preferred to add the surface crosslinking agent as a solution obtained by dissolving the surface crosslinking agent in water or an organic solvent. The concentration of the surface crosslinking agent solution is preferably 1% by mass or more, and more preferably 2% by mass or more. The total amount of a solvent selected from water and an organic solvent is preferably 0 to 10% by mass, more preferably 0.1% by mass to 8% by mass, and even more preferably 0.5% by mass to 5% by mass in terms of solid content relative to the amount of the particulate hydrogel or particulate dried polymer. In a case where water and an organic solvent are used in combination, water is preferably is the main component.

[2-5-2] Heat Treatment Step

This step is a step of heat-treating the particulate hydrogel or particulate dried polymer containing the surface crosslinking agent to obtain a surface-crosslinked dried polymer. According to the production method of the present invention, the particulate hydrogel or particulate dried polymer containing the surface crosslinking agent contains a fine powder granulated product described later in some cases.

(Surface Crosslinking Temperature)

A surface-crosslinked dried polymer can be obtained by heating the particulate hydrogel or particulate dried polymer containing the surface crosslinking agent (in some cases, fine powder granulated product) to 100° C. or more. This heating temperature (surface crosslinking temperature) is appropriately selected according to the type of surface crosslinking agent to be added. The heating temperature is preferably 100° C. to 250° C., more preferably 120° C. to 230° C., and even more preferably 150° C. to 210° C. from the viewpoint of the heat treatment efficiency.

(Heating Time)

The time taken for performing heat treatment at the above-described surface crosslinking temperature is appropriately set according to the moisture content of the particulate hydrogel or particulate dried polymer, the type of surface crosslinking agent, and the like. As a measure for the heating time, heating is required until the moisture content of the resulting water-absorbent resin powder reaches 10% by mass or less. The heating time is in a range of 10 minutes to 120 minutes, and preferably 30 minutes to 90 minutes.

(Heating Form)

The heating apparatus used in the heat treatment step is not particularly limited as long as an object of the present invention is achieved. From the viewpoint that uneven heating is less likely to occur, the heating apparatus having a stirring mechanism with a conductive heat transfer system by solid-solid contact (hereinafter, may be referred to as "indirect heating stirring type") is preferably used. Preferably, the stirring dryer (preferably, a rotary type dryer) described in the drying step is also used as a heating apparatus in the heat treatment step, from the viewpoint that a surface-crosslinked particulate dried polymer can be obtained after heat treatment. For example, a surface crosslinking agent as an additive 48 is added to the particulate hydrogel, and the particulate hydrogel containing the surface crosslinking agent is heated by using the above-described rotary type dryer 100 with heating tubes. Thereby, the drying step and surface crosslinking step are performed at the same time, and a particulate dried polymer in which the moisture content (solid content ratio) has been adjusted to a predetermined level and which has been surface-crosslinked can be obtained in one step, which is preferable.

[2-6] Cooling Step

The production method according to the present invention includes a cooling step of forcibly cooling the (particulate) dried polymer or surface-crosslinked (particulate) dried polymer to adjust the temperature to a desired temperature after the drying step or heat treatment step described above, and before the sizing step described later. In a case where the surface crosslinking step and the drying step are performed in one step in the dryer 100, this cooling step is performed after surface crosslinking treatment has been appropriately performed in a rotating container 10 and the solid content ratio or moisture content of the (particulate) dried polymer or surface-crosslinked (particulate) dried polymer has been adjusted to a desired range, and before the (particulate) dried polymer or surface-crosslinked (particulate) dried polymer is subjected to the sizing step.

Specifically, forcible cooling is performed at preferably $(t-20)°$ C. or less, more preferably $(t-30°)$ C. or less, and even more preferably $(t-40)°$ C. or less relative to the temperature $t°$ C. of the (particulate) dried polymer after the drying step and/or surface-crosslinked (particulate) dried polymer after the surface crosslinking step. For example, in a case where the temperature t of the (particulate) dried polymer and/or surface-crosslinked (particulate) dried polymer is 150 to 250° C., the (particulate) dried polymer and/or surface-crosslinked (particulate) dried polymer is forcibly cooled at preferably 50 to 130° C., more preferably 60 to 100° C., and even more preferably 65 to 90° C. before being subjected to the sizing step. By cooling the (particulate) dried polymer and/or surface-crosslinked (particulate) dried polymer to the temperature range, the workability and classification accuracy in disintegration are improved in the sizing step, and thus the physical properties of the resulting water-absorbent resin powder are improved.

(Cooling Method)

In the cooling step, a method of cooling the (particulate) dried polymer and/or surface-crosslinked (particulate) dried polymer is not particularly limited. Preferably, a continuous cooling apparatus having a ventilation heat transfer type cooling means or a conductive heat transfer type cooling means is used.

The (particulate) dried polymer and/or surface-crosslinked (particulate) dried polymer may be cooled in a static state or may be cooled in a stirring state. From the viewpoint that the entire (particulate) dried polymer and/or surface-crosslinked (particulate) dried polymer are uniformly and rapidly cooled, a material stirring type cooling apparatus is preferable, and a continuous material stirring type cooling apparatus is more preferable. For example, a fluidized bed cooling apparatus which employs direct heat transfer is exemplified. Cooling with cold air in a continuous belt type cooling apparatus may be employed.

Preferably, a stirring apparatus having a rotating shaft can be used for stirring cooling. For example, a mixer having a function of cooling an object to be cooled while passing an air stream through the object to be cooled is widely used as a cooling apparatus. The direction of the air stream is not particularly limited, and the direction may be a vertical direction or a horizontal direction as long as the effect of the present invention can be obtained. Specific examples of such a cooling apparatus include cooling apparatuses that are used by allowing an air stream to pass through a mixer in which the rotating shaft is horizontal and the container itself rotates (a horizontal cylinder type mixer, an inclined cylinder type mixer, a V-shaped mixer, a double conical type mixer, a cube shaped mixer, an S-shaped mixer, a continuous V-shaped mixer, and the like), a mixer in which the rotating shaft is horizontal and the container itself is fixed (a ribbon type mixer, a screw type mixer, a conical screw type mixer, a groove type stirring mixer, a high-speed fluidized type mixer, a rotated disk type mixer, a muller type mixer, a paddle type mixer, a rotary type mixer, a disc type mixer, and the like) and the like. Preferably, a fixed container type cooling apparatus which includes a rotation stirring blade for stirring the water-absorbent resin powder which is an object to be cooled and through which an air stream is passed. These cooling apparatuses may be a continuous type or may be a batch type, and a continuous type is preferable.

[2-7] Sizing Step

This step is a step of adjusting the particle size of the dried polymer or surface-crosslinked (particulate) dried polymer. By performing the sizing step after the surface crosslinking step, a water-absorbent resin powder whose particle diameter or particle size distribution is controlled to a high level can be obtained.

Preferably, the sizing step includes a crushing step and/or a classifying step. More preferably, the sizing step includes a disintegrating step and/or a classifying step. A sizing step of obtaining a water-absorbent resin powder having a controlled particle diameter and particle size distribution by performing only the crushing step or disintegrating step is preferable. Further, a sizing step of obtaining a water-absorbent resin powder having a controlled particle diameter and particle size distribution by performing only the disintegrating step is ideal.

The crushing step is, for example, a step of crushing, by a crusher, an agglomerated dried polymer or firmly aggregated particulate dried polymer obtained in a case where static drying is performed in the drying step or heat treatment step to adjust the particle diameter. Note that this crushing step is different from the above-described gel crushing step in that the dried polymer which is an object to be crushed has been subjected to the drying step.

Examples of the crusher used in the crushing step include a high-speed rotary type crusher such as a roll mill, a hammer mill, a screw mill, and a pin mill, a vibrating mill, a knuckle type crusher, and a cylinder type mixer. Among them, a preferred crusher is a roll mill from the viewpoint of ease of controlling the particle size distribution.

The disintegrating step is a step of disintegrating the (particulate) dried polymer which have moderately aggregated through the drying step or heat treatment step by a disintegrating apparatus to adjust the particle diameter. In the disintegrating step, the particle diameter can be adjusted with a lower power of crushing than that of the above-described crushing step.

As a disintegrating apparatus used in this disintegrating step, a disintegrating apparatus with smaller mechanical damage on the (particulate) dried polymer or surface-crosslinked (particulate) dried polymer is preferable. Specific examples thereof include a roll granulator (Matsubo Corporation), a granulator (Kurimoto, Ltd.), and Roundel Mill (Tokuju Corporation).

The classifying step is a step of removing, using a classifier, coarse particles and fine powder from the (particulate) dried polymer and surface-crosslinked (particulate) dried polymer or crushed products or disintegrated products thereof. As the classifier used in the classifying step, a vibrating type or tumbling type sieve classifier using a sieve mesh is used.

The size of the coarse particle and fine powder removed in this classifying step of the sizing step is appropriately set according to the particle diameter and particle size of the water-absorbing agent which is a final product. Preferably, the particle diameter of the coarse particle (defined by sieve classification) is 2,000 μm or more, and more preferably 850 μm or more. Typically, the mass average particle diameter of the fine powder is less than 150 μm, and preferably 10 to 150 μm.

(Particle Size of Dried Polymer or Surface-Crosslinked Dried Polymer)

From the viewpoint of reducing the fine powder, the mass average particle diameter d2 of the (particulate) dried polymer subjected to the sizing step or surface-crosslinked (particulate) dried polymer is preferably 200 μm or more, more preferably 300 μm or more, even more preferably 400 μm or more, and particularly preferably 500 μm or more. From the viewpoint of improving efficiency in the disintegrating step, the mass average particle diameter d2 is 2,000 μm or less, further 1,500 μm or less, and preferably 1,000 μm or less.

(Particle Size of Water-Absorbent Resin Powder)

From the viewpoint of the water absorption performance, the mass average particle diameter d3 of the water-absorbent resin powder obtained through the sizing step is preferably 200 μm or more, more preferably 200 to 600 μm, even more preferably 250 to 550 μm, and particularly preferably 300 to 500 μm.

From the viewpoint of improving the quality of the resulting water-absorbing agent, the main component of the water-absorbent resin powder is preferably particles having a particle diameter defined by sieve classification of 150 to 850 μm. The proportion of the particles having a particle diameter of 150 to 850 μm contained in the water-absorbent resin powder is preferably 90 to 100% by mass, more preferably 95 to 100% by mass, even more preferably 97 to 100% by mass, and particularly preferably 99 to 100% by mass. The proportion of particles having a particle diameter defined by sieve classification of less than 150 μm and more than 850 μm contained in the water-absorbent resin powder is all preferably 10% by mass or less, more preferably 5% by mass or less, even more preferably 3% by mass or less, and particularly preferably 1% by mass or less.

[2-8] Fine Powder Granulation Step

The production method according to the present invention includes this fine powder granulation step as an essential step. The fine powder granulation step is a step of adding water and an adhesion controlling agent as a binder to fine powder formed of a water-absorbent resin at the same time or separately to obtain a fine powder granulated product. Preferably, the fine powder granulation step is a step of adding an adhesion controlling agent and water in the form of liquid and water vapor (water in the form of gas) as moisture to obtain a fine powder granulated product (particularly, a hydrogel fine powder granulated product). More preferably, the fine powder granulation step is a step of adding an aqueous solution containing an adhesion controlling agent and water vapor to obtain a fine powder granulated product. The water-absorbent resin that forms fine powder in the present invention may be surface-crosslinked or may not be surface crosslinked, or may be a mixture of these water-absorbent resins (mixed fine powder). That is, in this step, the fine powder granulated product may be obtained from only a surface-crosslinked fine powder, may be obtained from only a non surface-crosslinked fine powder, or may be a fine powder granulated product obtained from a mixed fine powder composed of a surface-crosslinked fine powder and a non surface-crosslinked fine powder. A surface-crosslinked fine powder and a non surface-crosslinked fine powder are separately granulated, and granulated products of respective fine powders may be further mixed. In the present invention, the use ratio (weight ratio) of the surface-crosslinked fine powder to the non surface-crosslinked fine powder is appropriately determined in a range of 0:100 to 100:0, further 5:95 to 100:0, and particularly 10:90 to 100:0.

The fine powder granulated product is an aggregate of a plurality of particles that form fine powder (hereinafter, referred to as "fine powder particle"). The shape or particle diameter of the fine powder granulated product which means an object formed through physical or chemical attachment is appropriately determined. Typically, the mass average particle diameter thereof is 0.1 to 10 mm, and the aspect ratio thereof is appropriately determined to be 1 to 10, and further approximately 1 to 2. The fine powder granulated product can be normally obtained by allowing a plurality of fine powder particles to be attached by using moisture as a binder. In the production method according to the present invention, the moisture serving as a binder may be added, as water in the form of solid (ice), but preferably added as water (water in the form of liquid) or water vapor (water in the form of gas) to the fine powder. Further, in a case of adding an adhesion controlling agent as an aqueous solution, moisture may be added to the fine powder as water contained in the aqueous solution. The fine powder particles, to which moisture has been added, are swollen to be hydrogel particles having adhesiveness. In this production method, the adhesion controlling agent adjusts the degree of adhesiveness of the hydrogel particles. Addition of the adhesion controlling agent suppresses excessive attachment of the hydrogel particles, and thus provides a fine powder granulated product having an appropriate particle size and granulation strength. In a case where moisture is added as water vapor, water vapor is uniformly absorbed in the fine powder in a short time. As a result, the total moisture amount required for swelling of the fine powder is reduced, so that a load in a case of recovering this fine powder granulated product in the drying step is reduced.

(Granulating Apparatus)

The granulation method used in this step is not particularly limited as long as a particulate granulated product can be obtained. A stirring granulation method, a fluidized bed granulation method, a tumbling granulation method, and the like, and extrusion granulation with a perforated plate such as a meat chopper are appropriately employed. The granulation method may be performed in a continuous manner or a batch manner. From the viewpoint of the particle size and granulation efficiency of the resulting fine powder granulated product, a stirring granulation method is preferable, and a continuous stirring granulation method is more preferable.

The granulating apparatus used in this step is not particularly limited as long as a predetermined fine powder granulated product can be obtained. For example, in a case where granulation is performed by the stirring granulation method, a continuous type stirring apparatus can be used. Examples of the continuous type stirring apparatus include a vertical continuous type stirring apparatus and a horizontal continuous type stirring apparatus. Examples of the vertical continuous type stirring apparatus include Spiral Pin Mixer (manufactured by Pacific Machinery & Engineering Co., Ltd.), and a flow jet mixer and a Shugi type granulation system (manufactured by Funken Powtechs Inc.). Examples of the horizontal continuous type stirring apparatus include an annular layer mixer (manufactured by Dreisberke Co., Ltd.), and a twin screw mixer (manufactured by List). In the production method according to the present invention, it is preferred to perform granulation by binding fine powder formed of a water-absorbent resin using a rotated disk type mixer. More preferably, the continuous type stirring apparatus is a disk type mixer including a vane (a radial flow type, a mixed flow type, an oblique flow type, an axial flow type, and the like) for stirring the fine powder formed a water-absorbent resin.

The granulating apparatus preferably includes, for example, a nozzle for injecting an adhesion controlling agent or an aqueous solution containing an adhesion controlling agent, water, water vapor, and the like into the apparatus. Further, in the production method according to the present invention, for smooth supply of water vapor, a granulating apparatus that has high sealability and can adjust the internal pressure is more preferable.

The condition for injecting an adhesion controlling agent or an aqueous solution containing an adhesion controlling agent, water, water vapor, and the like into the granulating apparatus is appropriately adjusted so as to obtain a desired water-absorbent resin powder in consideration of the injection method, type of granulating apparatus, and the like. Although not particularly limited, in a case of injecting water vapor, for example, the gauge pressure of water vapor to be injected into the apparatus is preferably 0.1 to 2.0 MPa, more preferably 0.1 to 1.5 MPa, and even more preferably 0.1 to 0.8 MPa. In a case where the gauge pressure is less than 0.1 MPa, it takes long time for binding and granulating powder formed of a water-absorbent resin, and thus there is a possibility that granulated particles having a low granulation strength are produced. In a case where the gauge pressure is more than 2.0 MPa, there is a possibility that the performance of the water-absorbent resin is deteriorated. Note that the vapor pressure is maintained at a constant gauge pressure around the granulating apparatus and is used in a state in which the pressure is released in the interior of the apparatus.

Further, there may be one or two or more injection ports for injecting an adhesion controlling agent or an aqueous solution containing an adhesion controlling agent, water, water vapor, and the like in the granulating apparatus.

(Fine Powder)

Preferably, the fine powder is formed of a water-absorbent resin containing a poly(meth)acrylic acid (salt)-based crosslinked polymer as a main component. From the viewpoint of the water absorption performance of the resulting water-absorbing agent, the content of poly(meth)acrylic acid (salt) in the fine powder is preferably 50 mol % to 100 mol %, more preferably 70 mol % to 100 mol %, and even more preferably 90 mol % to 100 mol %.

The poly(meth)acrylic acid (salt)-based crosslinked polymer may be an unneutralized or neutralized poly(meth) acrylic acid (salt)-based crosslinked polymer. Preferably, the poly(meth)acrylic acid (salt)-based crosslinked polymer is a partially neutralized or completely neutralized poly(meth) acrylic acid (salt)-based crosslinked polymer. The poly (meth)acrylic acid (salt)-based crosslinked polymer is a poly(meth)acrylic acid (salt)-based crosslinked polymer neutralized with, more preferably an alkaline metal salt or an ammonium salt, more particularly preferably an alkaline metal salt, and particularly preferably a sodium salt.

The neutralization ratio of the poly(meth)acrylic acid (salt)-based crosslinked polymer is appropriately adjusted by a known method. The neutralization ratio is preferably 40 mol % or more, more preferably 40 mol % to 80 mol %, even more preferably 45 mol % to 78 mol %, and particularly preferably 50 mol % to 75 mol %.

In the production method according to the present invention, the method of obtaining fine powder formed of a water-absorbent resin is not particularly limited. In accordance with the known production method and production condition, a fine powder formed of a water-absorbent resin may be produced so as to have the physical properties and particle size described later. Preferably, the fine powder removed in the classifying step of the above-described sizing step is collected and subjected to this step.

(Particle Size of Fine Powder)

From the viewpoint of suppressing the increase in the particle size of the fine powder granulated product, the mass average particle diameter by the sieve classification of the fine powder formed of the water-absorbent resin is preferably less than 150 μm, more preferably 10 to 150 μm, and even more preferably 10 to 140 μm. The proportion of particles having a particle diameter of less than 150 μm contained in this fine powder is preferably 70% by mass or more, more preferably 80% by mass or more, even more preferably 90% by mass or more, and ideally 100% by mass.

(Solid Content Ratio of Fine Powder)

From the viewpoint of the flowability and mixability, the solid content ratio of the fine powder is preferably 75% by mass or more, more preferably 80% by mass or more, and even more preferably 85% by mass or more. From the viewpoint of suppressing generation of dust during fine powder granulation, the solid content ratio of the fine powder is preferably 99.9% by mass or less, more preferably 99.5% by mass or less, and even more preferably 99.0% by mass or less. Note that, the measurement method of the solid content ratio of the fine powder will be described later in the examples.

(Physical Properties of Fine Powder)

The CRC (centrifuge retention capacity) of the fine powder formed of a water-absorbent resin is preferably 5 to 70 g/g, more preferably 10 to 60 g/g, even more preferably 15 to 50 g/g, and particularly preferably 18 to 40 g/g in terms of solid content. Further, the water-soluble component of the fine powder is preferably 2 to 50% by mass, more preferably 4 to 25% by mass, and even more preferably 6 to 20% by mass.

In a case where the CRC and/or water-soluble component are more than the above-described range, excessive adhesiveness is exhibited in the fine powder granulation step, as a result of which a fine powder granulated product having a large particle diameter may be formed. Further, in a case where the CRC and/or water-soluble component are less than the above-described range, uniform mixing with the adhesion controlling agent becomes difficult, which is not preferable.

(Adhesion Controlling Agent)

The adhesion controlling agent adjusts the adhesiveness of the hydrogel particles in the swollen fine powder. Use of this adhesion controlling agent provides a fine powder granulated product having an appropriate particle size and granulation strength. In this step, the type of adhesion controlling agent is not particularly limited as long as the adhesion controlling agent has an action of adjusting the adhesiveness of the hydrogel particles (preferably, appropriately reducing the adhesiveness). The adhesion controlling agent may be a compound that is the same as the above-described gel fluidizer, or may be a compound that is different from the above-described gel fluidizer.

Examples of the adhesion controlling agent include anionic surfactants, cationic surfactants, nonionic surfactants, amphoteric surfactants, and low molecular type (non-polymer) or polymer type surfactants of these surfactants.

(Surfactant)

As the surfactant used for the adhesion controlling agent, the following (1) to (4) are specifically exemplified.

(1) Nonionic surfactants such as sucrose fatty acid esters, polyglycerin fatty acid esters, sorbitan fatty acid esters, polyoxyethylene sorbitan fatty acid esters, polyoxyethylene glycerin fatty acid esters, sorbitol fatty acid esters, polyoxyethylene sorbitol fatty acid esters, polyoxyethylene alkyl ethers, polyoxyethylene alkylphenyl ethers, polyoxyethylene castor oil, polyoxyethylene hydrogenated castor oil, alkylallylformaldehyde condensed polyoxyethylene ethers, polyoxyethylene polyoxypropylene block copolymers, polyoxyethylene polyoxypropylene alkyl ethers, polyethylene glycol fatty acid esters, alkyl glucosides, N-alkyl gluconamide, polyoxyethylene fatty acid amides, polyoxyethylene alkylamine, phosphoric acid esters of polyoxyethylene alkyl ethers and phosphoric acid esters of polyoxyethylene alkyl allyl ethers, and polymer lubricants.

Here, examples of the polymer lubricant include maleic anhydride-mollified polyethylene, maleic anhydride-modified polypropylene, a maleic anhydride-modified ethylene-propylene copolymer, a maleic anhydride-mollified ethylene-propylene-diene terpolymer (EPDM), maleic anhydride-mollified polybutadiene, a maleic anhydride-ethylene copolymer, a maleic anhydride-propylene copolymer, a maleic anhydride-ethylene-propylene copolymer, a maleic anhydride-butadiene copolymer, polyethylene, polypropylene, an ethylene-propylene copolymer, oxidized polyethylene, oxidized polypropylene, an oxidized ethylene-propylene copolymer, an ethylene-acrylic acid copolymer, ethyl cellulose, ethyl hydroxyethyl cellulose, and polyalkylene oxides such as polyethylene glycol. The weight average molecular weight of these substances is appropriately selected in a range of preferably 200 to 2,000,000, and more preferably 400 to 1,000,000.

(2) Amphoteric surfactants such as alkyl dimethylaminoacetic acid betaines such as caprylic dimethylamino acetic acid betaine, lauryl dimethylaminoacetic acid betaine, myristyl dimethylaminoacetic acid betaine, and stearyl dimethylamino acetic acid betaine; alkylamide propyl betaines such as lauric acid amide propyl betaine, coconut oil fatty acid amide propyl betaine, and palm kernel oil fatty acid amino propyl betaine; alkyl hydroxysulfobetaines such as lauryl hydroxysulfobetaine; and alkyl carboxymethyl hydroxyethyl imidazolinium betaines such as 2-alkyl-N-carboxymethyl-N-hydroxyethyl imidazolium betaine.
(3) Anionic surfactants such as alkyl amino monoalkali metal diacetates such as lauryl amino monosodium diacetate, lauryl amino potassium diacetate, and myristyl amino sodium diacetate.
(4) Cationic surfactants such as long-chain alkyl dimethylaminoethyl quaternary salts.

Preferably, the adhesion controlling agent is a surfactant (particularly, a non-polymer surfactant), more preferably, an amphoteric surfactant, and particularly preferably, a betaine-type amphoteric surfactant. Examples of the betaine-type amphoteric surfactant include alkyl dimethylaminoacetic acid betaines ($R^1$—$N^+(CH_3)_2$—$CH_2COO^-$), alkylamide propyl betaines ($R^1$—CO—$NH(CH_2)_3$—$N^+(CH_3)_2$—$CH_2COO$—), alkyl hydroxysulfobetaines ($R^1$—$N^+(CH_3)_2$—$CH_2CH(OH)CH_2SO_3$—), alkyl amino monoalkali metal diacetates, and alkyl carboxymethyl hydroxyethyl imidazolinium betaines.

Specific examples of the alkyl dimethylaminoacetic acid betaine include caprylic dimethylamino acetic acid betaine, lauryl dimethylaminoacetic acid betaine, myristyl dimethylaminoacetic acid betaine, and stearyl dimethylamino acetic acid betaine. From the viewpoint of the particle size and physical properties of the fine powder granulated product, caprylic dimethylamino acetic acid betaine, lauryl dimethylaminoacetic acid betaine, or stearyl dimethylamino acetic acid betaine is preferable, and lauryl dimethylaminoacetic acid betaine is more preferable.

Specific examples of the alkylamide propyl betaine include lauric acid amide propyl betaine, coconut oil fatty acid amide propyl betaine, and palm kernel oil fatty acid amide propyl betaine. From the viewpoint of the particle size and physical properties of the fine powder granulated product, lauric acid amide propyl betaine or coconut oil fatty acid amide propyl betaine is preferable, and lauric acid amide propyl betaine is more preferable.

Specific examples of the alkyl hydroxysulfobetaine include lauryl hydroxysulfobetaine. From the viewpoint of the particle size and physical properties of the fine powder granulated product, lauryl hydroxysulfobetaine is preferable.

Specific examples of the alkyl amino monoalkali metal diacetate include lauryl amino monosodium diacetate, lauryl amino potassium diacetate, and myristyl amino sodium diacetate. From the viewpoint of the particle size and physical properties of the fine powder granulated product, lauryl amino monosodium diacetate is preferable.

Specific examples of the alkyl carboxymethyl hydroxyethyl imidazolinium betaine include 2-alkyl-N-carboxymethyl-N-hydroxyethyl imidazolium betaine. From the viewpoint of the particle size and physical properties of the fine powder granulated product, 2-alkyl-N-carboxymethyl-N-hydroxyethyl imidazolium betaine is preferable.

As the adhesion controlling agent, a single compound may be used, or a plurality of compounds may be used in combination as long as an object of the present invention can be achieved.

(Added Amount of Adhesion Controlling Agent)

The added amount of the adhesion controlling agent is preferably 0.001 to 2.0% by mass, more preferably 0.010 to 1.5% by mass, even more preferably 0.020 to 1.0% by mass, and particularly preferably 0.025 to 0.8% by mass relative to the solid content of the fine powder formed of the water-absorbent resin. In a case where the added amount is excessively small, the effect of reducing the amount of fine powder is small. An excessive amount of addition may cause deterioration of the granulation strength or decrease in the surface tension of the product. Note that in a case where the adhesion controlling agent is added as an aqueous solution, the added amount of the effective component is set within the above-described range. Further, in a case where a plurality of compounds are used in combination as the adhesion controlling agent, the total amount thereof only needs to be within the above-described range. When the adhesion controlling agent is added within the above-described range, a fine powder granulated product having an appropriate granulation strength and particle size can be obtained. As a result, when this fine powder granulated product is recovered in the drying step or any of steps before the drying step, increase in the particle size of the resulting dried product is avoided, so that the generation amount of fine powder in the subsequent steps is reduced. Further, in an embodiment in which the fine powder generated in the production process of the water-absorbent resin powder is subjected to the fine powder granulation step, the fine powder granulated product to be recovered in the drying step or the like is also reduced along with reduction in the generation amount of fine powder. As a result, the physical properties of the resulting water-absorbent resin powder are improved. Further, it becomes also possible to decrease the size of the production apparatus in the steps after the drying step.

(Method of Adding Adhesion Controlling Agent)

As described above, preferably, the adhesion controlling agent is added to the fine powder formed of the water-absorbent resin as an aqueous solution. In the fine powder granulation step, the water of the aqueous solution containing this adhesion controlling agent allows the fine powder to be swollen and acts as a binder which bonds a plurality of hydrogel particles contained in this fine powder. The degree of adhesiveness of the hydrogel particles is adjusted depending on the concentration of the adhesion controlling agent in this aqueous solution and the added amount as an aqueous solution.

In a case where the adhesion controlling agent is added as the aqueous solution to the fine powder, the concentration of the aqueous solution containing the adhesion controlling agent is preferably 0.001 to 40% by mass, more preferably 0.005 to 30% by mass, even more preferably 0.010 to 20% by mass, and particularly preferably 0.050 to 15% by mass from the viewpoint of the granulation strength and suppression of increase in the particle size of the fine powder granulated product due to uniform mixability. In a case where the adhesion controlling agent is commercially available as a solution with a known concentration, the adhesion controlling agent may be used at the concentration as is. Preferably, an adhesion controlling agent whose solution concentration has been appropriately adjusted within a desired range by diluting or the like may also be used.

From the viewpoint of the granulation efficiency and granulation strength, the added amount of the aqueous solution containing the adhesion controlling agent is normally 10% by mass or more, preferably 25% by mass or more, more preferably 40% by mass or more, and even more preferably 65% by mass or more relative to the solid content of the fine powder. From the viewpoint of suppressing increase in the particle size of the fine powder granulated product, the added amount as this aqueous solution is preferably 230% by mass or less, more preferably 185% by mass or less, and even more preferably 150% by mass or less.

The aqueous solution containing the adhesion controlling agent may contain a hydrophilic organic solvent as a solvent or diluent as long as the effect of the present invention is not inhibited. In a case where the hydrophilic organic solvent is used as a solvent or diluent along with water, the proportion of water in the solvent or diluent is preferably 60% by mass or more, more preferably 80% by mass or more, even more preferably 90% by mass or more, and ideally 100% by mass.
(Temperature of Adhesion Controlling Agent or Aqueous Solution Containing Adhesion Controlling Agent)

From the viewpoint of the mixability with the fine powder formed of the water-absorbent resin, the temperature of the adhesion controlling agent or the aqueous solution containing the adhesion controlling agent is normally in a range of 0° C. (further, 10° C., 20° C.) to the boiling point, preferably 30° C. or more, more preferably 40° C. or more, even more preferably 45° C. or more, and particularly preferably 50° C. or more. The upper limit of the temperature is not particularly limited, and is normally the boiling point of water. Note that the aqueous solution may be further heated by using, as moisture, water vapor (water in the form of gas) in combination with the aqueous solution (water in the form of liquid).
(Water Vapor)

In this step, in a case where water vapor is added to the fine powder together with the adhesion controlling agent, water vapor allows the fine powder formed of the water-absorbent resin to be swollen, and acts as a binder for a plurality of hydrogel particles contained in this fine powder. From the viewpoint of rapid and uniform absorption into the entire fine powder, the water vapor to be added is preferably saturated water vapor, more preferably saturated water vapor of 0.11 MPa or more (102° C. or more), and even more preferably saturated water vapor of 0.12 MPa or more (105° C. or more).

In this step, in a case where water vapor is added to the fine powder together with the adhesion controlling agent, the added amount of the water vapor relative to the amount of the fine powder is, per unit time, preferably 1% by mass or more, more preferably 3% by mass or more, and even more preferably 7% by mass or more, from the viewpoint of the granulation strength and particle size of the fine powder granulated product. From the viewpoint of suppressing increase in the particle size and drying efficiency, the added amount of the water vapor is preferably 100% by mass or less, more preferably 50% by mass or less, and even more preferably 30% by mass or less. Note that the total amount of the water vapor that has been added need not be absorbed in the fine powder. The water vapor may be absorbed in the fine powder after being absorbed in water in the form of liquid used for granulation, or a part of water vapor may be discharged from the mixer.
(Temperature of Fine Powder)

From the viewpoint of mixability with the adhesion controlling agent or aqueous solution containing the adhesion controlling agent, the temperature of the fine powder subjected to this step is preferably 30° C. or more, more preferably 40° C. or more, even more preferably 45° C. or more, and particularly preferably 50° C. or more. From the viewpoint of preventing heat deterioration of the fine powder formed of the water-absorbent resin, a preferred temperature is 100° C. or less.
(Solid Content Ratio of Fine Powder Granulated Product)

From the viewpoint of the drying efficiency and suppression of increase in the particle size in a case of recovering the fine powder granulated product in the drying step, the solid content ratio of the fine powder granulated product is preferably 30% by mass or more, more preferably 35% by mass or more, and even more preferably 40% by mass or more. From the viewpoint of the granulation strength, the solid content ratio is preferably 80% by mass or less, more preferably 70% by mass or less, and even more preferably 60% by mass or less. That is, such a fine powder granulated product is preferably a hydrogel fine powder granulated product, which is further dried into a water-absorbent resin powder containing a dried fine powder granulated product.
(Physical Properties of Fine Powder Granulated Product)

The CRC (centrifuge retention capacity) of the fine powder granulated product is preferably 5 to 70 g/g, more preferably 10 to 60 g/g, even more preferably 15 to 50 g/g, and particularly preferably 18 to 40 g/g in terms of solid content. Further, the water-soluble component of the fine powder granulated product is preferably 2 to 50% by mass, more preferably 4 to 25% by mass, and even more preferably 6 to 20% by mass. When the CRC and/or water-soluble component are more than the above-described range, in a case of recovering the fine powder granulated product in the drying step or any of steps before the drying step, increase in the particle size may occur due to attachment with the particulate hydrogel or dried polymer. Further, when the CRC and/or water-soluble component are less than the above-described range, the performance of the resulting water-absorbing agent may be deteriorated.

[2-9] Fine Powder Recovering Step

This step is a step of collecting the fine powder removed in the classifying step of the sizing step and supplying the fine powder to any of the above-described steps to recover (recycle) the fine powder. In the production method according to the present invention, the fine powder collected in the sizing step is formed into a fine powder granulated product (further, hydrogel fine powder granulated product) in the fine powder granulation step described above, then recovered in the drying step or any of steps before the drying step, and further dried.

In a case of recovering the fine powder granulated product in a step before the drying step, the fine powder granulated product is added to and mixed in, for example, an aqueous monomer solution before polymerization, or a hydrogel during polymerization or during gel crushing. The amount of the fine powder granulated product to be recovered to each step is appropriately adjusted. In a case where the fine powder granulated product is mixed with the hydrogel, the amount of the fine powder granulated product relative to the amount of the hydrogel is, in terms of solid content, preferably 30% by mass or less, more preferably 28% by mass or less, even more preferably 20% by mass or less, more preferably 15% by mass or less, and even more preferably 10% by mass or less from the viewpoint of the water absorption performance and productivity of the resulting water-absorbing agent. In case where the fine powder granulated product is added to the aqueous monomer solution, the amount of the fine powder granulated product is preferably 30% by mass or less, more preferably 28% by mass or less, even more preferably 20% by mass or less, more preferably 15% by mass or less, and even more preferably 10% by mass or less relative to the amount of the monomer. After the hydrogel fine powder granulated product is obtained with such a range, and recovered in the drying step or a step before the drying step, the hydrogel fine powder granulated product is dried together with the particulate hydrogel polymer in the polymerization step. Thereby, the water-absorbent resin powder of the present invention is obtained.

Also in the resulting water-absorbent resin powder obtained with such a mixing ratio, it is possible to appropriately control the ratio (solid content ratio) of the primary particles derived from the hydrogel and the water absorbent resin fine powder granulated product derived from the fine powder recovery. Preferably, the ratio is the ratio of the above-described hydrogel amount of which is converted into solid content and the fine powder granulated product.

As the form of addition, the fine powder granulated product (particularly, hydrogel fine powder granulated product) may be added as is in the above-described step, or further, may be added in a state of being swollen and gelated with an appropriate amount of water. Water, a crosslinking agent, a binder other than water (for example, a water-soluble polymer, a thermoplastic resin), a polymerization initiator, a reducing agent, a chelate agent, a coloring prevention agent, or the like may be added together with the fine powder granulated product as long as the effect of the present invention is not inhibited. For example, in a case of adding water, when another compound is added in an amount of 1 to 1,000% by mass relative to the amount of the fine powder granulated product, water is preferably used in an amount of 0.01 to 10% by mass relative to the amount of the fine powder granulated product.

The temperature of the fine powder granulated product when the fine powder granulated product is added to the hydrogel is preferably 50° C. or more and 100° C. or less, more preferably 55° C. or more, even more preferably 60° C. or more, more preferably 95° C. or less, and even more preferably 90° C. or less. When the temperature is within such a temperature range, it is possible to exhibit the effect of the adhesion controlling agent more and prevent formation of coarse dried products.

[Fine Powder Granulated Product Adding Step]

A step of recovering the fine powder granulated product in the drying step or any of steps before the drying step in the preferred embodiment, that is, an adding step of the fine powder granulated product will be described in detail.

Specifically, in the step of adding the fine powder granulated product, it is preferred to add the fine powder granulated product to at least one or more steps selected from the group consisting of during the polymerization step, after the polymerization step and before the gel crushing step, during the gel crushing step, after the gel crushing step and before the drying step, and during the drying step. Note that the hydrogel can be obtained even during the polymerization step, and thus the granulated gel may be added during the polymerization step. In addition, a polymer having a solid content of less than 80% by mass in the drying step is normally considered to be a hydrogel. That is, since the hydrogel is present until the middle of the drying step, the granulated gel may be added during the drying step. Preferably, the fine powder granulated product is added to the hydrogel after the gel crushing step and before the drying step, or during the drying step. More preferably, the fine powder granulated product is added to the hydrogel after the gel crushing step and before the drying step. When the fine powder granulated product is added to the hydrogel after crushing in this manner, the difference in particle size between the hydrogel and fine powder granulated product is small and thus mixing is easy, thus preventing uneven drying. In particular, when crushing is performed by controlling gel crushing energy, a hydrogel having a granulated shape is formed, enabling further suppression of uneven drying. On the other hand, when the fine powder granulated product is added before or during the gel crushing step, a load on the gel crusher is increased and gel crushing becomes unstable, thus failing to control the gel particle diameter in some cases. Note that "before a step" or "after a step" includes all steps before the step or all steps after the step, and means that the fine powder granulated product is added in an optional step such as the transport step or storing step between steps. For example, the meaning of after the gel crushing step includes the period of transportation from the gel crushing step to the next step and the next step.

In the fine powder granulated product adding step, the solid content of the fine powder granulated product is preferably 30% by mass or more, and 80% by mass or less as described above, the details will be described later. In the fine powder granulated product adding step, it is preferred to control the temperature of the granulated gel together with the solid content of the fine powder granulated product.

(Temperature)

In the present invention, the fine powder granulated product is added to the hydrogel. The temperature of the fine powder granulated product and the temperature of the hydrogel at that time are each in a range of 50° C. or more and 100° C. or less, preferably 55° C. or more, more preferably 60° C. or more, preferably 95° C. or less, and more preferably 90° C. or less. When the temperature is within such a temperature range, a favorable mixed state of both gels can be obtained. When the temperature of the fine powder granulated product or hydrogel is less than 50° C., the fine powder granulated product becomes hard, or aggregates are formed in mixing of the hydrogel and fine powder granulated product in some cases. That is, when aggregates are formed during mixing, the hydrogel and fine powder granulated product are adhered to form a huger aggregate, resulting in a poor mixed state. Further, even when mixing can be made, aggregates present in drying tend to cause drying failure, that is, generation of a non-dried product. When the aggregates is dried by continuously heating until the moisture content reaches a desired level, the fine powder granulated product and hydrogel other than the aggregate, which have been already dried, become an excessively dried state, leading to deterioration of the quality of the water-absorbent resin, such as increase in the soluble component due to heat deterioration. Such a problem occurs even in a case where the temperature of one of the gels is 50° C. or more, and the temperature of the other gel is less than 50° C. On the other hand, when the temperature of the fine powder granulated product or hydrogel is more than 100° C., the gel surface is dried, and, conversely, the gel becomes hard in some cases.

Further, in the present invention, a smaller difference between the temperature of the fine powder granulated product and the temperature of the hydrogel is preferred in the above-described temperature range from the viewpoint of reducing uneven drying. The temperature difference between the fine powder granulated product and hydrogel is preferably within 40° C., more preferably within 30° C., and even more preferably within 20° C. The adjustment of the temperature of the fine powder granulated product and the temperature of the hydrogel can be appropriately performed by heating and temperature retention in the production process, or heating by hot air or the like from the outside, or cooling by natural cooling, a low temperature air, or the like.

According to the production method of the present invention, the generation amount of the fine powder in the production process may be approximately 30% by weight (30% by weight or less). The generation amount of the fine powder is normally less than 20% by mass, and preferably 15% by mass or less of the total production amount. In the production method according to the present invention, the generation amount of the fine powder is significantly reduced compared to 20 to 30% by mass, which is the generation amount of the fine powder according to the conventional production method. Thereby, the disintegrating step and classifying step in the sizing step can be simplified. Further, power saving in the fine powder recovery step and fine powder granulation step is finally possible. Typically, the recovery of the fine powder or fine powder granulated product causes deterioration of the performance of the resulting water-absorbing agent (for example, deterioration of the water absorption capacity) in some cases. According to the present invention, the generation amount of the fine powder is reduced, and thus a water-absorbing agent having an excellent water absorption performance can be obtained.

[2-10] Adding Step of Other Additives

This step is an optional step performed for imparting various additional functions to the water-absorbing agent and improving the water absorption performance. This step is a step of adding the additives described below to the water-absorbent resin powder obtained through the surface crosslinking step. From the viewpoint of the effect by addition, it is preferred to allow the additives to be present on each particle surface of the water-absorbent resin powder. Accordingly, this step is preferably performed at the same time as or separately from the surface crosslinking step, and more preferably performed after the surface crosslinking step.

Examples of other additives include a chelate agent, an organic reducing agent, an inorganic reducing agent, an oxidizing agent, a hydroxycarboxylic acid compound, a surfactant, a compound having a phosphorus atom, an organic powder such as a metal soap, a deodorant, an anti-bacterial agent, pulp, and thermoplastic fibers. The liquid permeability is exemplified as one example of the water absorption performance to be imparted to the water absorbing agent. As an additive for improving the liquid permeability, the following polyvalent metal salts, cationic polymers, and inorganic fine particles are exemplified. Among them, at least one or more types are preferably used.

(Polyvalent Metal Salt)

Preferred examples of the polyvalent metal of the polyvalent metal salt include aluminum, and zirconium. The polyvalent metal salt that can be used is preferably aluminum lactate and aluminum sulfate, and more preferably aluminum sulfate.

For the added amount of this polyvalent metal salt, the amount of metal cation is preferably less than $3.6\times10^{-5}$ mol, more preferably less than $2.8\times10^{-5}$ mol, and even more preferably less than $2.0\times10^{-5}$ mol relative to 1 g of the water-absorbent resin powder.

(Cationic Polymer)

Preferred examples of the cationic polymer include the compounds exemplified in U.S. Pat. No. 7,098,284. Among them, a vinyl amine polymer is preferable. The added amount of this cationic polymer is preferably less than 2.5 parts by mass, more preferably less than 2.0 parts by mass, and even more preferably less than 1.0 parts by mass relative to 100 parts by mass of the water-absorbent resin powder.

(Inorganic Fine Particles)

Specific examples of the inorganic fine particle include minerals such as talc, kaolin, fuller's earth, hydrotalcite, bentonite, activated clay, barite, naturally occurring asphaltum, strontium ore, ilmenite, and pearlite; aluminum compounds such as aluminum sulfate tetradeca-, pentadeca-, hexadeca-, heptadeca-, and octadecahydrates (or anhydrates), potassium aluminum sulfate dodecahydrate, aluminum sodium sulfate dodecahydrate, aluminum ammonium sulfate dodecahydrate, aluminum chloride, polyaluminum chloride, and aluminum oxide; other polyvalent metal salts such as calcium phosphate, polyvalent metal oxides, and polyvalent metal hydroxides; silicas such as hydrophilic amorphous silica; and oxide complexes such as complexes of silicon oxide, aluminum oxide and magnesium oxide, complexes of silicon oxide and aluminum oxide, and complexes of silicon oxide and magnesium oxide. Two or more types of them may be used in combination. The added amount of this inorganic fine particle is preferably less than 2.0 parts by mass, more preferably less than 1.5 parts by mass, even more preferably less than 1.0 parts by mass relative to 100 parts by mass of the water-absorbent resin powder.

[2-11] Other Steps

The production method according to the present invention may further include, in addition to the above-described steps, a cooling step, a re-wetting step, a crushing step, a classifying step, a granulation step, a transport step, a storing step, a packaging step, a reserving step, or the like as necessary.

(Other Additives)

In the production method according to the present invention, inorganic fine particles, a dust prevention agent, a dried water-absorbent resin (fine powder), a liquid permeability enhancer, and the like can be further added, before or after drying, as other additives in addition to the surface crosslinking agent, gel fluidizer, and adhesion controlling agent.

[2-12] Preferred Embodiment

As described above, according to the production method of the present invention, a fine powder granulated product having an appropriate granulation strength and particle size can be obtained by using the adhesion controlling agent in the fine powder granulation step. By recovering this fine powder granulated product in the drying step or any of steps before the drying step, increase in the particle size of the resulting dried polymer is suppressed. Thereby, as in the flow chart shown in FIG. 1, the dried polymer obtained in the drying step can be adjusted to a predetermined particle size in the simplified sizing step.

Further, in a case where stirring drying is employed in the drying step, the steps shown in FIG. 1 may be performed, but as shown in FIG. 2, a production method that has further been simplified is made possible. In the production method shown in FIG. 2, stirring drying is employed in the drying step, and surface crosslinking is performed at the same time as drying. A water absorbent resin powder having excellent physical properties can be efficiency produced by adjusting the surface-crosslinked particulate dried polymer obtained after this drying step to a predetermined particle size in the sizing step. Further, according to the production method of the present invention, a surface-crosslinked particulate dried polymer having a particle size close to a desired product particle size can be obtained even after the drying step which performs surface crosslinking at the same time as drying. Thus, simplification of the later sizing step is made possible.

[3] Water-absorbent Resin Powder as Product and Physical Properties Thereof

The present invention provides a water-absorbent resin powder containing a water-absorbent resin powder (primary particle) which is a dried product of the hydrogel crosslinked polymer and a water-absorbent resin fine powder granulated product containing an adhesion controlling agent by giving the above-described production method as one example of the production. Here, the primary particle means a dried product of the hydrogel crosslinked polymer. Further, the water-absorbent resin fine powder granulated product obtained from the water-absorbent resin fine powder after drying corresponds to the secondary particle.

Conventionally, the water-absorbent resin fine powder granulated product (secondary particle) obtained from the water-absorbent resin fine powder after drying is relatively vulnerable to mechanical damage compared to the water-absorbent resin powder (primary particle) which is a dried product of the hydrogel crosslinked polymer, and thus regeneration of fine powder caused by breaking of the granulated particles occurs in some cases. Further, deterioration of the powder flowability occurs in some cases. To solve the problems, in the water-absorbent resin powder obtained in the present invention, the production of the present invention in which the particulate hydrogel crosslinked polymer obtained by polymerizing a monomer and a fine powder granulated product are mixed, is given as one example. The present invention provides a water-absorbent resin powder formed of a water-absorbent resin powder (primary particle) which is a dried product of a hydrogel crosslinked polymer and a water-absorbent resin fine powder granulated product containing an adhesion controlling agent. In such a water-absorbent resin powder, the fine powder granulated product contains an adhesion controlling agent. Thus, the water-absorbent resin fine powder exhibits an effect of reducing the generation amount of fine powder due to breaking of the water-absorbent resin fine powder granulated product. Here, the adhesion controlling agent is preferably a surfactant.

In the present invention, the water-absorbent resin (primary particle) and water-absorbent resin fine powder which are dried products of the hydrogel crosslinked polymer may optionally contain a gel fluidizer (surfactant). In the present invention, the adhesion controlling agent (particularly, surfactant) is further added in an amount of preferably 0.001 to 2.0% by mass, more preferably 0.010 to 1.5% by mass, even more preferably 0.020 to 1.0% by mass, and particularly preferably 0.025 to 0.8% by mass relative to the solid content of the fine powder formed of the water-absorbent resin. Thus, the water-absorbent resin powder of the present invention is preferably a water absorbent resin powder in which the amount of the surfactant in the water-absorbent resin fine powder granulated product is contained within the above-described range more than the amount of the surfactant in the water-absorbent resin powder (primary particle) which is a dried product of the hydrogel crosslinked polymer. Preferably, in the present invention, the adhesion controlling agent is a surfactant and a water absorbent resin powder in which the amount of the surfactant in the water-absorbent resin fine powder granulated product is more than the amount of the surfactant in the water-absorbent resin powder. In the water-absorbent resin powder of the present invention, a preferred type and amount (content) of the surfactant, a preferred amount of the fine powder granulated product, a preferred ratio (mixing ratio) of the water-absorbent resin powder (primary particle) and water-absorbent resin fine powder granulated product containing an adhesion controlling agent, and the like are the above-described ranges. In the water-absorbent resin powder containing a water-absorbent resin fine powder granulated product of the present invention, the adhesion controlling agent (surfactant) is added to the fine powder granulated product which is relatively vulnerable to mechanical damage (added more than the water-absorbent resin (primary particle) which is a dried product of the hydrogel crosslinked polymer). Thus, the water-absorbent resin powder of the present invention is strong against mechanical damage and has good powder flowability even when being formed as a water absorbent resin powder containing a water-absorbent resin fine powder granulated product.

In the water-absorbent resin powder (water-absorbing agent) obtained in the production method according to the present invention, in a case of using the water-absorbent resin powder for a water-absorbent article, particularly, a paper diaper, at least one or more, preferably two or more, more preferably three or more, and even more preferably all of the physical properties out of the physical properties listed in the following (3-1) to (3-7) are desired to be controlled to a desired range. In a case where all the following physical properties do not satisfy the following range, the effect of the present invention cannot be sufficiently obtained. In particular, there is a possibility that a sufficient performance is not exhibited in a so-called high concentration paper diaper in which the used amount of the water-absorbing agent per sheet of paper diaper is large.

Further, in the water-absorbent resin powder obtained in the present invention, the particulate hydrogel crosslinked polymer obtained by polymerizing a monomer and fine powder granulated product are mixed in the fine powder granulated product adding step (preferably, mixed in the drying step or any of steps before the drying step, further, mixed after the polymerization step, and even more preferably, mixed after the gel crushing step). Thus, the present invention provides a water-absorbent resin powder formed of a water-absorbent resin primary particle and a water-absorbent resin fine powder granulated product containing an adhesion controlling agent by giving the above-described production method as one example of the production method. Note that the production method of the water-absorbent resin powder of the present invention is not limited to the method of the present invention. The water-absorbent resin powder may be obtained by a production method other than the production method of the present invention, such as a method of separately preparing a water-absorbent resin primary particle and water-absorbent resin fine powder granulated product containing an adhesion controlling agent and mixing them. Preferably, in the present invention, the adhesion controlling agent is a surfactant and a water absorbent resin powder in which the amount of the surfactant in the water-absorbent resin fine powder granulated product is more than the amount of the surfactant in the water-absorbent resin powder. Such a water-absorbent resin powder of the present invention further has the following physical properties. A preferred amount of the adhesion controlling agent or fine powder granulated product is the above-described range.

[3-1] CRC (Centrifuge Retention Capacity)

The CRC (centrifuge retention capacity) of the water-absorbent resin powder (water-absorbing agent) of the present invention is normally 5 g/g or more, preferably 15 g/g or more, and more preferably 25 g/g or more. The upper limit of the CRC is not particularly limited, and a higher CRC is preferable. From the viewpoint of the balance between other physical properties, the CRC is preferably 70 g/g or less, more preferably 50 g/g or less, and even more preferably 40 g/g or less.

In a case where the CRC is less than 5 g/g, the absorption amount is small, and therefore it is not suitable as an absorbent for the absorbent article such as paper diapers. In a case where the CRC is more than 70 g/g, the speed of absorbing body fluids such as urine, and blood is decreased, and it is therefore not suitable for high water absorption rate type paper diapers. Note that the CRC can be controlled by changing the type or amount of the internal crosslinking agent, surface crosslinking agent, or the like.

[3-2] Water-Soluble Component (Ext)

The Ext is normally 1 to 40% by mass, preferably 2 to 35% by mass, more preferably 3 to 30% by mass, even more preferably 4 to 25% by mass, and particularly preferably 5 to 20% by mass.

When the Ext is more than the above-described range, the gel strength is low, resulting in a water-absorbing agent with inferior absorption capacity under pressure or inferior liquid permeability. When the Ext is less than the above-described range, the CRC may become excessively low. Both cases result in a large amount of re-wet, and is therefore not suitable for an absorbent for an absorbent article such as paper diapers. Note that the Ext can be controlled by changing the type or amount of the internal crosslinking agent or the like.

[3-3] Moisture Content

The moisture content of the water-absorbent resin powder (water-absorbing agent) is preferably more than 0% by mass and 20% by mass or less, more preferably 1 to 15% by mass, even more preferably 2 to 13% by mass, and particularly preferably 2 to 10% by mass. When the moisture content is within the above-described range, a water-absorbing agent having excellent powder characteristics (for example, the flowability, transportability, and damage resistance) can be obtained.

[3-4] Particle Size

The mass average particle diameter d3 (D50) of the water-absorbent resin powder (water-absorbing agent) is as described above, and is preferably 200 µm or more, more preferably 200 to 600 µm, even more preferably 250 to 550 µm, and particularly preferably 300 to 500 µm. When the proportion of particles having a particle diameter of less than 150 µm is normally 15% by mass or less, preferably 10% by mass or less, more preferably 8% by mass or less, and even more preferably 6% by mass or less. The proportion of particles having a particle diameter of more than 850 µm is preferably 5% by mass or less, more preferably 3% by mass or less, and even more preferably 1% by mass or less. This water-absorbing agent contains particles having a particle diameter of 150 to 850 µm in an amount of preferably 90% by mass or more, more preferably 95% by mass or more, even more preferably 97% by mass or more, and particularly preferably 99% by mass or more. The amount is ideally 100% by mass. The logarithmic standard deviation ($\sigma\zeta$) of the particle size distribution is preferably 0.20 to 0.50, more preferably 0.25 to 0.40, and even more preferably 0.27 to 0.35.

[3-5] AAP (Water Absorption Capacity Under Pressure)

The AAP (water absorption capacity under pressure) of the water-absorbent resin powder (water-absorbing agent) is preferably 15 g/g or more, more preferably 20 g/g or more, even more preferably 23 g/g or more, particularly preferably 24 g/g or more, and most preferably 25 g/g or more. The upper limit of the AAP is not particularly limited, and is preferably 30 g/g or less.

In a case where the AAP is less than 15 g/g, the amount of liquid returned when a pressure is applied to an absorbent (may be referred to as "Re-Wet") becomes large, and it is therefore not suitable for an absorbent for an absorbent article such as paper diapers. Note that the AAP can be controlled by, for example, adjusting the particle size and changing the surface crosslinking agent.

[3-6] Vortex (Water Absorption Rate)

The Vortex (water absorption rate) of the water-absorbent resin powder (water-absorbing agent) is preferably 60 seconds or less, more preferably 50 seconds or less, even more preferably 40 seconds or less, particularly preferably 30 seconds or less, and most preferably 25 seconds or less. The lower limit of the Vortex is not particularly limited, and is preferably 5 seconds or more, and more preferably 10 seconds or more.

When the Vortex is within the above-described range, a predetermined amount of liquid can be absorbed in a short time. A Vortex within such a range can reduce the period of time during which users feel wet skin and eliminates unpleasant feeling as well as reduce the leakage amount when the water-absorbent resin powder is used for an absorbent for the absorbent article such as paper diapers.

[3-7] Distribution of Surfactant

It is preferred that the content of the surfactant contained in the water-absorbent resin fine powder granulated product is large relative to the average content of the surfactant in the water-absorbent resin powder (water-absorbing agent). The content of the surfactant contained in the water-absorbent resin fine powder granulated product is more preferably 1.5 times or more, and even more preferably 2 times or more relative to the average content of the surfactant in the water-absorbent resin powder (water-absorbing agent). A large content of the surfactant contained in the water absorbent resin fine powder granulated product prevents the water-absorbent resin fine powder granulated product from being broken due to friction during transportation or the like and can suppresses an adverse effect of the surfactant on particles other than the water-absorbent resin fine powder granulated product (primary particles).

Note that it is difficult to extract only the water-absorbent resin fine powder granulated product from the water-absorbent resin powder (water-absorbing agent). Therefore, in the present invention, evaluation is made by the following method by utilizing the characteristics that the water-absorbent resin fine powder granulated product is relatively fragile.

A water-absorbent resin powder (water-absorbing agent) is classified by using JIS standard sieves having a mesh opening size of 850 µm and 150 µm and a Ro-tap type classifier (ES65 type, power source: 100 V, 60 Hz, manufactured by Sieve Factory Iida Co., Ltd.) for 5 minutes, and thus a water-absorbent resin powder (water-absorbing agent) having a particle diameter of 850 to 150 µm is obtained. Then, a damage is applied to 30 g of the water-absorbent resin powder (water-absorbing agent) in accordance with the method (mechanical damage test) described in JP-A-2000-302876 (corresponding to U.S. Pat. No. 6,562,879) by setting the vibration time to 10 minutes. Specifically, 30 g of a water-absorbent resin powder (water-absorbing agent) is shaken together with 10 g of glass beads for 10 minutes by using a paint shaker (manufactured by Toyo Seiki Seisakusho, Ltd., a dispersing machine for No. 488 test). The water-absorbent resin powder (water-absorbing agent) after applying a damage is classified by using a JIS standard sieve having a mesh opening size of 150 µm and the Ro-tap type classifier in a manner as described above, and thus a fine powder having a particle diameter of 150 µm or less is obtained. The fine powder and water-absorbent resin powder (water-absorbing agent) are allowed to be swollen with 50 times (mass ratio) of deionized water, and further allowed to be shrunk with 50 times (mass ratio) of methanol, thus obtaining an extract of a surfactant. This is subjected to quantitative determination using an HPLC, and thereby the content of the surfactant of the fine powder and water-absorbent resin powder (water-absorbing agent) is determined. Here, the content of the surfactant of the fine powder is used as the content of the surfactant of the water-absorbent resin fine powder granulated product.

[4] Application of Water-absorbent Resin Powder (Water-absorbing Agent)

Application of the water-absorbent resin powder (water-absorbing agent) is not particularly limited, and applications for absorbents for absorbent articles such as paper diapers, sanitary napkins, and incontinence pads are preferably exemplified. In particular, the water-absorbent resin powder can be used as an absorbent for high concentration paper diapers. The water-absorbent resin powder of the present invention contains a large amount of fusion controlling agent (surfactant) in the fine powder granulated product. Thus, the water-absorbent resin powder of the present invention is strong against mechanical damage as well as mechanical damage in the production process of the diaper, and is suitable for the production of an absorbent for high concentration paper diapers. Further, the water-absorbing agent excels in water absorption time and has controlled particle size distribution. Thus, the water-absorbing agent is therefore expected to provide a remarkable effect in a case of being used in an upper layer portion of the absorbent.

Further, as a raw material for the absorbent, a water-absorbing material such as pulp fiber can also be used together with the water-absorbing agent. In this case, the content (core concentration) of the water-absorbing agent in the absorbent is preferably 30% by mass to 100% by mass, more preferably 40% by mass to 100% by mass, even more preferably 50% by mass to 100% by mass, still even more preferably 60% by mass to 100% by mass, particularly preferably 70% by mass to 100% by mass, and most preferably 75% by mass to 95% by mass.

By setting the core concentration to the above-described range, the absorbent article can be kept white which imparts a clean feeling in a case where the absorbent is used for an upper layer portion of the absorbent article. Further, the absorbent excels in a diffusion property with respect to body fluids such as urine, and blood, and allows efficient liquid distribution. Thus, improvement of the absorption amount can be expected.

This application claims the benefit of the priority based on Japanese Patent Application No. 2018-094788 filed on May 16, 2018, and Japanese Patent Application No. 2018-210731 filed on Nov. 8, 2018. The entire contents of Japanese Patent Application No. 2018-094788 filed on May 16, 2018, and Japanese Patent Application No. 2018-210731 filed on Nov. 8, 2018 are herein incorporated by reference.

EXAMPLES

Hereinafter, the present invention will be described in more detail by means of examples and comparative examples; however, the present invention is not intended to be limited thereto. Examples obtained by properly combining technical means disclosed in each example are also included in the technical scope of the present invention.

Note that a power source of 200 V or 100 V at 60 Hz was used for the electrical device used in the examples and comparative examples (including a measurement device for the physical properties of the water-absorbent resin) unless otherwise specified. Further, the physical properties of the water-absorbent resin of the present invention were measured under the conditions of room temperature (20° C. to 25° C.) and a relative humidity of 50% RH±10% unless otherwise specified.

Further, "liter" may be denoted as "1" or "L", and "% by mass" or "% by weight" may be denoted as "wt %" for the sake of convenience in some cases. In a case of measuring the amount of trace components, the detection limit or less is denoted as N.D (Non Detected) in some cases.

[Method of Measuring Physical Properties of Hydrogel and Water-absorbent Resin]

(a) CRC (Centrifuge Retention Capacity)

The CRC (centrifuge retention capacity) of the water-absorbent resin was measured in accordance with the EDANA method (ERT441.2-02). For the CRC (centrifuge retention capacity) of the hydrogel, the same operation as in the EDANA method (ERT441.2-02) was performed except for changing to the sample to 0.4 g of a hydrogel and the free swelling time to 24 hours respectively. Further, the solid content ratio α of the hydrogel was separately measured, and the dry mass of the water-absorbent resin in 0.4 g of the hydrogel was determined. Thus, the CRC of the hydrogel was calculated in accordance with the following (Equation 2).

$$\text{CRC of hydrogel (g/g)} = \{(mwi-mb) - msi \times (\alpha/100)\} / \{msi \times (\alpha/100)\} \quad \text{(Equation 2)}$$

Here, in (Equation 2), msi is the mass of the hydrogel before measurement (unit; g), mb is the mass of Blank (non-woven fabric only) which has been freely swollen and dehydrated (unit; g), mwi is the mass of the hydrogel which has been freely swollen and dehydrated (unit; g), and a is the solid content ratio of the hydrogel before measurement (unit; % by mass).

(b) Ext (Water-Soluble Component)

The Ext (water-soluble component) of the hydrogel was measured in accordance with the EDANA method (ERT470.2-02). The same operation as in the EDANA method (ERT470.2-02) was performed except for changing the mass of the hydrogel which is do a sample to 5.0 g, the stirring time to 24 hours respectively. Further, the solid content ratio α of the hydrogel was separately measured, and the dry mass in 0.5 g of the hydrogel was determined. Thus, the Ext of the hydrogel was calculated in accordance with the following (Equation 3).

$$\text{Ext of hydrogel (\% by mass)} = \{(VHC1.s - VHC1.b) \times CHCl \times Mw \times Fdil \times 100\} / ms \times (\alpha/100) \times 1000 \quad \text{(Equation 3)}$$

Here, in (Equation 3), VHCl.s is the HCl amount required to bring the filtrate containing the dissolved polymer from pH 10 to pH 2.7 (unit; ml), VHC1.b is the HCl amount required to bring the Blank (0.9% by mass sodium chloride aqueous solution) from pH 10 to pH 2.7 (unit; ml), CHCl is the concentration of an HCl solution (unit; mol/1), Mw is the average molecular weight of monomer units in the acrylic acid (salt) polymer (unit; g/mol), Fdil is the degree of dilution of the filtrate containing the dissolved polymer, ms is the mass of the water-absorbent resin before measurement (unit; g), and a is the solid content ratio of the water-absorbent resin before measurement (unit; % by mass).

(c) Moisture Content and Solid Content Ratio of Water-absorbent Resin

The moisture content of the dried water-absorbent resin (water-absorbing agent) was measured in accordance with the EDANA method (ERT430.2-02). Note that in the present invention, measurement was performed by changing the amount of sample to 1.0 g, the drying temperature to 180° C. respectively. The solid content ratio (% by mass) was determined by subtracting the moisture content (% by mass) from 100% by mass.

(d) Particle Size of Water-Absorbent Resin

The particle size (mass average particle diameter (D50) and logarithmic standard deviation ($\sigma\zeta$) of the water-absorbent resin powder or particulate dried polymer was measured in accordance with the method described in the columns 27 and 28 of U.S. Pat. No. 7,638,570.

(e) 150 Pass Ratio (Sieve Pass Ratio for Sieve with Mesh Opening Size of 150 μm) and Δ150 Pass Ratio A classification operation same as the measurement method of the mass average particle diameter (D50) described in the above-described (d) was performed. Then, the proportion (% by mass) of particles that have passed through a sieve having a mesh opening size of 150 μm was determined as a 150 pass ratio.

Further, the 150 pass ratio of the water-absorbent resin powder obtained without recovering the fine powder granulated product in the drying step was determined as a reference, and the difference between the 150 pass ratio of the water-absorbent resin powder obtained by recovering the fine powder granulated product and the reference was determined as a Δ150 pass ratio. A smaller Δ150 pass ratio results in less mechanical damage in the drying step and steps after the drying step, which means that generation of the fine powder has been suppressed.

(f) 2,800 on Ratio (Ratio of Particles not Having Passed Through Sieve with Mesh Opening Size of 2,800 μm) and Δ2,800 on Ratio The proportion (% by mass) of particles that have not passed through sieves having a mesh opening size of 4,000 μm and 2,800 μm was determined as a 2,800 on ratio by performing the same classification operation as the measurement method of the mass average particle diameter (D50) described in the above-described (d) expect for using JIS standard sieves having a mesh opening size of 4,000 μm, 2,800 μm, 2,000 μm, 1,400 μm, 1,000 μm, and 850 μm.

Further, the 2,800 on ratio of the dried polymer obtained without recovering the fine powder granulated product in the drying step was determined as a reference, and the difference between the 2,800 on ratio of the dried polymer obtained by recovering the fine powder granulated product and the reference was determined as a Δ2,800 on ratio. A smaller Δ2,800 on ratio means that formation of coarse particles in the drying step has been suppressed.

(g) Polymerization Ratio of Hydrogel

To 1,000 g of ion exchanged water, 1.00 g of a hydrogel was added, and the mixture was stirred at 300 rpm for 2 hours, followed by filtration, thus removing insoluble components. The amount of monomers extracted in the filtrate obtained by the above-described operation was measured by using a liquid chromatograph. The obtained data was subjected to gel solid content correction in accordance with the following (Equation 4) to calculate the polymerization ratio C (unit; % by mass).

$$\text{Polymerization ratio } C \text{ (\% by mass)}=100\times\{1-m/(\alpha\cdot M/100)\} \quad \text{(Equation 4)}$$

Here, in (Equation 4), m is the mass of monomers (unit; g), M is the mass of the hydrogel (unit; g), and a is the solid content ratio of the hydrogel (unit; % by mass).

(h) Moisture Content and Solid Content Ratio of Hydrogel

For the moisture content of the hydrogel before drying, measurement was performed by setting the amount of the hydrogel to 2.0 g, the drying time to 24 hours in the above-described (c). First, 2.00 g of a hydrogel was charged in an aluminium cup with a bottom surface diameter of 50 mm, and then the total mass W1 (g) of the sample (hydrogel and aluminium cup) was precisely weighed. Then, the sample was left to stand in an oven set at an atmospheric temperature of 180° C. After a lapse of 24 hours, the sample was taken out from the oven, and the total mass W2 (g) was precisely weighed. When the mass of the hydrogel subjected to this measurement is defined as M(g), the moisture content of the hydrogel (100−α)(% by mass) was determined in accordance with the following (Equation 5). Note that in the following (Equation 5), a is the solid content ratio of the hydrogel (% by mass).

$$(100-\alpha)(\% \text{ by mass})=\{(W1-W2)/M\}\times 100 \quad \text{(Equation 5)}$$

(i) Particle Size of Particulate Hydrogel

The particle size (mass average particle diameter (D50) and logarithmic standard deviation ($\sigma\zeta$) of the particulate hydrogel was measured by the following method.

To 1,000 g of a 20% by mass sodium chloride aqueous solution containing 0.08% by mass Emal 20C (surfactant, manufactured by Kao Corporation) (hereinafter, referred to as "Emal aqueous solution"), 20 g of a particulate hydrogel at a temperature of 20 to 25° C. (solid content ratio α % by mass) was added to form a dispersion. The dispersion was stirred by using a stirrer chip with a length 50 mm×diameter 7 mm at 300 rpm for 16 hours. The container used is a cylindrical container made of polypropylene (height: 21 cm, diameter: 8 cm, inner volume: about 1.14 L).

After end of stirring, the dispersion was placed on a central portion of JIS standard sieves (diameter: 21 cm, mesh opening size: 8 mm/4 mm/2 mm/1 mm/0.60 mm/0.30 mm/0.15 mm/0.075 mm) provided on a rotary table. After all the hydrogel was washed out on the sieve by using 100 g of an Emal aqueous solution, the hydrogel was classified by repeating, four times, an operation of uniformly spraying 6,000 g of the Emal aqueous solution onto the sieve by using a shower (number of holes: 72, flow rate: 6.0 [L/min]) from 30 cm above the sieve in a manner such that the spraying range (50 cm²) entirely covered the sieve while rotating the sieve by hand (at 20 rpm).

The classified hydrogel remaining on a first-stage sieve was drained for about 2 minutes, and then the resulting hydrogel was weighed. The hydrogels of the second or later-stage sieves were classified by the same operation, and after draining, hydrogels remained on respective sieves were each weighed. Note that the sieves were appropriately changed depending on the gel particle diameter. For example, in a case where the particle diameter of the hydrogel is fine and clogging occurs in sieves having a mesh opening size of 0.15 mm and 0.075 mm, classification was performed by replacing these sieves with a JIS standard sieve having a larger diameter (diameter: 30 cm, mesh opening size: 0.15 mm, and 0.075 mm).

The proportion (% by mass) of the hydrogel remained on each sieve was calculated from the mass of the hydrogel remained on each sieve by the following (Equation 6). The mesh opening size of the sieve after draining was calculated in accordance with the following (Equation 7), and the particle size distribution of the hydrogel was plotted on logarithmic probability paper. The particle diameter at which the cumulative percentage "% R" of particles on sieve corresponds to 50% by mass was used as the mass average particle diameter (D50) of the hydrogel. The particle diameter corresponding to the cumulative percentage "% R" of particles on sieve=84.1% (this is defined as X1) and the particle diameter corresponding to the cumulative percentage "% R" of particles on sieve=15.9% (this is defined as X2) were determined from the plot, and the logarithmic standard deviation (σζ) was determined from the following (Equation 8). A smaller value of σζ means narrow particle size distribution.

$$X\ (\%) = (w/W) \ast 100 \quad \text{(Equation 6)}$$

$$R(\alpha)(mm) = (20/W)^{1/3} \ast r \quad \text{(Equation 7)}$$

Here, in (Equation 6) and (Equation 7),

X; mass percentage "mass %" (%) of the hydrogel remaining on each sieve after classifying and draining w; mass (g) of each hydrogel remaining on each sieve after classifying and draining W; total mass (g) of the hydrogel remaining on each sieve after classifying and draining R(α); mesh opening size (mm) of the sieve when converted into a water-absorbent resin with a solid content ratio of a % by mass r; mesh opening size (mm) of the sieve that was used for classification of a hydrogel crosslinked polymer (hydrogel particle) swollen in a 20% by mass sodium chloride aqueous solution $$\sigma\zeta = 0.5 \times \ln(X2/X1) \quad \text{(Equation 8)}$$

(j) Mass Average Particle Diameter of Hydrogel in Terms of Solid Content

The mass average particle diameter in terms of solid content (mass average particle diameter of the hydrogel particle after drying) was determined from the above-described (h) moisture content of hydrogel and (i) mass average particle diameter of particulate hydrogel in accordance with the following (Equation 9).

$$\text{Solid D50} = \text{Gel D50} \times (GS/100)^{1/3} \quad \text{(Equation 9)}$$

Here, in (Equation 9),

Gel D50; mass average particle diameter of the hydrogel particle (μm)

GS; solid content ratio of the hydrogel particle (% by mass) Solid D50; mass average particle diameter of the hydrogel particle in terms of dried product (μm)

(k) Vortex (Water Absorption Time)

The Vortex (water absorption time) of the water-absorbent resin was measured in accordance with the following procedure. First, 0.02 parts by mass of Food Blue No. 1 (Brilliant Blue), which is a food additive, was added to 1,000 parts by mass of a saline solution prepared in advance (0.9% by mass sodium chloride aqueous solution), and then the liquid temperature was adjusted to 30° C.

Then, 50 ml of the saline solution was measured and placed in a 100 ml beaker, and 2.0 g of a water-absorbent resin was added to the saline solution with stirring by using a stirrer chip having a length of 40 mm and diameter of 8 mm at 600 rpm. Measurement was performed assuming that the time at which the water-absorbent resin was added is defined as the starting point, and the time period taken until the water-absorbent resin absorbs the saline solution to cover the stirrer chip is defined as Vortex (water absorption time)(unit; second).

(l) AAP (Water Absorption Capacity under Pressure) of Water-absorbent Resin

The AAP (water absorption capacity under pressure) of the water-absorbent resin was measured in accordance with the EDANA method (ERT442.2-02). Note that in the measurement, the load condition was changed to 4.83 kPa (0.7 psi).

(m) Flowability Evaluation of Fine Powder Granulated Product

A fine powder granulated product (100 g) obtained by adding an aqueous liquid to fine powder to perform granulation in each of the examples was charged in a cylindrical plastic container (inner wall: fluororesin coating, height: 12 cm, bottom diameter: 8 cm) immediately after granulation. After a lapse of a predetermined time, the charging port of the container was closed with a vat, and the container was turned upside down and allowed to stand. Then, the cylindrical plastic container was pulled upward and allowed to stand for 3 minutes. Thereafter, the largest width of the fine powder granulated product spread on the vat by its weight was measured and determined as the degree of aggregate disintegration (unit: cm). The flowability of the fine powder granulated product was evaluated based on the degree of aggregate disintegration.

(Evaluation Criteria)

Degree of aggregate disintegration: poor: 10 cm or less: it is difficult to disintegrate Degree of aggregate disintegration: good: 11 cm or more and 15 cm or less: it is easy to disintegrate Degree of aggregate disintegration: excellent: 16 cm or more: it is considerately easy to disintegrate (Production of Particulate Hydrogel)

Production Example 1

An aqueous monomer solution containing 300 parts by mass of acrylic acid, 100 parts by mass of a 48% by mass sodium hydroxide aqueous solution, 0.61 parts by mass of polyethylene glycol diacrylate (average n: 9), 16.4 parts by mass of a 0.1% by mass trisodium diethylene triamine pentaacetate aqueous solution, and 273.2 parts by mass of deionized water was prepared.

Subsequently, the aqueous monomer solution whose temperature has been adjusted to 38° C. was continuously supplied with a quantitative pump. Then, 150.6 parts by mass of a 48% by mass sodium hydroxide aqueous solution was further continuously mixed in a static mixer. Note that the liquid temperature of the aqueous monomer solution at this time was raised to 87° C. from the heat of neutralization.

Further, 14.6 parts by mass of a 4% by mass sodium persulfate aqueous solution was continuously mixed in a static mixer, and then continuously supplied to a continuous polymerizer equipped with a flat polymerization belt having a gate on both ends so that the thickness is 10 mm. Thereafter, polymerization was continuously performed (polymerization time: 3 minutes) to obtain a belt-like hydrogel (1a) which is a hydrogel crosslinked polymer. The resulting belt-like hydrogel (1a) was continuously cut into equal lengths of 300 mm in the width direction with respect to the traveling direction of the polymerization belt to obtain a strip-like hydrogel (1b).

Gel crushing was performed while supplying the resulting hydrogel (1b) and a 3.1% by mass lauryl dimethylaminoacetic acid betaine aqueous solution to a screw extruder at the same time. The supply amount of the lauryl dimethylaminoacetic acid betaine aqueous solution was determined such that the amount of lauryl dimethylaminoacetic acid betaine is 0.15% by mass relative to the solid content of the hydrogel (1b). Gel crushing (first gel crushing) was performed by using, as the screw extruder, a meat chopper equipped with a screw shaft having an outer diameter of 86 mm and a perforated plate having a diameter of 100 mm, a pore size of 8.0 mm, and a thickness of 10 mm provided on the tip end, while supplying water and water vapor at the same time as the hydrogel (1b). Next, the perforated plate was changed to one having a pore size of 4.7 mm, and the crushed gel obtained in the first gel crushing was further gel crushed (second gel crushing) while supplying water and water vapor. The resulting particulate hydrogel (1) had a solid content ratio of 44% by mass (moisture content was 56% by mass), an average particle diameter d1 in terms of solid content of 130 µm, and a proportion of particles having a particle diameter of less than 150 µm of about 53% by mass. The particulate hydrogel (1) had a polymerization ratio of 98.6%, a CRC of 36 g/g, and a water-soluble component of 6%. The particulate hydrogel (1) contains 1,500 ppm of lauryl dimethylaminoacetic acid betaine (surfactant) which was added as a gel fluidizer, in terms of solid content with respect to the particulate hydrogel.

(Band Drying)

Production Example 2

The particulate hydrogel (1) obtained in Production Example 1 was dried by using a ventilation band type dryer. First, the particulate hydrogel (1) was spread onto the ventilation plate (punching metal) of this dryer so that the thickness is about 10 cm. Subsequently, hot air at 185° C. was allowed to be circulated for 35 minutes, thus obtaining a dried polymer (1). The dried polymer (1) obtained in the outlet of the dryer was integrated and aggregated into a block-like sheet. The lateral width of the dried polymer (1) corresponds to substantially the width of the drying belt, the length was endless, and the thickness was several cm.

The resulting dried polymer (1) was cooled by air, and then crushed by a disintegrating apparatus (first crusher) equipped with a rotating shaft having a plurality of vanes. Then, the crushed dried polymer (1) was supplied to a three-stage roll mill (second crusher) and further crushed, thus obtaining a water-absorbent resin powder (1). The water-absorbent resin powder (1) contained lauryl dimethylaminoacetic acid betaine derived from the particulate hydrogel (1), and had a mass average particle diameter (d2) of 350 µm, a proportion of particles that have passed through a sieve having a mesh opening size of 150 µm (150 pass ratio) of 14.0% by mass, and a solid content ratio of 97.6% by mass.

(Stirring Drying)

Production Example 3

The particulate hydrogel (1) obtained in Production Example 1 was dried by using a rotary type dryer. This dryer includes a cylindrical rotating container (volume: 100 L) having ten heating tubes extending in the direction of the rotating shaft and two partitions (doughnut-shaped partitions each having a circular opening at the center portion thereof, opening ratio: 50%) provided inside the rotating container. The portion from a charging portion to the outlet port was inclined downwardly at 0.6°. The end portion on the side of the outlet port in the rotating container has a doughnut-shaped partition (another name; discharge gate) having one circular opening (opening ratio: 24%) at the center thereof.

First, a water vapor of 2.7 MPa (temperature: 228.1° C.) was introduced in each heating tube. The interior of the rotating container (defined by a contact thermometer) was heated to more than 200° C. in advance. Further, the outer wall of the rotating container was sufficiently heated with a trace. Thereafter, the particulate hydrogel (1) at 95° C. obtained in Production Example 1 was supplied to the dryer at 15 kg/h, and continuous drying was performed by rotating the rotating container so that the Froude number Fr was 0.07 with an average residence time of 50 minutes. The supply amount and exhaust amount of air (carrier gas; 140° C.) during drying was adjusted so that the pressure difference between the interior of the rotating container and the outside air was −20 Pa and the exhaust gas dew point was 90° C. The hydrogels in the rotating container were sampled at a plurality of sites in the dryer, and the solid content ratios thereof were measured. The hydrogel during drying was divided into three regions by two doughnut-shaped partitions (opening ratio: 50%) provided at two sites of the middle portion of the rotating container. The three regions are divided based on a solid content ratio of about 90% by mass and a solid content ratio of about 95% by mass as a boundary. After drying, the temperature of the dried polymer (2) collected at the outlet port was 200° C., and a large part of the dried polymer (2) was a granulated particle. The dried polymer (2) had a solid content ratio of 98.5% by mass, and a proportion of particles that have not passed through a sieve having a mesh opening size (2,800 on ratio) of 2,800 µm of 7.4% by mass in terms of solid content.

Subsequently, the dried polymer (2) discharged from the outlet port of the dryer was forcibly cooled to 80° C. or less with cold air. The cooled product was supplied to a one-stage roll mill (crusher) and then crushed to adjust the particle size, thus obtaining a water-absorbent resin powder (2). The water-absorbent resin powder (2) contained lauryl dimethylaminoacetic acid betaine derived from the particulate hydrogel (1), and had a mass average particle diameter (d2) of 350 µm, a proportion of particles that have passed through a sieve having a mesh opening size of 150 µm (150 pass ratio) of 10.8% by mass, and a solid content ratio of 97.5% by mass.

Thereafter, the water-absorbent resin powder (2) was classified by using JIS standard sieves having a mesh opening size of 850 µm and 180 µm, thus obtaining a fine powder (1) which has passed through a sieve having a mesh opening size of 180 µm. The fine powder (1) contained lauryl dimethylaminoacetic acid betaine derived from the particulate hydrogel (1), and had a solid content ratio of 95.2% by mass, a mass average particle diameter (d3) of 102 µm, a proportion of particles that have passed through a sieve having a mesh opening size of 150 µm (150 pass ratio) of 93.9% by mass, and a CRC of 37.2 g/g.

Production Example 4

The dried polymer (2) obtained in Production Example 3 was forcibly cooled to 80° C. or less with cold air. The cooled product was supplied to a one-stage roll mill (crusher) and then crushed to adjust the particle size by changing the crushing condition, thus obtaining a water-absorbent resin powder (3). The water-absorbent resin powder (3) contained lauryl dimethylaminoacetic acid betaine derived from the particulate hydrogel (1), and had a mass average particle diameter (d2) of 420 µm, a proportion of particles that have passed through a sieve having a mesh opening size of 150 µm (150 pass ratio) of 7.8% by mass, and a solid content ratio of 97.6% by mass.
(Surface Crosslinking During Stirring Drying)

Production Example 5

A dried polymer (4) and a water-absorbent resin powder (4) were obtained in the same manner as in Production Example 3 except for spray-adding 2.6% by mass of a surface crosslinking agent solution containing 0.16% by mass of ethylene glycol diglycidyl ether and 2% by mass of water to the particulate hydrogel (1) in the middle of drying in the rotary type dryer of Production Example 3. The particulate hydrogel (1) at the time of addition of the surface crosslinking agent solution had a moisture content of 30% by mass and a temperature of 110° C. The dried polymer (4) had a solid content ratio of 98.5% by mass, and a proportion of particles that have not passed through a sieve having a mesh opening size of 2,800 µm (2,800 on ratio) of 7.5% by mass in terms of solid content. The water-absorbent resin powder (4) had a mass average particle diameter (d2) of 350 µm, a proportion of particles that have passed through a sieve having a mesh opening size of 150 µm (150 pass ratio) of 10.5% by mass, and a solid content ratio of 97.8% by mass.

Then, to 30 g of the water-absorbent resin powder (4), hydrotalcite (product name "DHT-6" manufactured by Kyowa Chemical Industry Co., Ltd., $Mg_6Al_2(OH)_{16}CO_3$ $4H_2O$, volume average particle diameter: 0.5 µm) was added in an amount of 0.3 parts by mass relative to 100 parts by mass of the water-absorbent resin powder (4).

Thereafter, the water-absorbent resin powder (4-2) was classified by using JIS standard sieves having a mesh opening size of 850 µm and 180 µm, thus obtaining a fine powder (2) which has passed through a sieve having a mesh opening size of 180 µm. The fine powder (2) contained lauryl dimethylaminoacetic acid betaine derived from the particulate hydrogel (1), and had a solid content ratio of 95.4% by mass, a mass average particle diameter (d3) of 114 µm, a proportion of particles that have passed through a sieve having a mesh opening size of 150 µm (150 pass ratio) of 90.9% by mass, and a CRC of 24.9 g/g.
(Production of Fine Powder Granulated Product)

Production Example 6

Granulation of fine powder was performed by using a vertical rotated disk type mixer (manufactured by Funken Powtechs Inc.) equipped with a stirring vane, a disintegrating vane, a discharging vane, and a nozzle and having an inner volume of 7 L (effective volume of the stirring part: 5 L). The fine powder (1) obtained in Production Example 3 was supplied to the vertical rotated disk type mixer by using a quantitative feeder (manufactured by Accurate Inc.) at 200 kg/hr. Then, an adhesion controlling agent aqueous solution (lauryl dimethylaminoacetic acid betaine aqueous solution, concentration of effective component: 0.253% by mass, temperature: 50° C.) and water vapor (gauge pressure: 0.6 MPa, the internal pressure of the mixer was released) were injected and continuously mixed while stirring the fine powder (1) by rotating the stirring vane at 1,060 rpm using a mixer (continuous injection mixer, Flow Jet Mixer, MW-F-300 type (improved version in which a pin on the rotary table has been removed), manufactured by Funken Powtechs Inc.). Thus, a fine powder granulated product (1) containing lauryl dimethylaminoacetic acid betaine as an adhesion controlling agent was obtained. The added amount of the adhesion controlling agent was 2,200 ppm relative to the solid content of the fine powder (1), and the injection rate of water vapor was 15 kg/hr. The fine powder granulated product (1) had a solid content ratio of 50% by mass.

Production Example 7

A fine powder granulated product (2) was obtained in the same manner as in Production Example 6 except for using water (50° C.) in place of the adhesion controlling agent aqueous solution. The fine powder granulated product (2) had a solid content ratio of 50% by mass.

Production Example 8

A fine powder granulated product (3) containing lauryl dimethylaminoacetic acid betaine as an adhesion controlling agent was obtained in the same manner as in Production Example 6 with the exception that the fine powder (2) obtained in Production Example 5 was used in place of the fine powder (1), the concentration of the effective component of the adhesion controlling agent aqueous solution was 0.092% by mass, and the added amount of the adhesion controlling agent was 800 ppm relative to the solid content of the fine powder (2). The fine powder granulated product (3) had a solid content ratio of 50% by mass.

Production Example 9

A fine powder granulated product (4) containing lauryl dimethylaminoacetic acid betaine as an adhesion controlling agent was obtained in the same manner as in Production Example 6 with the exception that the fine powder (2) obtained in Production Example 5 was used in place of the fine powder (1), the concentration of the effective component of the adhesion controlling agent aqueous solution was 0.252% by mass, and the added amount of the adhesion controlling agent was 2200 ppm relative to the solid content of the fine powder (2). The fine powder granulated product (4) had a solid content ratio of 50% by mass.

Production Example 10

A fine powder granulated product (5) containing lauryl dimethylaminoacetic acid betaine as an adhesion controlling agent was obtained in the same manner as in Production Example 6 with the exception that the fine powder (2) obtained in Production Example 5 was used in place of the fine powder (1), the concentration of the effective component of the adhesion controlling agent aqueous solution was 0.573% by mass, and the added amount of the adhesion controlling agent was 5000 ppm relative to the solid content of the fine powder (2). The fine powder granulated product (5) had a solid content ratio of 50% by mass.

Production Example 11

A fine powder granulated product (6) was obtained in the same manner as in Production Example 6 with the exception that the fine powder (2) obtained in Production Example 5 was used in place of the fine powder (1) and using water (50°

C.) in place of the adhesion controlling agent aqueous solution. The fine powder granulated product (6) had a solid content ratio of 50% by mass.

Reference Example 1

The dried polymer (1) and water-absorbent resin powder (1) obtained in Production Example 2 were used for Reference Example 1. Reference Example 1 is a production method in which the fine powder granulated product was not recovered in the drying step, and is a reference product for Examples 1 and 2, and Comparative Examples 1 and 2. The results of Reference Example 1, Examples 1 and 2, and Comparative Examples 1 and 2 are summarized in Table 1.

Example 1

The particulate hydrogel (1) obtained in polymerization and gel crushing in Production Example 1 (solid content: 44% by weight) and the fine powder granulated product (1) obtained in Production Example 6 (hydrogel fine powder granulated product)(solid content: 50% by weight) were mixed at a mass ratio of 85/15 (about 87/13 in terms of solid content ratio), thus obtaining a hydrogel mixture (1). A dried polymer (5) and a water-absorbent resin powder (5) were obtained in the same manner as in Production Example 2 except for using this hydrogel mixture (1) in place of the particulate hydrogel (1). Note that the temperatures of the particulate hydrogel (1) and fine powder granulated product (1) immediately before mixing were respectively 95° C. and 60° C. due to heating.

The dried polymer (5) was integrated and aggregated into a block-like sheet. The lateral width of the dried polymer (5) corresponds to substantially the width of the drying belt, the length was endless, and the thickness was several cm. The water-absorbent resin powder (5) had a proportion of particles that have passed through a sieve having a mesh opening size of 150 μm (150 pass ratio) of 18.2% by mass, and a Δ150 pass ratio which is the difference between Reference Example 1 as the reference product of 4.2% by mass.

Note that the water-absorbent resin powder (5) is a water-absorbent resin powder formed of 83% of primary particles of the water-absorbent resin derived from the particulate hydrogel (1), and 17% of water-absorbent resin granulated particles derived from the fine powder granulated product (1) containing an adhesion controlling agent. In addition to 1,500 ppm of the surfactant contained in the water-absorbent resin fine powder (1), 2,200 ppm of the surfactant which has been added in Production Example 6 was added to the water absorbent resin fine powder granulated product. Thus, the water absorbent resin fine powder granulated product contains the surfactant more than the primary particles of the water-absorbent resin by 2,200 ppm.

Example 21

The particulate hydrogel (1) obtained by Production Example 1 (solid content: 44% by weight) and the fine powder granulated product (4) obtained in Production Example 9 (solid content: 50% by weight) were mixed at a mass ratio of 85/15 (about 83/17 in terms of solid content ratio), thus obtaining a hydrogel mixture (2). A dried polymer (6) and a water-absorbent resin powder (6) were obtained in the same manner as in Production Example 2 except for using this hydrogel mixture (2) in place of the particulate hydrogel (1). Note that the temperatures of the particulate hydrogel (1) and fine powder granulated product (4) immediately before mixing were respectively 95° C. and 60° C. due to heating.

The dried polymer (6) was integrated and aggregated into a block-like sheet. The lateral width of the dried polymer (6) corresponds to substantially the width of the drying belt, the length was endless, and the thickness was several cm. The water-absorbent resin powder (6) had a proportion of particles that have passed through a sieve having a mesh opening size of 150 μm (150 pass ratio) of 18.5% by mass, and a Δ150 pass ratio which is the difference between Reference Example 1 as the reference product of 4.5% by mass.

Herein, the water-absorbent resin powder (6) is a water-absorbent resin powder formed of 83% of primary particles of the water-absorbent resin derived from the particulate hydrogel (1), and 17% of water-absorbent resin granulated particles derived from the fine powder granulated product (4) containing an adhesion controlling agent. In addition to 1,500 ppm of the surfactant contained in the water-absorbent resin fine powder (2), 2,200 ppm of the surfactant which has been added in Production Example 9 was added to the water absorbent resin fine powder granulated product. Thus, the water absorbent resin fine powder granulated product contains the surfactant more than the primary particles of the water-absorbent resin by 2,200 ppm.

Comparative Example 1

The particulate hydrogel (1) obtained by Production Example 1 and the fine powder granulated product (2) obtained in Production Example 7 were mixed at a mass ratio of 85/15 (about 83/17 in terms of solid content ratio), thus obtaining a hydrogel mixture (8). A dried polymer (12) and a water-absorbent resin powder (12) were obtained in the same manner as in Production Example 2 except for using this hydrogel mixture (8) in place of the particulate hydrogel (1). Note that the temperatures of the particulate hydrogel (1) and fine powder granulated product (2) immediately before mixing were respectively 95° C. and 60° C. due to heating.

The dried polymer (12) was integrated and aggregated into a block-like sheet. The lateral width of the dried polymer (12) corresponds to substantially the width of the drying belt, the length was endless, and the thickness was several cm. The water-absorbent resin powder (12) had a proportion of particles that have passed through a sieve having a mesh opening size of 150 μm (150 pass ratio) of 19.2% by mass, and a Δ150 pass ratio which is the difference between Reference Example 1 as the reference product of 5.2% by mass.

Herein, the water-absorbent resin powder (12) is a water-absorbent resin powder formed of 83% of primary particles of the water-absorbent resin derived from the particulate hydrogel (1), and 17% of water-absorbent resin granulated particles derived from the fine powder granulated product (2) containing no adhesion controlling agent. The water-absorbent resin granulated particles contain the same amount of the surfactant as the primary particles of the water-absorbent resin.

Comparative Example 2

The particulate hydrogel (1) obtained by Production Example 1 and the fine powder granulated product (6) obtained in Production Example 6 were mixed at a mass ratio of 85/15 (about 83/17 in terms of solid content ratio), thus obtaining a hydrogel mixture (9). A dried polymer (13) and a water-absorbent resin powder (13) were obtained in the same manner as in Production Example 2 except for using this hydrogel mixture (9) in place of the particulate hydrogel (1). Note that the temperatures of the particulate hydrogel (1) and fine powder granulated product (6) immediately before mixing were respectively 95° C. and 60° C. due to heating.

The dried polymer (13) was integrated and aggregated into a block-like sheet. The lateral width of the dried polymer (13) corresponds to substantially the width of the drying belt, the length was endless, and the thickness was several cm. The water-absorbent resin powder (13) had a proportion of particles that have passed through a sieve having a mesh opening size of 150 μm (150 pass ratio) of 19.5% by mass, and a Δ150 pass ratio which is the difference between Reference Example 1 as the reference product of 5.5% by mass.

Herein, the water-absorbent resin powder (13) is a water-absorbent resin powder formed of 83% of primary particles of the water-absorbent resin derived from the particulate hydrogel (1), and 17% of water-absorbent resin granulated particles derived from the fine powder granulated product (6) containing no adhesion controlling agent. The water-absorbent resin granulated particles contain no additional adhesion controlling agent.

(1) and fine powder granulated product (1) immediately before mixing were respectively 95° C. and 60° C. due to heating.

The dried polymer (7) had a proportion of particles that have un-passed through a sieve having a mesh opening size of 2800 μm (2800 on ratio) of 12.1% by mass, and a Δ2800 on ratio which is the difference between Reference Example 2 as the reference product of 4.7% by mass. The water-absorbent resin powder (7) had a proportion of particles that have passed through a sieve having a mesh opening size of 150 μm (150 pass ratio) of 14.1% by mass, and a Δ150 pass ratio which is the difference between Reference Example 2 as the reference product of 3.3% by mass.

Herein, the water-absorbent resin powder (7) is a water-absorbent resin powder formed of 83% of primary particles of the water-absorbent resin derived from the particulate hydrogel (1), and 17% of water-absorbent resin granulated particles derived from the fine powder granulated product (1) containing an adhesion controlling agent. In addition to 1,500 ppm of the surfactant contained in the water-absorbent resin fine powder (1), 2,200 ppm of the surfactant which has been added in Production Example 6 was added to the water-absorbent resin fine powder granulated product. Thus, the water-absorbent resin fine powder granulated product contains the surfactant more than the primary particles of the water-absorbent resin by 2,200 ppm.

TABLE 1

| | Fine powder granulated product | Drying method | Dried polymer | | | Water-absorbent resin powder | | | |
|---|---|---|---|---|---|---|---|---|---|
| | | | Solid content ratio wt. % | 2800 on ratio wt. % | Δ2800 on ratio wt. % | Solid content ratio wt. % | Particle diameter d2 μm | 150 pass ratio wt. % | Δ150 pass ratio wt. % |
| Reference Example 1 | — | A | — | Block-like | — | 97.6 | 350 | 14.0 | — |
| Example 1 | (1) | A | — | Block-like | — | 97.5 | 348 | 18.2 | 4.2 |
| Example 2 | (4) | A | — | Block-like | — | 97.6 | 345 | 18.5 | 4.5 |
| Comparative Example 1 | (2) | A | — | Block-like | — | 97.1 | 344 | 19.2 | 5.2 |
| Comparative Example 2 | (6) | A | — | Block-like | — | 97.2 | 342 | 19.5 | 5.5 |

A: ventilation band type dryer

Reference Example 2

The dried polymer (2) and water-absorbent resin powder (2) obtained in Production Example 3 were used for Reference Example 2. Reference Example 2 is a production method in which the fine powder granulated product was not recovered in the drying step, and is a reference product for Examples 3-6, and Comparative Examples 3 and 4. The results of Reference Example 2, Examples 3-6, and Comparative Examples 3 and 4 are summarized in Table 2.

Example 3

The particulate hydrogel (1) obtained by Production Example 1 and the fine powder granulated product (1) obtained in Production Example 6 were mixed at a mass ratio of 85/15 (about 83/17 in terms of solid content ratio), thus obtaining a hydrogel mixture (3). A dried polymer (7) and a water-absorbent resin powder (7) were obtained in the same manner as in Production Example 3 except for using this hydrogel mixture (3) in place of the particulate hydrogel (1). Note that the temperatures of the particulate hydrogel Example 4

The particulate hydrogel (1) obtained by Production Example 1 and the fine powder granulated product (3) obtained in Production Example 8 were mixed at a mass ratio of 85/15 (about 83/17 in terms of solid content ratio), thus obtaining a hydrogel mixture (4). A dried polymer (8) and a water absorbent resin powder (8) were obtained in the same manner as in Production Example 3 except for using this hydrogel mixture (4) in place of the particulate hydrogel (1). Note that the temperatures of the particulate hydrogel (1) and fine powder granulated product (3) immediately before mixing were respectively 95° C. and 60° C. due to heating.

The dried polymer (8) had a proportion of particles that have un-passed through a sieve having a mesh opening size of 2800 μm (2800 on ratio) of 7.7% by mass, and a Δ2800 on ratio which is the difference between Reference Example 2 as the reference product of 0.3% by mass. The water-absorbent resin powder (8) had a proportion of particles that have passed through a sieve having a mesh opening size of 150 μm (150 pass ratio) of 14.1% by mass, and a Δ150 pass ratio which is the difference between Reference Example 2 as the reference product of 3.3% by mass.

Herein, the water-absorbent resin powder (8) is a water-absorbent resin powder formed of 83% of primary particles of the water-absorbent resin derived from the particulate hydrogel (1), and 17% of water-absorbent resin granulated particles derived from the fine powder granulated product (3) containing an adhesion controlling agent. In addition to 1,500 ppm of the surfactant contained in the water-absorbent resin fine powder (2), 800 ppm of the surfactant which has been added in Production Example 8 was added to the water absorbent resin fine powder granulated product. Thus, the water absorbent resin fine powder granulated product contains the surfactant more than the primary particles of the water-absorbent resin by 800 ppm.

Example 51

The particulate hydrogel (1) obtained by Production Example 1 and the fine powder granulated product (4) obtained in Production Example 9 were mixed at a mass ratio of 85/15 (about 83/17 in terms of solid content ratio), thus obtaining a hydrogel mixture (5). A dried polymer (9) and a water absorbent resin powder (9) were obtained in the same manner as in Production Example 3 except for using this hydrogel mixture (5) in place of the particulate hydrogel (1). Note that the temperatures of the particulate hydrogel (1) and fine powder granulated product (4) immediately before mixing were respectively 95° C. and 60° C. due to heating.

The dried polymer (9) had a proportion of particles that have un-passed through a sieve having a mesh opening size of 2800 μm (2800 on ratio) of 4.8% by mass, and a Δ2800 on ratio which is the difference between Reference Example 2 as the reference product of −2.6% by mass. The water-absorbent resin powder (9) had a proportion of particles that have passed through a sieve having a mesh opening size of 150 μm (150 pass ratio) of 13.7% by mass, and a Δ150 pass ratio which is the difference between Reference Example 2 as the reference product of 2.9% by mass.

Herein, the water-absorbent resin powder (9) is a water-absorbent resin powder formed of 83% of primary particles of the water-absorbent resin derived from the particulate hydrogel (1), and 17% of water-absorbent resin granulated particles derived from the fine powder granulated product (4) containing an adhesion controlling agent. In addition to 1,500 ppm of the surfactant contained in the water-absorbent resin fine powder (2), 2,200 ppm of the surfactant which has been added in Production Example 9 was added to the water absorbent resin fine powder granulated product. Thus, the water absorbent resin fine powder granulated product contains the surfactant more than the primary particles of the water-absorbent resin by 2,200 ppm.

Example 61

The particulate hydrogel (1) obtained by Production Example 1 and the fine powder granulated product (5) obtained in Production Example 10 were mixed at a mass ratio of 85/15 (about 83/17 in terms of solid content ratio), thus obtaining a hydrogel mixture (6). A dried polymer (10) and a water-absorbent resin powder (10) were obtained in the same manner as in Production Example 3 except for using this hydrogel mixture (6) in place of the particulate hydrogel (1). Note that the temperatures of the particulate hydrogel (1) and fine powder granulated product (5) immediately before mixing were respectively 95° C. and 60° C. due to heating.

The dried polymer (10) had a proportion of particles that have un-passed through a sieve having a mesh opening size of 2800 μm (2800 on ratio) of 3.5% by mass, and a Δ2800 on ratio which is the difference between Reference Example 2 as the reference product of −3.9% by mass. The water-absorbent resin powder (10) had a proportion of particles that have passed through a sieve having a mesh opening size of 150 μm (150 pass ratio) of 13.8% by mass, and a Δ150 pass ratio which is the difference between Reference Example 2 as the reference product of 3.0% by mass.

Herein, the water-absorbent resin powder (10) is a water-absorbent resin powder formed of 83% of primary particles of the water-absorbent resin derived from the particulate hydrogel (1), and 17% of water-absorbent resin granulated particles derived from the fine powder granulated product (5) containing an adhesion controlling agent. In addition to 1,500 ppm of the surfactant contained in the water-absorbent resin fine powder (2), 5,000 ppm of the surfactant which has been added in Production Example 10 was added to the water-absorbent resin fine powder granulated product. Thus, the water-absorbent resin fine powder granulated product contains the surfactant more than the primary particles of the water-absorbent resin by 5,000 ppm.

Comparative Example 3

The particulate hydrogel (1) obtained by Production Example 1 and the fine powder granulated product (2) obtained in Production Example 7 were mixed at a mass ratio of 85/15 (about 83/17 in terms of solid content ratio), thus obtaining a hydrogel mixture (10). A dried polymer (14) and a water-absorbent resin powder (14) were obtained in the same manner as in Production Example 3 except for using this hydrogel mixture (10) in place of the particulate hydrogel (1). Note that the temperatures of the particulate hydrogel (1) and fine powder granulated product (2) immediately before mixing were respectively 95° C. and 60° C. due to heating.

The dried polymer (14) had a proportion of particles that have un-passed through a sieve having a mesh opening size of 2800 μm (2800 on ratio) of 22.3% by mass, and a Δ2800 on ratio which is the difference between Reference Example 2 as the reference product of 14.9% by mass. The water-absorbent resin powder (14) had a proportion of particles that have passed through a sieve having a mesh opening size of 150 μm (150 pass ratio) of 15.9% by mass, and a Δ150 pass ratio which is the difference between Reference Example 2 as the reference product of 5.1% by mass.

Herein, the water-absorbent resin powder (14) is a water-absorbent resin powder formed of 83% of primary particles of the water-absorbent resin derived from the particulate hydrogel (1), and 17% of water-absorbent resin granulated particles derived from the fine powder granulated product (2) containing no adhesion controlling agent. The water-absorbent resin granulated particles contain the same amount of the surfactant as the primary particles of the water-absorbent resin.

Comparative Example 4

The particulate hydrogel (1) obtained by Production Example 1 and the fine powder granulated product (6) obtained in Production Example 11 were mixed at a mass ratio of 85/15 (about 83/17 in terms of solid content ratio), thus obtaining a hydrogel mixture (11). A dried polymer (15) and a water-absorbent resin powder (15) were obtained in the same manner as in Production Example 3 except for using this hydrogel mixture (11) in place of the particulate hydrogel (1). Note that the temperatures of the particulate hydrogel (1) and fine powder granulated product (6) immediately before mixing were respectively 95° C. and 60° C. due to heating.

The dried polymer (15) had a proportion of particles that have un-passed through a sieve having a mesh opening size of 2800 μm (2800 on ratio) of 16.9% by mass, and a Δ2800 on ratio which is the difference between Reference Example 2 as the reference product of 9.5% by mass. The water-absorbent resin powder (15) had a proportion of particles that have passed through a sieve having a mesh opening size of 150 μm (150 pass ratio) of 15.2% by mass, and a Δ150 pass ratio which is the difference between Reference Example 2 as the reference product of 4.4% by mass.

Herein, the water-absorbent resin powder (15) is a water-absorbent resin powder formed of 83% of primary particles of the water-absorbent resin derived from the particulate hydrogel (1), and 17% of water-absorbent resin granulated particles derived from the fine powder granulated product (6) containing no adhesion controlling agent. The water-absorbent resin granulated particles contain the same amount of the surfactant as the primary particles of the water-absorbent resin.

and fine powder granulated product (4) immediately before mixing were respectively 95° C. and 60° C. due to heating.

The dried polymer (11) had a proportion of particles that have un-passed through a sieve having a mesh opening size of 2800 μm (2800 on ratio) of 4.8% by mass, and a Δ2800 on ratio which is the difference between Reference Example 3 as the reference product of −2.6% by mass. The water-absorbent resin powder (11) had a proportion of particles that have passed through a sieve having a mesh opening size of 150 μm (150 pass ratio) of 10.0% by mass, and a Δ150 pass ratio which is the difference between Reference Example 3 as the reference product of 2.2% by mass.

Herein, the water-absorbent resin powder (11) is a water-absorbent resin powder formed of 83% of primary particles of the water-absorbent resin derived from the particulate hydrogel (1), and 17% of water-absorbent resin granulated particles derived from the fine powder granulated product (1) containing an adhesion controlling agent. In addition to 1,500 ppm of the surfactant contained in the water-absorbent resin fine powder (1), 2,200 ppm of the surfactant which has been added in Production Example 9 was added to the water absorbent resin fine powder granulated product. Thus, the water absorbent resin fine powder granulated product con-

TABLE 2

| | Fine powder granulated product | Drying method | Dried polymer | | | Water-absorbent resin powder | | | |
|---|---|---|---|---|---|---|---|---|---|
| | | | Solid content ratio wt. % | 2800 on ratio wt. % | Δ2800 on ratio wt. % | Solid content ratio wt. % | Particle diameter d2 μm | 150 pass ratio wt. % | Δ150 pass ratio wt. % |
| Reference Example 2 | — | B | 98.5 | 7.4 | — | 97.5 | 350 | 10.8 | — |
| Example 3 | (1) | B | 98.6 | 12.1 | 4.7 | 97.6 | 347 | 14.1 | 3.3 |
| Example 4 | (3) | B | 98.5 | 7.7 | 0.3 | 97.6 | 344 | 14.1 | 3.3 |
| Example 5 | (4) | B | 98.5 | 4.8 | −2.6 | 97.5 | 344 | 13.7 | 2.9 |
| Example 6 | (5) | B | 98.7 | 3.5 | −3.9 | 97.8 | 345 | 13.8 | 3.0 |
| Comparative Example 3 | (2) | B | 98.2 | 22.3 | 14.9 | 97.2 | 343 | 15.9 | 5.1 |
| Comparative Example 4 | (6) | B | 98.1 | 16.9 | 9.5 | 97.3 | 344 | 15.2 | 4.4 |

B: rotary type dryer

Reference Example 3

The dried polymer (2) obtained in Production Example 3 and water-absorbent resin powder (3) obtained in Production Example 4 were used for Reference Example 3. Reference Example 3 is a production method in which the fine powder granulated product was not recovered in the drying step, and is a reference product for Example 7, and Comparative Example 5. The results of Reference Example 3, Example 7, and Comparative Example 5 are summarized in Table 3.

Example 7

The particulate hydrogel (1) obtained by Production Example 1 and the fine powder granulated product (4) obtained in Production Example 9 were mixed at a mass ratio of 85/15 (about 83/17 in terms of solid content ratio), thus obtaining a hydrogel mixture (7). A dried polymer (11) and a water-absorbent resin powder (11) were obtained in the same manner as in Production Example 3 except for using this hydrogel mixture (7) in place of the particulate hydrogel (1). Next, the water-absorbent resin powder (11) was obtained in the same matter as in Production process 4. Note that the temperatures of the particulate hydrogel (1)

tains the surfactant more than the primary particles of the water-absorbent resin by 2,200 ppm.

Comparative Example 5

The particulate hydrogel (1) obtained by Production Example 1 and the fine powder granulated product (6) obtained in Production Example 11 were mixed at a mass ratio of 85/15 (about 83/17 in terms of solid content ratio), thus obtaining a hydrogel mixture (12). A dried polymer (16) was obtained in the same manner as in Production Example 4 except for using this hydrogel mixture (12) in place of the particulate hydrogel (1). Next, the water-absorbent resin powder (11) was obtained in the same matter as in Production process 4. Note that the temperatures of the particulate hydrogel (1) and fine powder granulated product (6) immediately before mixing were respectively 95° C. and 60° C. due to heating.

The dried polymer (16) had a proportion of particles that have un-passed through a sieve having a mesh opening size of 2800 μm (2800 on ratio) of 16.9% by mass, and a Δ2800 on ratio which is the difference between Reference Example 3 as the reference product of 9.5% by mass. The water-absorbent resin powder (16) had a proportion of particles that have passed through a sieve having a mesh opening size of 150 μm (150 pass ratio) of 12.1% by mass, and a Δ150 pass ratio which is the difference between Reference Example 3 as the reference product of 4.3% by mass.

Herein, the water-absorbent resin powder (16) is a water-absorbent resin powder formed of 83% of primary particles of the water-absorbent resin derived from the particulate hydrogel (1), and 17% of water-absorbent resin granulated particles derived from the fine powder granulated product (6) containing no adhesion controlling agent. The water-absorbent resin granulated particles contain the same amount of the surfactant as the primary particles of the water-absorbent resin.

of the water-absorbent resin derived from the particulate hydrogel (1), and 17% of water-absorbent resin granulated particles derived from the fine powder granulated product (4) containing an adhesion controlling agent. In addition to 1,500 ppm of the surfactant contained in the water-absorbent resin fine powder (2), 1,500 ppm of the surfactant which has been added in Production Example 9 was added to the water absorbent resin fine powder granulated product. Thus, the water-absorbent resin fine powder granulated product contains the surfactant more than the primary particles of the water-absorbent resin by 2,200 ppm.

TABLE 3

| | Fine powder granulated product | Drying method | Dried polymer | | | Water-absorbent resin powder | | | |
|---|---|---|---|---|---|---|---|---|---|
| | | | Solid content ratio wt. % | 2800 on ratio wt. % | Δ2800 on ratio wt. % | Solid content ratio wt. % | Particle diameter d2 μm | 150 pass ratio wt. % | Δ150 pass ratio wt. % |
| Reference Example 3 | — | B | 98.5 | 7.4 | — | 97.6 | 420 | 7.8 | — |
| Example 7 | (4) | B | 98.6 | 4.8 | −2.6 | 97.7 | 415 | 10.0 | 2.2 |
| Comparative Example 5 | (6) | B | 98.3 | 16.9 | 9.5 | 97.2 | 415 | 12.1 | 4.3 |

B: rotary type dryer

Reference Example 4

The dried polymer (4) and water-absorbent resin powder (4) obtained in Production Example 5 were used for Reference Example 4. Reference Example 4 is a production method in which the fine powder granulated product was not recovered in the drying step, and is a reference product for Example 8, and Comparative Example 6. The results of Reference Example 4, Example 8, and Comparative Example 6 are summarized in Table 4.

Example 8

The particulate hydrogel (1) obtained by Production Example 1 and the fine powder granulated product (4) obtained in Production Example 9 were mixed at a mass ratio of 85/15 (about 83/17 in terms of solid content ratio), thus obtaining a hydrogel mixture (13). A dried polymer (17) and a water-absorbent resin powder (17) were obtained in the same manner as in Production Example 5 except for using this hydrogel mixture (17) in place of the particulate hydrogel (1). Note that the temperatures of the particulate hydrogel (1) and fine powder granulated product (4) immediately before mixing were respectively 95° C. and 60° C. due to heating.

The dried polymer (17) had a proportion of particles that have un-passed through a sieve having a mesh opening size of 2800 μm (2800 on ratio) of 5.1% by mass, and a Δ2800 on ratio which is the difference between Reference Example 4 as the reference product of −2.4% by mass. The water-absorbent resin powder (17) had a proportion of particles that have passed through a sieve having a mesh opening size of 150 μm (150 pass ratio) of 13.2% by mass, and a Δ150 pass ratio which is the difference between Reference Example 4 as the reference product of 2.6% by mass.

Herein, the water-absorbent resin powder (17) is a water-absorbent resin powder formed of 83% of primary particles Comparative Example 6

The particulate hydrogel (1) obtained by Production Example 1 and the fine powder granulated product (6) obtained in Production Example 11 were mixed at a mass ratio of 85/15 (about 83/17 in terms of solid content ratio), thus obtaining a hydrogel mixture (14). A dried polymer (18) and a water-absorbent resin powder (18) were obtained in the same manner as in Production Example 5 except for using this hydrogel mixture (14) in place of the particulate hydrogel (1). Note that the temperatures of the particulate hydrogel (1) and fine powder granulated product (6) immediately before mixing were respectively 95° C. and 60° C. due to heating.

The dried polymer (18) had a proportion of particles that have un-passed through a sieve having a mesh opening size of 2800 μm (2800 on ratio) of 17.2% by mass, and a Δ2800 on ratio which is the difference between Reference Example 4 as the reference product of 9.7% by mass. The water-absorbent resin powder (16) had a proportion of particles that have passed through a sieve having a mesh opening size of 150 μm (150 pass ratio) of 14.8% by mass, and a Δ150 pass ratio which is the difference between Reference Example 4 as the reference product of 4.2% by mass.

Herein, the water-absorbent resin powder (18) is a water-absorbent resin powder formed of 83% of primary particles of the water-absorbent resin derived from the particulate hydrogel (1), and 17% of water-absorbent resin granulated particles derived from the fine powder granulated product (6) containing no adhesion controlling agent. The water-absorbent resin granulated particles contain the same amount of the surfactant as the primary particles of the water-absorbent resin.

TABLE 4

| | Fine powder granulated product | Drying method | Dried polymer | | | Water-absorbent resin powder | | | | | | |
|---|---|---|---|---|---|---|---|---|---|---|---|---|
| | | | Solid content ratio wt. % | 2800 on ratio wt. % | Δ2800 on ratio wt. % | Solid content ratio wt. % | Particle diameter d2 μm | 150 pass ratio wt. % | Δ150 pass ratio wt. % | CRC g/g | AAP g/g | Vortex Second |
| Reference Example 4 | — | B | 98.5 | 7.5 | — | 97.8 | 350 | 10.6 | — | 38.7 | 18.5 | 28 |
| Example 8 | (4) | B | 98.7 | 5.1 | −2.4 | 97.5 | 342 | 13.2 | 2.6 | 37.8 | 18.1 | 26 |
| Comparative Example 6 | (6) | B | 98.2 | 17.2 | 9.7 | 97.3 | 345 | 14.8 | 4.2 | 38.2 | 12.9 | 30 |

Reference Example 2

The dried polymer (2) and water-absorbent resin powder (2) obtained in Production Example 3 were used for Reference Example 2. Reference Example 2 is a production method in which the fine powder granulated product was not recovered in the gel crushing step, and is a reference product for Example 9, and Comparative Example 7. The results of Reference Example 2, Example 9, and Comparative Example 7 are summarized in Table 5.

Example 9

A hydrogel mixture (15) was obtained by mixing the strip-like hydrogel (1b) obtained in Production Example 1 and the fine powder granulated product (4) obtained in Production Example 9 at a mass ratio of 85/15 (about 85/15 in terms of solid content ratio). Gel crushing was performed while supplying this hydrogel mixture (15), a 3.1% by mass lauryl dimethylaminoacetic acid betaine aqueous solution, water, and water vapor of 0.6 MPa to a screw extruder at the same time. The supply amount of the lauryl dimethylaminoacetic acid betaine aqueous solution was determined such that the amount of lauryl dimethylaminoacetic acid betaine is 0.15% by mass relative to the solid content of the hydrogel mixture (15). Gel crushing (first gel crushing) was performed by using, as the screw extruder, a meat chopper equipped with a screw shaft having an outer diameter of 86 mm and a perforated plate having a diameter of 100 mm, a pore size of 8.0 mm, and a thickness of 10 mm provided on the tip end. Next, the perforated plate was changed to one having a pore size of 4.7 mm, and the crushed gel obtained in the first gel crushing was further gel crushed (second gel crushing). The resulting particulate hydrogel (2) had a solid content ratio of 45% by mass (moisture content was 55% by mass), an average particle diameter d1 in terms of solid content of 125 μm, and a proportion of particles having a particle diameter of less than 150 μm of about 54% by mass. A dried polymer (19) and a water absorbent resin powder (19) were obtained in the same manner as in Production Example 3 except for using the resulting particulate hydrogel (2) in place of the particulate hydrogel (1). Note that the temperatures of the strip-like hydrogel (1b) and fine powder granulated product (4) immediately before mixing were both 60° C.

The dried polymer (19) had a proportion of particles that have un-passed through a sieve having a mesh opening size of 2800 μm (2800 on ratio) of 7.8% by mass, and a Δ2800 on ratio which is the difference between Reference Example 2 as the reference product of 0.4% by mass. The water-absorbent resin powder (19) had a proportion of particles that have passed through a sieve having a mesh opening size of 150 μm (150 pass ratio) of 13.5% by mass, and a Δ150 pass ratio which is the difference between Reference Example 4 as the reference product of 2.7% by mass.

Herein, the water-absorbent resin powder (19) is a water-absorbent resin powder formed of 85% of primary particles of the water-absorbent resin derived from the particulate hydrogel (2), and 15% of water-absorbent resin granulated particles derived from the fine powder granulated product (4) containing an adhesion controlling agent. The water-absorbent resin granulated particles contains lauryl dimethylaminoacetic acid betaine derived from the adhesion controlling agent (concentration of 0.253%) added in Production Example 9 more than the primary particles of the water-absorbent resin by 2,200 ppm.

Comparative Example 7

A hydrogel mixture (16) was obtained by mixing the strip-like hydrogel (1b) obtained in Production Example 1 and the fine powder granulated product (6) obtained in Production Example 11 at a mass ratio of 85/15 (about 85/15 in terms of solid content ratio). Gel crushing was performed while supplying this hydrogel mixture (16), a 3.1% by mass lauryl dimethylaminoacetic acid betaine aqueous solution, water, and water vapor of 0.6 MPa to a screw extruder at the same time. The supply amount of the lauryl dimethylaminoacetic acid betaine aqueous solution was determined such that the amount of lauryl dimethylaminoacetic acid betaine is 0.15% by mass relative to the solid content of the hydrogel mixture (16). Gel crushing (first gel crushing) was performed by using, as the screw extruder, a meat chopper equipped with a screw shaft having an outer diameter of 86 mm and a perforated plate having a diameter of 100 mm, a pore size of 8.0 mm, and a thickness of 10 mm provided on the tip end. Next, the perforated plate was changed to one having a pore size of 4.7 mm, and the crushed gel obtained in the first gel crushing was further gel crushed (second gel crushing). The resulting particulate hydrogel (3) had a solid content ratio of 45% by mass (moisture content was 55% by mass), an average particle diameter d1 in terms of solid content of 128 μm, and a proportion of particles having a particle diameter of less than 150 μm of about 54% by mass. A dried polymer (20) and a water-absorbent resin powder (20) were obtained in the same manner as in Production Example 3 except for using the resulting particulate hydrogel (2) in place of the particulate hydrogel (1). Note that the temperatures of the strip-like hydrogel (1b) and fine powder granulated product (6) immediately before mixing were both 60° C.

The dried polymer (20) had a proportion of particles that have un-passed through a sieve having a mesh opening size of 2800 μm (2800 on ratio) of 17.8% by mass, and a Δ2800 on ratio which is the difference between Reference Example 2 as the reference product of 10.4% by mass. The water-absorbent resin powder (20) had a proportion of particles that have passed through a sieve having a mesh opening size of 150 μm (150 pass ratio) of 15.3% by mass, and a Δ150 pass ratio which is the difference between Reference Example 4 as the reference product of 4.5% by mass.

(Crushing Step and Classifying Step)

The dried polymer (21) obtained in the drying step was crushed by a roll mill, and then classified by using two types of sieves having a mesh opening size of 850 μm and 150 μm. For the dried polymer remained on the sieve having a mesh opening size of 850 μm, crushing and classification were repeated until the total amount of the dried polymer has passed through the sieve having a mesh opening size of 850 μm. Through this operation, a water-absorbent resin powder (21) before surface crosslinking remained on the sieve having a mesh opening size of 150 μm and a fine powder (3) which has passed through the sieve having a mesh opening size of 150 μm were obtained.

TABLE 5

| | Fine powder granulated product | Drying method | Dried polymer | | | Water-absorbent resin powder | | | |
|---|---|---|---|---|---|---|---|---|---|
| | | | Solid content ratio wt. % | 2800 on ratio wt. % | Δ2800 on ratio wt. % | Solid content ratio wt. % | Particle diameter d2 μm | 150 pass ratio wt. % | Δ150 pass ratio wt. % |
| Reference Example 2 | — | B | 98.5 | 7.4 | — | 97.5 | 350 | 10.8 | — |
| Example 9 | (4) | B | 98.3 | 7.8 | 0.4 | 97.5 | 348 | 13.5 | 2.7 |
| Comparative Example 7 | (6) | B | 98.4 | 17.8 | 10.4 | 97.5 | 348 | 15.3 | 4.5 |

Production Example 12

(Polymerization Step)

Acrylic acid, 48.5% by mass of a sodium hydroxide aqueous solution, polyethylene glycol diacrylate (PEGDA, average molecular weight: 523), and deionized water were mixed, and the temperature of the resulting mixed solution was kept at 90° C. Then, 3% by mass of a sodium persulfate ($N_aPS$) aqueous solution was added to the mixed solution while the mixed solution was stirred, thus preparing an aqueous monomer solution. In the aqueous monomer solution, the monomer concentration was 43% by mass, the neutralization ratio was 71 mol %, the PEGDA concentration was 0.07 mol % (with respect to the monomer), and the NaPS concentration was 0.05 mol % (with respect to the monomer).

Polymerization reaction was started immediately after addition of the sodium persulfate aqueous solution, and 3 minutes later, a belt-like hydrogel (2a) was obtained.

(Gel Crushing Step)

The belt-like hydrogel (2a) obtained in the polymerization step was gel crushed by using a meat chopper. Note that when the belt-like hydrogel (2a) was introduced into the meat chopper, hot water at 80° C. was added. Further, a perforated plate with a pore size of 7.5 mm was provided in a tip of the discharging port of the meat chopper. The hydrogel after gel crushing in Production Example 1 (hereinafter, referred to as "particulate hydrogel (4)") had a mass average particle diameter (D50) of 1.7 mm, and a moisture content of 53% by mass.

(Drying Step)

The particulate hydrogel (4) obtained in the gel crushing step was stacked on a 20-mesh wire gauze such that the average thickness is 5 cm, and then dried by using a ventilation dryer (manufactured by Satake Chemical Equipment Mfg., Ltd.: product No. 71-S6). Drying was performed under the drying condition of allowing hot air at 190° C. to be circulated for 20 minutes to prepare a dried polymer (21). The drying was ended without any problem, and no non-dried product was found in the dried polymer. The moisture content of the dried polymer was 5% by mass. Note that the ventilation type dryer used in the examples has substantially the same drying behavior as that of the ventilation band dryer except for the difference between the batch type and the continuous type, and thus this result can also be applied to the ventilation band type dryer.

(Surface Crosslinking Step and Adding Step of Surface Modifier)

A surface crosslinking agent aqueous solution containing 0.3 parts by mass of ethylene carbonate, 0.5 parts by mass of propylene glycol, and 2.7 parts by mass of deionized water was prepared. Then, 3.5 parts by mass of the surface crosslinking agent aqueous solution was sprayed and mixed to 100 parts by mass of the water-absorbent resin (21) before surface crosslinking while stirring the water-absorbent resin (21). Thereafter, the resulting mixture was heat treated at 200° C. for 40 minutes to perform surface crosslinking.

Subsequently, an additive aqueous solution containing 1 part by mass of a 27% by mass aluminum sulfate aqueous solution and 0.2 parts by mass of a 60% by mass sodium lactate aqueous solution was added to the resulting mixture while stirring and cooling the mixture to prepare a water-absorbent resin powder (21) after surface crosslinking.

(Sizing Step)

The water-absorbent resin (21) after surface crosslinking obtained by the above-described operation was classified by using two types of sieves having a mesh opening size of 850 μm and 150 μm. For the aggregated water-absorbent resin remained on the sieve having a mesh opening size of 850 μm, the aggregates thereof were disintegrated and classification was repeated until the total amount of the aggregated water-absorbent resin has passed through the sieve having a mesh opening size of 850 μm. Through this operation, a water-absorbent resin (21) remained on the sieve having a mesh opening size of 150 μm and a fine powder (4) which has passed through the sieve having a mesh opening size of 150 μm were obtained.

The water-absorbent resin (21) had a water absorption capacity without pressure (CRC) of 27 g/g, a water absorption capacity under pressure at 0.7 psi (AAP) of 24 g/g, and a saline flow conductivity (SFC) of $120 \times 10^{-7} \times cm^3 \times s \times g^{-1}$.

The fine powder (3) and fine powder (4) were mixed at a ratio of 17:3 to prepare a fine powder (5). The mass average particle diameter (d3) of the fine powder (5) was 91 μm.

(Production of Fine Powder Granulated Product)

Production Example 13

After 60 g of the fine powder (5) obtained in Production Example 12 was heated to 75° C., 28 g of deionized water at 82° C. was added to the fine powder (5) over 3 seconds while stirring the fine powder (5) by a food cutter heated to 80° C. in an oven. Subsequently, 12 g of a 0.1% by mass polyoxyethylene sorbitan monostearate (TWEEN 60) aqueous solution at 25° C., that is, 200 ppm of polyoxyethylene sorbitan monostearate was added to the fine powder (5) over 2 seconds to granulate fine powder. The solid content ratio of the resulting fine powder granulated product (7) was 60% by mass.

Production Example 14

After 60 g of the fine powder (5) obtained in Production Example 12 was heated to 78° C., 28 g of water at 79° C. was added to the fine powder (5) over 4 seconds while stirring the fine powder (5) by a food cutter heated to 80° C. in an oven. Subsequently, 6 g of a 1% by mass lauryl dimethylaminoacetic acid betaine aqueous solution at 25° C., that is, 1,000 ppm of lauryl dimethylaminoacetic acid betaine was added to the fine powder (5) over 2 seconds to granulate fine powder. The solid content ratio of the resulting fine powder granulated product (8) was 60% by mass.

Example 10

First, 80 g of the fine powder granulated product (7) obtained in Production Example 13 was placed in a cylindrical plastic container (diameter: 8 cm), assuming transportation by a pipe or a bucket conveyor, and then transported. The fine powder granulated product (7) was added to 360 g of the particulate hydrogel (4) obtained in Production Example 12 after a lapse of 2.5 minutes from the time point at which mixing of the fine powder (5) and deionized water was started, that is, the start of granulation. Incidentally, the temperatures of the fine powder granulated product (7) and particulate hydrogel (4) immediately before mixing by the mortar mixer were respectively 67° C. and 55° C. Immediately after this addition, mixing was performed for 10 seconds by using a mortar mixer (manufactured by Nishinihon Shikenki) whose container has been heated to 80° C., thus obtaining a hydrogel mixture (17).
(Drying Step)

Thereafter, the hydrogel mixture (17) was stacked on a 20-mesh wire gauze, and dried by using a ventilation dryer same as that used in the Production Example 12. In the drying condition, the hot air temperature was 190° C., and the drying time was 20 minutes. The average thickness on the wire gauze was 5 cm. The drying was ended without any problem, and no non-dried product was contained in the dried polymer (22). The moisture content of the dried polymer (22) was 5% by mass. Note that this drying step was performed by using the drying step in Production Example 12 as a model and employed the same condition as that of Production Example 12.

The same operation as in the crushing step of Production Example 12 was performed on the dried polymer (22) obtained in the drying step to produce a water-absorbent resin powder (22). The water-absorbent resin powder (22) had a proportion of particles that have passed through a sieve having a mesh opening size of 150 μm (150 pass ratio) of 9.5% by mass.

Here, the water-absorbent resin powder (22) is a water-absorbent resin powder formed of 78% of primary particles of the water-absorbent resin derived from the particulate hydrogel (1) and 22% of water-absorbent resin granulated particles derived from the fine powder granulated product (7) containing an adhesion controlling agent. The water-absorbent resin fine powder granulated product contains polyoxyethylene sorbitan monostearate derived from the adhesion controlling agent which has been added in Production Example 13 more than the primary particles of the water-absorbent resin by 200 ppm.

Example 11

A hydrogel mixture (18), a dried polymer (23), and a water-absorbent resin powder (23) were obtained by performing the same operation as in Example 10 except for changing from the fine powder granulated product (7) to the fine powder granulated product (8) in Example 10. The water-absorbent resin powder (23) had a proportion of particles that have passed through a sieve having a mesh opening size of 150 μm (150 pass ratio) of 9.2% by mass. Incidentally, the temperatures of the fine powder granulated product (8) and particulate hydrogel (4) immediately before mixing by the mortar mixer were respectively 65° C. and 55° C.

Here, the water-absorbent resin powder (23) is a water-absorbent resin powder formed of 78% of primary particles of the water-absorbent resin derived from the particulate hydrogel (1) and 22% of water-absorbent resin granulated particles derived from the fine powder granulated product (8) containing an adhesion controlling agent. The water-absorbent resin fine powder granulated product contains lauryl dimethylaminoacetic acid betaine derived from the adhesion controlling agent added in Production Example 14 1,000 ppm more than the primary particles of the water-absorbent resin.

TABLE 6

|  | Temperature of fine powder [° C.] | Temperature of aqueous liquid [° C.] | Time lapse from granulation start [min] | Temperature of fine powder granulated product (before mixing) [° C.] | Temperature of particulate hydrogel (before mixing) [° C.] | Non-dried product | Degree of aggregate disintegration (cm) |
|---|---|---|---|---|---|---|---|
| Example 10 | 75 | 82/25*1 | 3 | 67 | 55 | None | 16 |
| Example 11 | 78 | 79/25*1 | 3 | 65 | 55 | None | 19 |

*1 Temperature of hot water/temperature of surfactant aqueous solution

Production Example 15

A fine powder granulated product (9) was obtained in the same manner as in Production Example 6 with the exception that the concentration of the effective component of the adhesion controlling agent aqueous solution was 1.15% by mass, and the added amount of the adhesion controlling agent was 5,000 ppm relative to the solid content of the fine powder (2) in Production Example 9. The solid content ratio of the fine powder granulated product (9) was 64% by mass.

Example 12

The particulate hydrogel (1) obtained in polymerization and gel crushing in Production Example 1 (solid content: 44% by weight) having its temperature of 95° C. and the fine powder granulated product (9) obtained in Production Example 15 (solid content: 50% by weight) having its temperature of 60° C. were mixed at a mass ratio of 85/15 (about 80/20 in terms of solid content ratio), thus obtaining a hydrogel mixture (19). A dried polymer (24) and a water-absorbent resin powder (24) were obtained in the same manner as in Production Example 3 except for using this hydrogel mixture (19) in place of the particulate hydrogel (1).

The dried polymer (24) had a proportion of particles that have un-passed through a sieve having a mesh opening size of 2800 μm (2800 on ratio) of 8.2% by mass, and a Δ2800 on ratio which is the difference between Reference Example 2 as the reference product of 0.8% by mass. The water-absorbent resin powder (24) had a proportion of particles that have passed through a sieve having a mesh opening size of 150 μm (150 pass ratio) of 12.1% by mass, and a Δ150 pass ratio which is the difference between Reference Example 2 as the reference product of 1.3% by mass. Note that the water-absorbent resin powder (24) has solid content of 98.3% by mass and mass average particle diameter (d2) of 343 μm.

Herein, the water-absorbent resin powder (24) is a water-absorbent resin powder formed of 80% of primary particles of the water-absorbent resin derived from the particulate hydrogel (1), and 20% of water-absorbent resin granulated particles derived from the fine powder granulated product (9) containing an adhesion controlling agent. In addition to 1,500 ppm of the surfactant contained in the water-absorbent resin fine powder (2), 5,000 ppm of the surfactant which has been added in Production Example 15 was added to the water-absorbent resin fine powder granulated product. Thus, the water-absorbent resin fine powder granulated product contains the surfactant more than the primary particles of the water-absorbent resin by 5,000 ppm.

an adhesion controlling agent to the fine powder (1), drying the recovered fine powder granulated product (1) together with the particulate hydrogel (1) by the ventilation band type dryer, and performing the crushing step is smaller than the Δ 150 pass ratio of the water-absorbent resin powder of Comparative Example 1 which used the fine powder granulated product (2) granulated without adding the adhesion controlling agent. The comparison of Example 1 and Comparative Example 1 revels that it is important to add an adhesion controlling agent for reduction in the generation amount of fine powder.

In Table 1, the Δ150 pass ratio of the water-absorbent resin powder of Example 2 which is obtained by recovering the fine powder granulated product (4) granulated by adding an adhesion controlling agent to the fine powder (2), drying the recovered fine powder granulated product (4) together with the particulate hydrogel (1) by the ventilation band type dryer, and performing the crushing step is smaller than the Δ 150 pass ratio of the water-absorbent resin powder of Comparative Example 2 which used the fine powder granulated product (6) granulated without adding the adhesion controlling agent. The comparison of Example 2 and Comparative Example 2 revels that it is important to add an adhesion controlling agent for reduction in the generation amount of fine powder.

In Tables 1 and 2, the comparison between Example 1 and Example 3, and the comparison between Example 2 and Example 4 reveal that the Δ150 pass ratio of the water-absorbent resin powder obtained by using the rotary type dryer is smaller than the Δ 150 pass ratio of the water-absorbent resin powder obtained by using the ventilation band type dryer, and thus use of the rotary type dryer is preferable.

In Table 2, the Δ2,800 on ratio of the dried polymer of Example 3 obtained by recovering the fine powder granulated product (1) granulated by adding an adhesion controlling agent to the fine powder (1) and drying the recovered fine powder granulated product (1) together with the particulate hydrogel (1) by the rotary type dryer is smaller than the Δ2,800 on ratio of the dried polymer of Comparative Example 3 which used the fine powder granulated product (2) granulated without adding the adhesion controlling agent. Further, the Δ150 pass ratio of the water-absorbent resin powder of Example 3 obtained by crushing the dried polymer is smaller than the Δ150 pass ratio of the water-absorbent resin powder of Comparative Example 3. The comparison between Example 3 and Comparative Example 3 revels that it is important to add an adhesion controlling agent for suppression of increase in the particle size in fine powder granulation and reduction in the generation amount of fine powder.

TABLE 7

| | Fine powder granulated product | Drying method | Dried polymer | | | Water-absorbent resin powder | | | |
|---|---|---|---|---|---|---|---|---|---|
| | | | Solid content ratio wt. % | 2800 on ratio wt. % | Δ2800 on ratio wt. % | Solid content ratio wt. % | Particle diameter d2 μm | 150 pass ratio wt. % | Δ150 pass ratio wt. % |
| Example 12 | (9) | C | 0 | 8.2 | 0.8 | 98.3 | 343 | 12.1 | 1.3 |

SUMMARY

In Table 1, the Δ150 pass ratio of the water-absorbent resin powder of Example 1 which is obtained by recovering the fine powder granulated product (1) granulated by adding In Table 2, the Δ2,800 on ratio of the dried polymers of Examples 4 to 6 obtained by recovering the fine powder granulated products (3) to (5) granulated by changing the added amount of the adhesion controlling agent to the fine powder (2) and drying the recovered fine powder granulated products together with the particulate hydrogel (1) by the rotary type dryer is smaller than the Δ2,800 on ratio of the dried polymer of Comparative Example 4 which used the fine powder granulated product (6) granulated without adding the adhesion controlling agent. Further, the Δ150 pass ratio of the water-absorbent resin powders of Examples 4 to 6 obtained by crushing the dried polymer is smaller than the Δ150 pass ratio of the water-absorbent resin powder of Comparative Example 4. The comparison between Examples 4 to 6 and Comparative Example 4 revels that it is important to add an adhesion controlling agent for suppression of increase in the particle size in fine powder granulation and reduction in the generation amount of fine powder.

In Table 3, the Δ2,800 on ratio of the dried polymer of Example 7 obtained by recovering the fine powder granulated product (4) granulated by adding an adhesion controlling agent to the fine powder (2) and drying the recovered fine powder granulated product together with the particulate hydrogel (1) by the rotary type dryer is smaller than the Δ2,800 on ratio of the dried polymer of Comparative Example 5 which used the fine powder granulated product (6) granulated without adding the adhesion controlling agent. Further, the Δ150 pass ratio of the water-absorbent resin powder of Example 7 obtained by crushing the dried polymer is smaller than the Δ150 pass ratio of the water-absorbent resin powder of Comparative Example 5. The comparison between Example 7 and Comparative Example 5 revels that it is important to add an adhesion controlling agent for suppression of increase in the particle size in fine powder granulation and reduction in the generation amount of fine powder regardless of the strength in the crushing step.

In Table 4, the Δ2,800 on ratio of the dried polymer of Example 8 obtained by recovering the fine powder granulated product (4) granulated by adding an adhesion controlling agent to the fine powder (2) and drying the recovered fine powder granulated product together with the particulate hydrogel (1) by the rotary type dryer is smaller than the Δ2,800 on ratio of the dried polymer of Comparative Example 6 which used the fine powder granulated product (6) granulated without adding the adhesion controlling agent. Further, the Δ150 pass ratio of the water-absorbent resin powder of Example 8 obtained by crushing the dried polymer is smaller than the Δ150 pass ratio of the water-absorbent resin powder of Comparative Example 6. The comparison between Example 8 and Comparative Example 6 revels that it is important to add an adhesion controlling agent for suppression of increase in the particle size in fine powder granulation and reduction in the generation amount of fine powder regardless of the presence or absence of surface crosslinking. Further, Example 8, in which the generation amount of fine powder indicated by the 150 pass ratio is reduced, exhibited improved AAP (water absorption performance under pressure) and exhibited a performance which is the same level as that of Reference Example 4 which is obtained without recovering the fine powder granulated product.

In Table 5, the Δ2,800 on ratio of the dried polymer of Example 9 obtained by recovering, to the gel crushing step, the fine powder granulated product (4) granulated by adding an adhesion controlling agent to the fine powder (2) is smaller than the Δ2,800 on ratio of the dried polymer of Comparative Example 7 which used the fine powder granulated product (6) granulated without adding the adhesion controlling agent. Further, the Δ150 pass ratio of the water-absorbent resin powder of Example 9 obtained by crushing the dried polymer is smaller than the Δ150 pass ratio of the water-absorbent resin powder of Comparative Example 7. The comparison between Example 9 and Comparative Example 7 revels that it is important to add an adhesion controlling agent for suppression of increase in the particle size in fine powder granulation and reduction in the generation amount of fine powder, also in an embodiment in which the fine powder granulated product is recovered to the gel crushing step.

In Table 6, the results of the degree of aggregate disintegration show that when a heated aqueous liquid (hot water) is added to fine powder, and further, a surfactant aqueous solution is added to perform granulation, a granulated gel having high flowability can be obtained.

According to Examples 10 and 11, it is found that not only lauryl dimethylaminoacetic acid betaine which is an amphoteric surfactant, but also polyoxyethylene sorbitan monostearate which is nonionic can be similarly used as the surfactant of the present invention.

According to Example 12, it is found that even when the solid content ratio of the fine powder granulated product is high, it is possible to achieve a (solid content ratio of 64% by mass).

Further, the water-absorbent resin powder obtained in the present invention is a water-absorbent resin powder formed of a water-absorbent resin primary particle and a water-absorbent resin fine powder granulated product containing an adhesion controlling agent, and the adhesion controlling agent (surfactant) is added to the fine powder granulated product which is relatively vulnerable to mechanical damage (added more than the water-absorbent resin primary particle derived from the dried product of the hydrogel). Thus, the water-absorbent resin powder of the present invention is strong against mechanical damage and has good powder flowability when formed as a water-absorbent resin powder containing a water-absorbent resin fine powder granulated product.

Note that the water-absorbent resin powders obtained in the above-described production examples, examples, and comparative examples are a water-absorbent resin powder before performing the classifying step in the sizing step, which is not a final product.

INDUSTRIAL APPLICABILITY

A water-absorbent resin powder obtained by the present invention is suitable for application to an absorbent for hygiene products such as paper diapers.

The invention claimed is:

1. A method of producing a water-absorbent resin powder, the method comprising:
 a drying step of drying a particulate hydrogel crosslinked polymer which is obtained using an acid group-containing unsaturated monomer as a main component to obtain a dried polymer, and
 a fine powder granulation step of adding a binder and an adhesion controlling agent to fine powder formed of a water-absorbent resin to obtain a fine powder granulated product,
 wherein the fine powder granulated product is recovered after the gel crushing step and before the drying step, or during the drying step;
 wherein the adhesion controlling agent is added in a form of aqueous solution; and
 an added amount of the adhesion controlling agent is from 0.02 mass % to 1.0 mass % relative to the solid content of the fine powder formed of the water-absorbent resin;

wherein a stirring dryer having one or more of heating means selected from a group of a ventilation heating type, an outer wall heating type and a tubular heating type in the drying step;

wherein a temperature of the fine powder granulated product and the particulate hydrogel cross-linked polymer is in a range of 50° C. or more to 100° C. or less; and a temperature difference between the fine powder granulated product and the particulate hydrogel cross-linked polymer is within 30° C.

2. The method according to claim 1, wherein the adhesion controlling agent is a surfactant.

3. The method according to claim 1, wherein a drying method is stirring drying in the drying step.

4. The method according to claim 1, wherein
a main component of the fine powder is a poly (meth) acrylic acid (salt)-based crosslinked polymer, and
a mass average particle diameter of the fine powder is less than 150 μm.

5. The method according to claim 1, further comprising:
a surface crosslinking step of surface crosslinking the particulate hydrogel crosslinked polymer and/or particulate dried polymer; and
a sizing step of adjusting the particle size of the dried polymer and/or surface-crosslinked dried polymer;
wherein the fine powder is obtained in the sizing step.

6. The method according to claim 1, wherein the fine powder granulated product contains a surface crosslinked fine powder.

7. The method according to claim 1, wherein an added amount of the water vapor relative to the fine powder is, per unit time, in a range of 1% by mass or more to 100% by mass or less.

8. The method according to claim 1, wherein a solid content of the fine powder granulated product is in a range of 30% by mass or more to 80% by mass or less.

9. The method according to claim 1, wherein an atmospheric dew point in an interior of a dryer is in a range of 60 to 100° C. in the drying step.

10. A water-absorbent resin powder obtained by the production method according claim 1.

11. The water-absorbent resin powder according to claim 10, wherein
the water-absorbent resin powder contains a water-absorbent resin fine powder granulated product containing an adhesion controlling agent;
the adhesion controlling agent is a surfactant; and
a content of the surfactant in the water-absorbent resin fine powder granulated product is larger relative to an average content of the surfactant in the water-absorbent resin powder.

12. The water-absorbent resin powder according to claim 10, wherein
a proportion of particles having a particle diameter of less than 150 μm contained in the water-absorbent resin powder is 15% by mass or less.

* * * * *